US012566469B2

(12) United States Patent
Han et al.

(10) Patent No.: US 12,566,469 B2
(45) Date of Patent: Mar. 3, 2026

(54) WEARABLE ELECTRONIC DEVICE COMPRISING SENSOR, AND METHOD BY WHICH ELECTRONIC DEVICE PROCESSES TOUCH SIGNAL

(71) Applicant: Samsung Electronics Co., Ltd., Suwon-si (KR)

(72) Inventors: Kyusung Han, Suwon-si (KR); Hongki Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/971,970

(22) Filed: Dec. 6, 2024

(65) Prior Publication Data

US 2025/0103098 A1    Mar. 27, 2025

Related U.S. Application Data

(63) Continuation of application No. PCT/KR2023/007633, filed on Jun. 2, 2023.

(30) Foreign Application Priority Data

Jun. 8, 2022    (KR) ........................ 10-2022-0069313
Jun. 30, 2022    (KR) ........................ 10-2022-0080604

(Continued)

(51) Int. Cl.
*G06F 1/16*        (2006.01)
*G06F 3/041*        (2006.01)

(52) U.S. Cl.
CPC .......... *G06F 1/163* (2013.01); *G06F 3/04164* (2019.05); *G06F 3/0418* (2013.01)

(58) Field of Classification Search
CPC ..... G06F 1/163; G06F 3/04164; G06F 3/0418

(Continued)

(56) References Cited

U.S. PATENT DOCUMENTS 8,665,177 B2 *    3/2014    Herrmann ............... G06F 1/163
                                                                  351/158
11,323,796 B2    5/2022    Fukahori et al.
                        (Continued)

FOREIGN PATENT DOCUMENTS

CN    109348352 A  *  2/2019  .......... H04R 1/1091
CN    110780769 A    2/2020
                        (Continued)

OTHER PUBLICATIONS

International Search report and written opinion dated Aug. 24, 2023, issued in International Application No. PCT/KR2023/007633.

*Primary Examiner* — Kwin Xie
(74) *Attorney, Agent, or Firm* — Jefferson IP Law, LLP

(57)        ABSTRACT

A wearable electronic device is provided. The wearable electronic device includes a housing, which includes a first part at least partially exposed to an outside to receive a touch by being seated on at least a portion of a body of a user, and a second part extending from the first part, and configured to be concealed by the first part by being inserted into an ear canal of the user, the first part including a first touch area facing a first direction and a second touch area disposed on at least a portion of a lateral edge of the first part, adjacent to the first touch area and facing a second direction, a main touch sensor disposed below the first touch area, an auxiliary touch sensor disposed below the second touch area, and a circuit board disposed inside the housing, and including a processor electrically connected to the main touch sensor and the auxiliary touch sensor and configured to control an operation state of the wearable electronic device based on touch information obtained from the main touch sensor and the auxiliary touch sensor, wherein the auxiliary touch sensor includes a first auxiliary touch sensor and a second auxiliary touch sensor, disposed below the second touch area, wherein the processor is further configured to maintain (Continued)

the operation state of the wearable electronic device, when a touch sensitivity measured at least a portion of the first auxiliary touch sensor and the second auxiliary touch sensor is equal to or greater than a first threshold, and wherein the processor is further configured to change the operation state of the wearable electronic device, when touch sensitivities measured at the first auxiliary touch sensor and the second auxiliary touch sensor are less than the first threshold and a touch sensitivity measured at the main touch sensor is equal to or greater than a second threshold.

20 Claims, 32 Drawing Sheets

(30)         Foreign Application Priority Data

| | | |
|---|---|---|
| Jul. 29, 2022 | (KR) | 10-2022-0094350 |
| Aug. 8, 2022 | (KR) | 10-2022-0098673 |
| Oct. 4, 2022 | (KR) | 10-2022-0126495 |

(58)  Field of Classification Search
USPC ................................................ 345/156–174
See application file for complete search history.

(56)                 References Cited

U.S. PATENT DOCUMENTS

| | | | |
|---|---|---|---|
| 11,425,484 | B2 | 8/2022 | Kim et al. |
| 12,153,759 | B2 * | 11/2024 | Ibtehaz ................... G06F 3/041 |
| 2006/0215847 | A1 | 9/2006 | Hollemans et al. |
| 2012/0242617 | A1 | 9/2012 | Lee |
| 2018/0329500 | A1 | 11/2018 | Kim et al. |
| 2019/0289382 | A1 | 9/2019 | Chawan et al. |
| 2021/0044886 | A1 * | 2/2021 | Hsu ..................... H04R 1/1041 |
| 2023/0229260 | A1 | 7/2023 | Ibtehaz et al. |

FOREIGN PATENT DOCUMENTS

| | | | |
|---|---|---|---|
| CN | 111954110 | A | 11/2020 |
| CN | 113709617 | A | 11/2021 |
| CN | 114079843 | A | 2/2022 |
| JP | 2021/029006 | A2 | 2/2021 |
| KR | 10-2012-0109027 | A | 10/2012 |
| KR | 10-2017-0052196 | A | 5/2017 |
| KR | 10-2021-0101597 | A | 8/2021 |
| KR | 10-2022-0040277 | A | 3/2022 |

* cited by examiner

1500c

1700a

1700b

2100a

START

RECEIVE MAIN TOUCH SIGNAL
AND AUXILIARY TOUCH SIGNAL ~1301

DETECT DEBOUNCE PERIOD OF MAIN TOUCH
SIGNAL AND DEBOUNCE PERIOD
OF AUXILIARY TOUCH SIGNAL ~1303

1305
DEBOUNCE PERIOD
OF MAIN TOUCH SIGNAL < FIRST THRESHOLD
PERIOD?

NO

C

YES

A

WEARABLE ELECTRONIC DEVICE COMPRISING SENSOR, AND METHOD BY WHICH ELECTRONIC DEVICE PROCESSES TOUCH SIGNAL

CROSS-REFERENCE TO RELATED APPLICATION(S)

This application is a continuation application, claiming priority under 35 U.S.C. § 365(c), of an International application No. PCT/KR2023/007633, filed on Jun. 2, 2023, which is based on and claims the benefit of a Korean patent application number 10-2022-0069313, filed on Jun. 8, 2022, in the Korean Intellectual Property Office, of a Korean patent application number 10-2022-0080604, filed on Jun. 30, 2022, in the Korean Intellectual Property Office, of a Korean patent application number 10-2022-0094350, filed on Jul. 29, 2022, in the Korean Intellectual Property Office, of a Korean patent application number 10-2022-0098673, filed on Aug. 8, 2022, in the Korean Intellectual Property Office, and of a Korean patent application number 10-2022-0126495, filed on Oct. 4, 2022, in the Korean Intellectual Property Office, the disclosure of each of which is incorporated by reference herein in its entirety.

BACKGROUND

1. Field

The disclosure relates to a wearable electronic device including a sensor and a method for processing a touch signal in the wearable electronic device.

2. Description of Related Art

Along with the development of electronic, information, and communication technologies, a single electronic device is equipped with various functions. For example, an electronic device (e.g., a smartphone) includes functions such as an audio player, an imaging device, or an electronic notebook, as well as a communication function, and more diverse functions may be implemented on the smartphone by installing additional applications. In addition to executing installed applications or stored functions, the electronic device may receive various types of information in real time by connecting to servers or other electronic devices in a wired or wireless manner.

As the use of electronic devices becomes common, user demands for their portability and usability are on the increase. In response to these user demands, electronic devices which may be carried and used while worn on the body (hereinafter, referred to as 'wearable electronic devices'), like wrist watches or glasses, have been commercialized. Before the emergence of wrist watch-type or glasses-type electronic devices, wearable electronic devices such as earphones or hands-free sets, for example, audio devices, have provided an environment in which other electronic devices such as smartphones are used more conveniently. As short-range wireless communication such as Bluetooth becomes more common, wearable electronic devices such as earphones or hands-free sets may transmit/receive sound signals through wireless communication with other electronic devices, while worn on the user's body (e.g. ears).

Owing to the proliferation of audio devices such as earphones or hands-free sets or electronic devices including the audio devices, users may conveniently listen to or watch music, videos, or streaming audio/video, while on the move.

As technology related to these audio devices has been further developed, wearable electronic devices such as earphones have come to provide a function of attenuating or cancelling external sounds or noise other than output sounds. They may also provide a function of collecting user voices or external sounds or a voice control function.

Because the functional gap between manufacturers is significantly narrowed, wearable electronic devices have gradually become slim to meet consumers' purchasing needs, and the electronic devices tend to be developed toward increased usability, reinforced design aspects, and differentiated functional elements.

Among the differentiated functional elements of wearable electronic devices, malfunction protection is very important for the above electronic devices that are becoming miniaturized and portable, and may be a measure to improve performance without changing design elements in adding components to miniaturized wearable electronic devices.

However, due to the design of a wearable electronic device, there are various ways in which the wearable electronic device is worn or removed by different persons. Accordingly, while a user wears a wearable electronic device, an unintended operation may be performed by a touch pad of the wearable electronic device, or the touch pad may not work even if it is intended to work.

The wearable electronic device may process a main touch signal and an auxiliary touch signal to determine whether the main touch signal detected by the wearable electronic device is valid.

In the wearable electronic device, the main touch signal is for controlling the wearable electronic device to perform a user-intended operation. For example, the main touch signal functions to turn on or off media, when the user makes a single touch on a certain area of the wearable electronic device, or to turn on or off active noise cancellation (ANC), when the user makes a long touch on a certain area of the wearable electronic device.

In the wearable electronic device, the auxiliary touch signal is for preventing the user from controlling the wearable electronic device electronic device through a touch on a certain area of the wearable electronic device, which the user does not intend to perform a specific operation. When the auxiliary touch signal is generated in a certain area of the wearable electronic device within reach of the user's finger, the main touch signal is controlled not to be generated. For example, in the case where the user touches the wearable electronic device (e.g., an earbud) to securely wear it, or the user re-wears the wearable electronic device, when the auxiliary touch signal is generated, the main touch signal is controlled not to be generated.

Therefore, there is a need for a more accurate and reliable technique for determining whether a main touch signal is valid using the main touch signal and an auxiliary touch signal, based on various cases that may occur in a wearable electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable electronic device including a sensor and a method for processing a touch signal in the wearable electronic device.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a housing including a first part at least partially exposed to an outside to receive a touch by being seated on at least a portion of a body of a user, and a second part extending from the first part, and configured to be concealed by the first part by being inserted into an ear canal of the user, wherein the first part includes a first touch area facing a first direction and a second touch area disposed on at least a portion of a lateral edge of the first part, adjacent to the first touch area and facing a second direction, the wearable device further including a main touch sensor disposed below the first touch area, an auxiliary touch sensor disposed below the second touch area, and a circuit board disposed inside the housing, and including a processor electrically connected to the main touch sensor and the auxiliary touch sensor and configured to control an operation state of the wearable electronic device based on touch information obtained from the main touch sensor and the auxiliary touch sensor, wherein the auxiliary touch sensor includes a first auxiliary touch sensor and a second auxiliary touch sensor, disposed below the second touch area, wherein the processor is further configured to maintain the operation state of the wearable electronic device, when a touch sensitivity measured at least a portion of the first auxiliary touch sensor and the second auxiliary touch sensor is equal to or greater than a first threshold, and wherein the processor is further configured to change the operation state of the wearable electronic device, when touch sensitivities measured at the first auxiliary touch sensor and the second auxiliary touch sensor are less than the first threshold and a touch sensitivity measured at the main touch sensor is equal to or greater than a second threshold.

According to an embodiment, the wearable electronic device includes a main touch sensor disposed below the first touch area.

According to an embodiment, the wearable electronic device includes an auxiliary touch sensor disposed below the second touch area.

According to an embodiment, the wearable electronic device includes a circuit board disposed inside the housing, and including a processor electrically connected to the main touch sensor and the auxiliary touch sensor and configured to control an operation state of the electronic device based on touch information obtained from the main touch sensor and the auxiliary touch sensor.

According to an embodiment, the auxiliary touch sensor includes a first auxiliary touch sensor and a second auxiliary touch sensor, disposed below the second touch area.

According to an embodiment, the processor is configured to maintain the operation state of the electronic device, when a touch sensitivity measured at least a portion of the first auxiliary touch sensor and the second auxiliary touch sensor is equal to or greater than a first threshold.

According to an embodiment, the processor is configured to change the operation state of the electronic device, when touch sensitivities measured at the first auxiliary touch sensor and the second auxiliary touch sensor are less than the first threshold and a touch sensitivity measured at the main touch sensor is equal to or greater than a second threshold.

In accordance with another aspect of the disclosure, a wearable electronic device is provided. The wearable electronic device includes a housing including a first part at least partially exposed to an outside to receive a touch by being seated on at least a portion of a body of a user, and a second part extending from the first part, and configured to be concealed by the first part by being inserted into an ear canal of the user, wherein the first part includes a first touch area facing a first direction and a second touch area disposed on at least a portion of a lateral edge of the first part, adjacent to the first touch area and facing a second direction, a main touch sensor disposed below the first touch area, an auxiliary touch sensor disposed below the second touch area, and a processor, wherein the processor is configured to perform a first computation operation of, based on a main touch signal and an auxiliary touch signal detected from the main touch sensor and the auxiliary touch sensor, respectively, detecting a debounce period of the main touch signal from an operation start time of the main touch signal to an operation release time of a main touch period, and a debounce period of the auxiliary touch signal from an operation start time of the auxiliary touch signal to an operation release time of the auxiliary touch signal, and perform a second computation operation of setting at least one period for processing the main touch signal as valid or invalid based on the debounce period of the main touch signal, and processing the main touch signal as valid or invalid based on whether the debounce period of the auxiliary touch signal is included in the at least one period.

According to an embodiment, the processor is configured to perform a first computation operation of, based on a main touch signal and an auxiliary touch signal detected from the main touch sensor and the auxiliary touch sensor, respectively, detecting a debounce period of the main touch signal from an operation start time of the main touch signal to an operation release time of the main touch period, and a debounce period of the auxiliary touch signal from an operation start time of the auxiliary touch signal to an operation release time of the auxiliary touch signal.

According to an embodiment, the processor is configured to perform a second computation operation of setting at least one period for processing the main touch signal as valid or invalid based on the debounce period of the main touch signal, and processing the main touch signal as valid or invalid based on whether the debounce period of the auxiliary touch signal is included in the at least one period.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
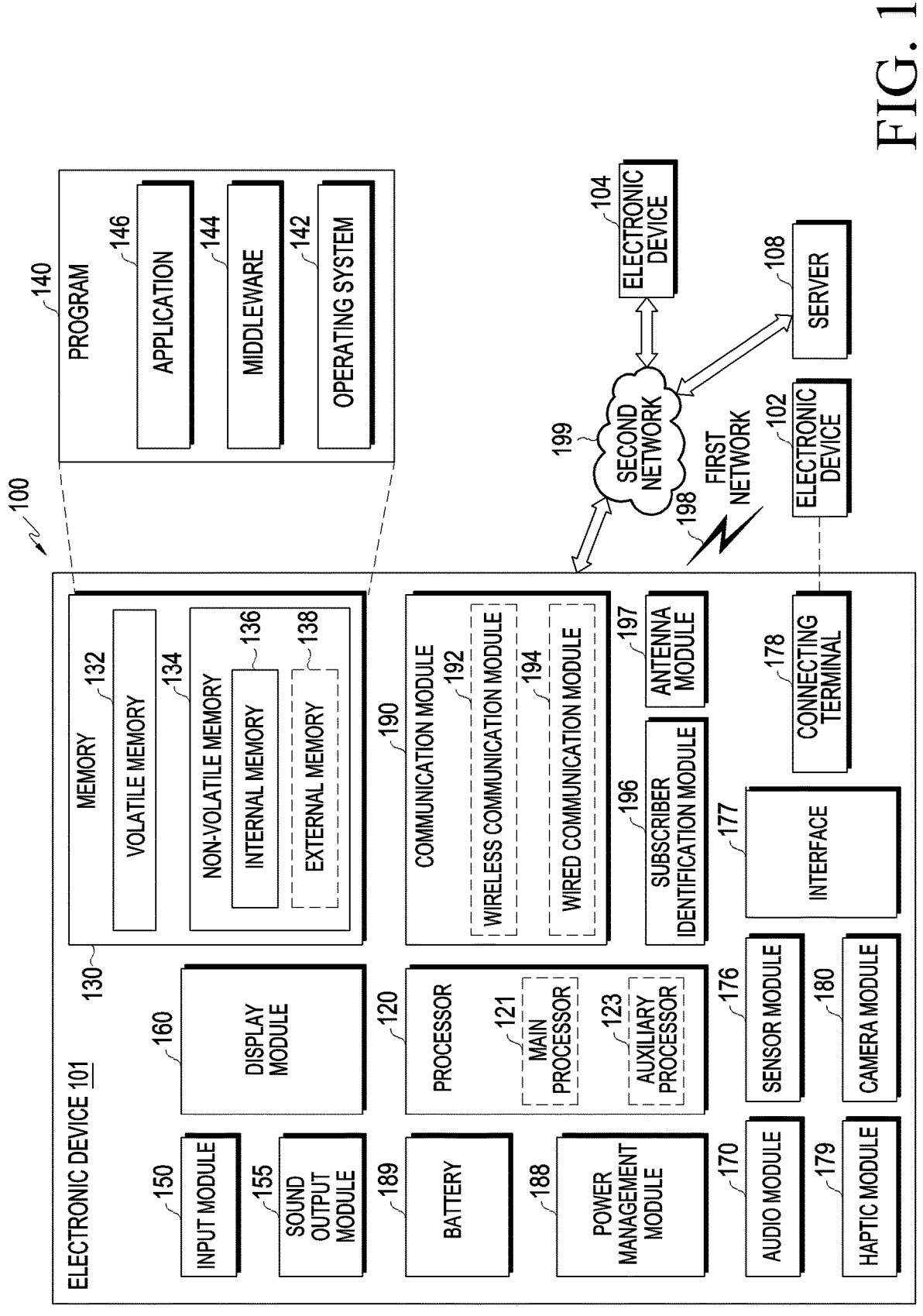
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operation state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
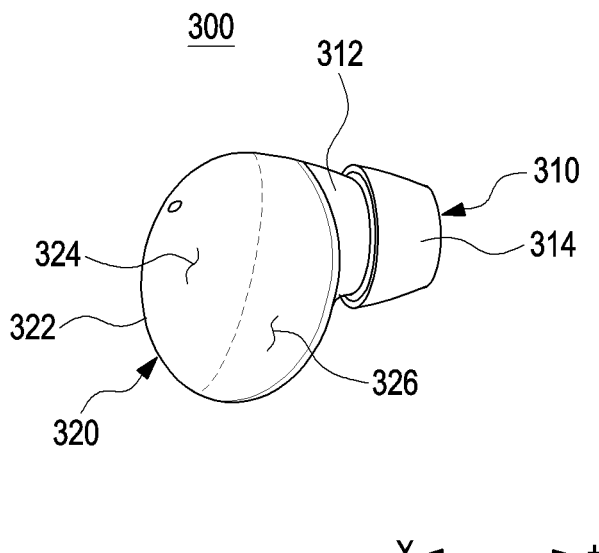
FIG. 2 is a perspective view illustrating a wearable electronic device according to an embodiment of the disclosure.
Figures 3A, 3B:
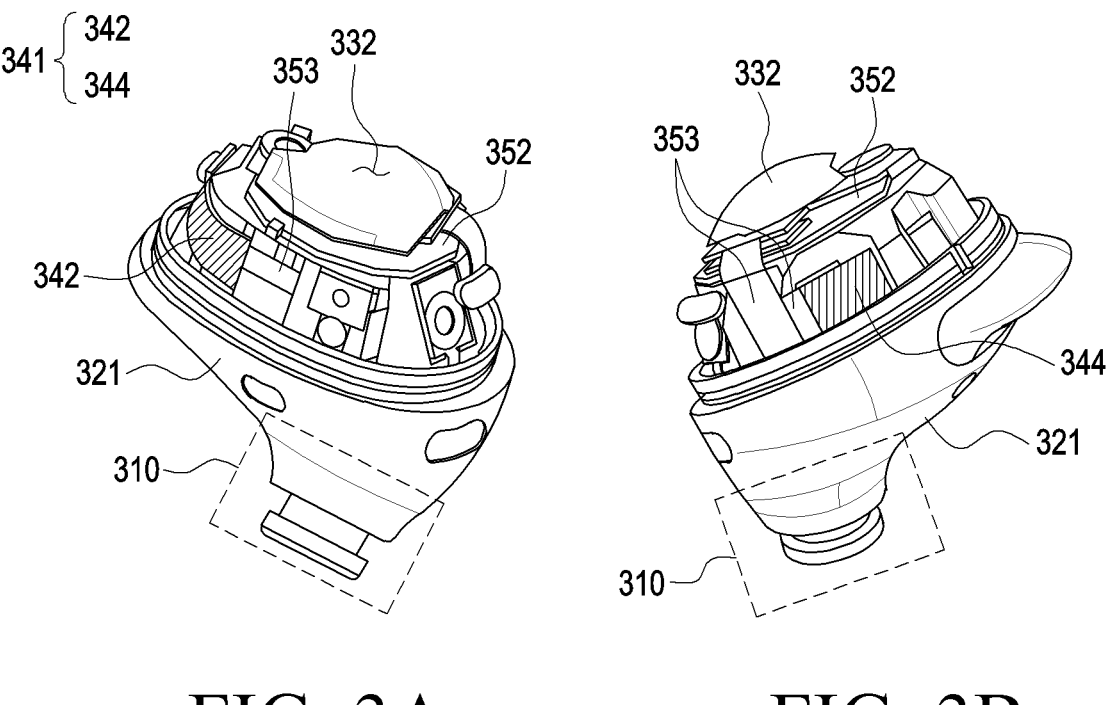
FIGS. 3A and 3B are diagrams illustrating a wearable electronic device from which a housing is partially removed according to various embodiments of the disclosure.
Figure 4A:
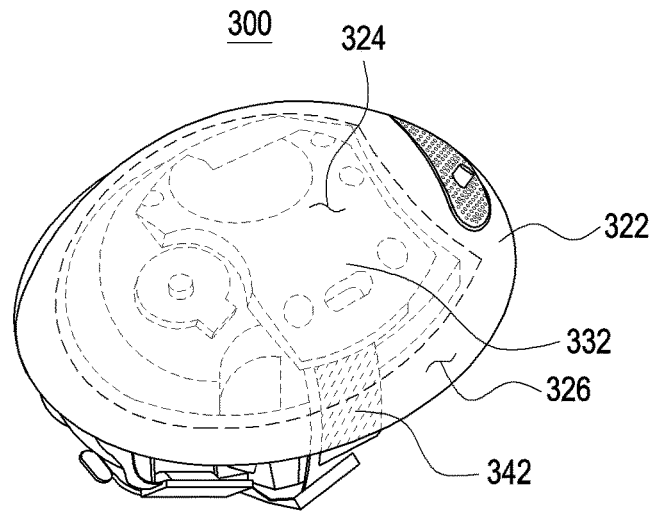
FIGS. 4A, 4B, and 4C are diagrams illustrating a wearable electronic device viewed from various angles according to various embodiments of the disclosure.
Figures 4B, 4C:
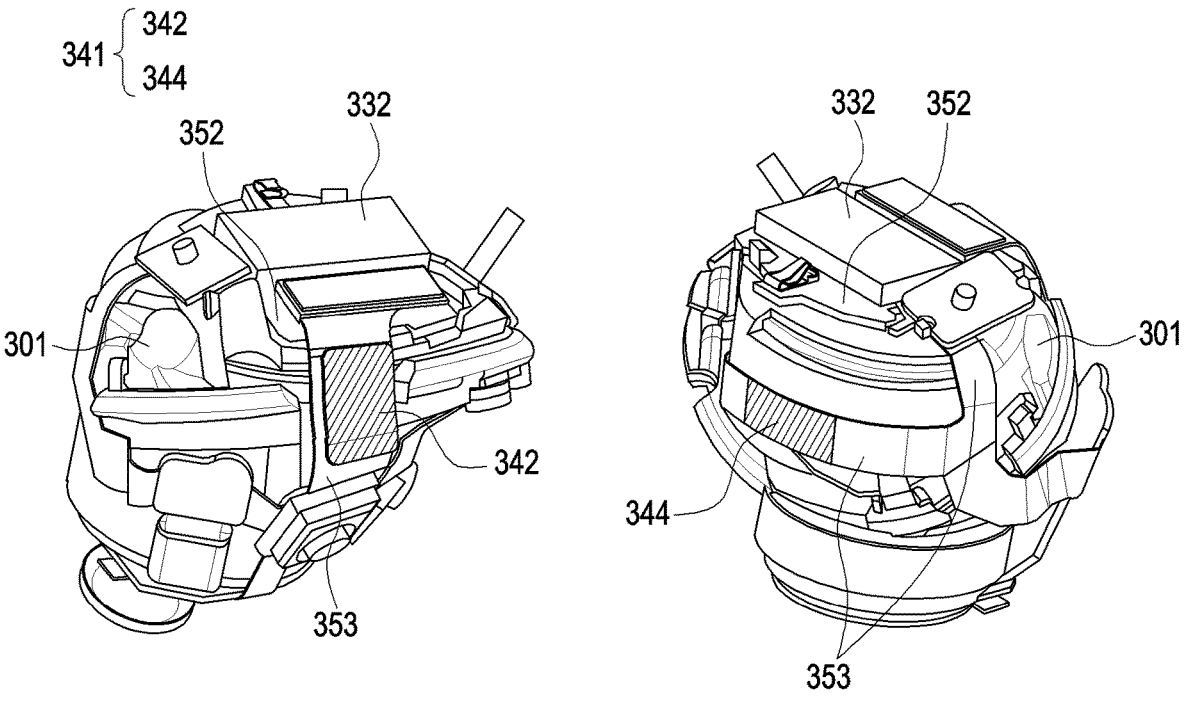

FIG. 2 is a perspective view illustrating a wearable electronic device according to an embodiment of the disclosure. FIGS. 3A and 3B are diagrams illustrating the wearable electronic device of FIG. 2 in which a portion of a housing is removed according to various embodiments of the disclosure. FIGS. 4A, 4B, and 4C are diagrams illustrating the wearable electronic device from various angles according to various embodiments of the disclosure.

Referring to FIGS. 2, 3A, 3B, and 4A to 4C, a wearable electronic device 300 may include a first part 310 inserted into an ear canal of a user to transmit sound to the user and a second part 320 to be mounted on a portion of the user's ear. The description of the electronic device 101 made with reference to FIG. 1 is adaptively applicable to the wearable electronic device 300 of FIGS. 2, 3A, 3B, and 4A to 4C.

According to an embodiment, the first part 310 may extend from at least a portion of the second part 320. In an embodiment, the first part 310 may extend in a first direction (e.g., a +X direction in FIG. 2) from a portion of the second part 320 having a relatively large area, to be closely inserted into the ear canal of the user. At least a portion (e.g., an extension portion 312) of the first part 310 extending from the second part 320 may have a smaller width than the second part 320. In some embodiments, the first part 310 may include an ear tip 314. The ear tip 314 may be disposed on or coupled to an end of the first part 310, which faces the first direction (e.g., the +X direction in FIG. 2). For example, the ear tip 314 may be disposed on or coupled to an end of the extension portion 312, which faces the first direction (e.g., the +X direction in FIG. 2). In an embodiment, the ear tip 314 may be formed of an elastic material. For example, the ear tip 314 may include a rubber material. When at least a portion of the first part 310 is inserted into the ear canal of the user through the ear tip 314, the ear tip 314 may be in close contact with the ear canal of the user.

In an embodiment, the wearable electronic device 300 may include an internal bracket 301. The internal bracket 301 may support various components such as a circuit board 352, a main touch sensor 332, and an auxiliary touch sensor 341 within the wearable electronic device 300. For example, the internal bracket 301 may support various components within the wearable electronic device 300, and a housing 322 may be disposed to surround and protect them.

According to an embodiment, the second part 320 may include a first touch area 324 and a second touch area 326. In an embodiment, the first touch area 324 may refer to a portion of the housing 322, which faces a second direction (e.g., a –X direction in FIG. 2). The second touch area 326 may refer to an area adjacent to the first touch area 324 and disposed along a perimeter of the housing 322. According to an embodiment, the first touch area 324 may be defined and interpreted as facing the first direction, and the second touch area 326 may be defined and interpreted as facing the second direction. The second direction in which the second touch area 326 faces may be different from or substantially the same as the first direction in which the first touch area 324 faces.

According to an embodiment, the wearable electronic device 300 may include the circuit board 352, the main touch sensor 332 (e.g., the sensor module 176 in FIG. 1) electrically connected to the circuit board 352, and the auxiliary touch sensor 341 (e.g., the sensor module 176 in FIG. 1) electrically connected to the circuit board 352. In an embodiment, the main touch sensor 332 may be disposed below the first touch area 324, and the auxiliary touch sensor 341 may be disposed below at least a portion of the second touch area 326.

According to an embodiment, the main touch sensor 332 may include a touch sensor capable of sensing an external input. For example, the main touch sensor 332 may detect a user input and/or a touch input from the outside of the housing 322 and transmit it to a processor (e.g., the processor 120 in FIG. 1). In an embodiment, the main touch sensor 332 may generate an electrical signal by detecting a change in capacitance and transmit the electrical signal to the processor (e.g., the processor 120 in FIG. 1). In some embodiments, the main touch sensor 332 may include various means for generating an electrical signal by detecting a user input and/or a touch input from the outside of the housing 322 and transmitting the electrical signal to the processor (e.g., the processor 120 in FIG. 1).

According to an embodiment, each of a first auxiliary touch sensor 342 and a second auxiliary touch sensor 344 of the auxiliary touch sensor 341 may include a touch sensor capable of detecting an external input. For example, each of the first auxiliary touch sensor 342 and the second auxiliary touch sensor 344 may detect a user input and/or a touch input from the outside of the housing 322 and transmit it to the processor (e.g., the processor 120 in FIG. 1). In an embodiment, each of the first auxiliary touch sensor 342 and the second auxiliary touch sensor 344 may generate an electrical signal by detecting a change in capacitance and transmit the electrical signal to the processor (e.g., the processor 120 in FIG. 1). In some embodiments, each of the first auxiliary touch sensor 342 and the second auxiliary touch sensor 344 may include various means for generating an electrical signal by detecting a user input and/or a touch input from the outside of the housing 322 and transmitting the electrical signal to the processor (e.g., the processor 120 in FIG. 1).

According to an embodiment, the circuit board 352 may be any one of a printed circuit board (PCB), a flexible circuit board (FPCB), and a rigid-flexible PCB (RF-PCB).

According to an embodiment, the wearable electronic device 300 may further include a connecting board 353. The connecting board 353 may be an FPCB which is at least partially electrically connected to the circuit board 352. As the connecting board 353 is prepared as an FPCB, a conductive path between a plurality of components may be secured in a limited internal space of the housing 322.

According to an embodiment, the auxiliary touch sensor 341 may be disposed or mounted on the connecting board 353. According to an embodiment, the first auxiliary touch sensor 342 of the auxiliary touch sensor 341 may be disposed or mounted on at least a portion of the connecting board 353, and the second auxiliary touch sensor 344 of the auxiliary touch sensor 341 may be disposed or mounted on a portion of the connecting board 353 other than the at least portion of the connecting board 353.

According to an embodiment, the first auxiliary touch sensor 342 and the second auxiliary touch sensor 344 may be electrically connected to the processor (e.g., the processor 120 in FIG. 1) through the connecting board 353 and the circuit board 352. In an embodiment, the processor may transmit or receive data or a signal to or from the first auxiliary touch sensor 342 and/or the second auxiliary touch sensor 344 through the circuit board 352 and the connecting board 353.

According to an embodiment, the main touch sensor 332 and the auxiliary touch sensor 341 may detect an external touch and transmit information related to the touch to the processor (e.g., the processor 120 in FIG. 1). In an embodiment, an element (not shown) for implementing the processor (e.g., the processor 120 in FIG. 1) may be disposed on the circuit board 352. The processor (e.g., the processor 120 in FIG. 1) may control an operation of the wearable electronic device 300 based on touch information obtained from the plurality of touch sensors 332 and 341, which will be described later.

According to an embodiment, the auxiliary touch sensor 341 may include the first auxiliary touch sensor 342 and the second auxiliary touch sensor 344. In an embodiment, each of the first auxiliary touch sensor 342 and the second auxiliary touch sensor 344 may be disposed below the second touch area 326. In some embodiments, the first auxiliary touch sensor 342 and the second auxiliary touch sensor 344 may be disposed to face each other below the second touch area 326. For example, when the second part 320 is viewed from above (e.g., from the −X direction to the +X direction in FIG. 2), the second part 320 may have a substantially elliptical or circular shape, and the first auxiliary touch sensor 342 and the second auxiliary touch sensor 344 may be disposed to face each other with respect to a short or long side of the ellipse formed by the second part 320. In some embodiments, the auxiliary touch sensor 341 may further include third and fourth auxiliary touch sensors (not shown), which may also be disposed to face each other. Further, in some embodiments, the auxiliary touch sensor 341 may be provided as a single extended touch sensor (i.e., the first auxiliary touch sensor 342 and the second auxiliary touch sensor 344 may be integrated). In this case, the auxiliary touch sensor 341 may be disposed extending along the second touch area 326.

According to an embodiment, the second part 320 may include a lower area 321 continuous with the extension portion 312. The lower area 321 may be configured to be seated in at least a partial area of the user's ear.

With reference to the drawings, various embodiments of the wearable electronic device 300 according to an embodiment will be described below.

Figure 5:
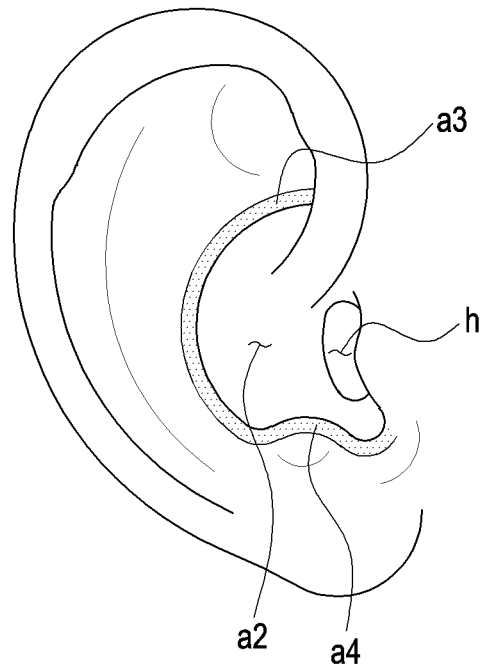
FIG. 5 is a diagram illustrating a user's ear on which a wearable electronic device is to be mounted according to an embodiment of the disclosure.
Figure 6:
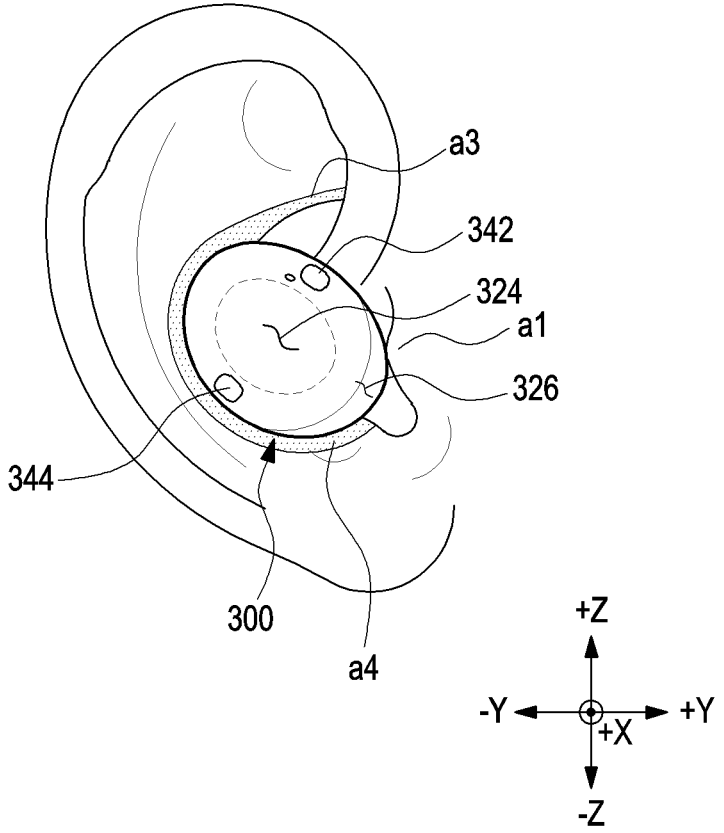
FIG. 6 is a diagram illustrating a wearable electronic device mounted on a user's ear according to an embodiment of the disclosure.
Figure 7:
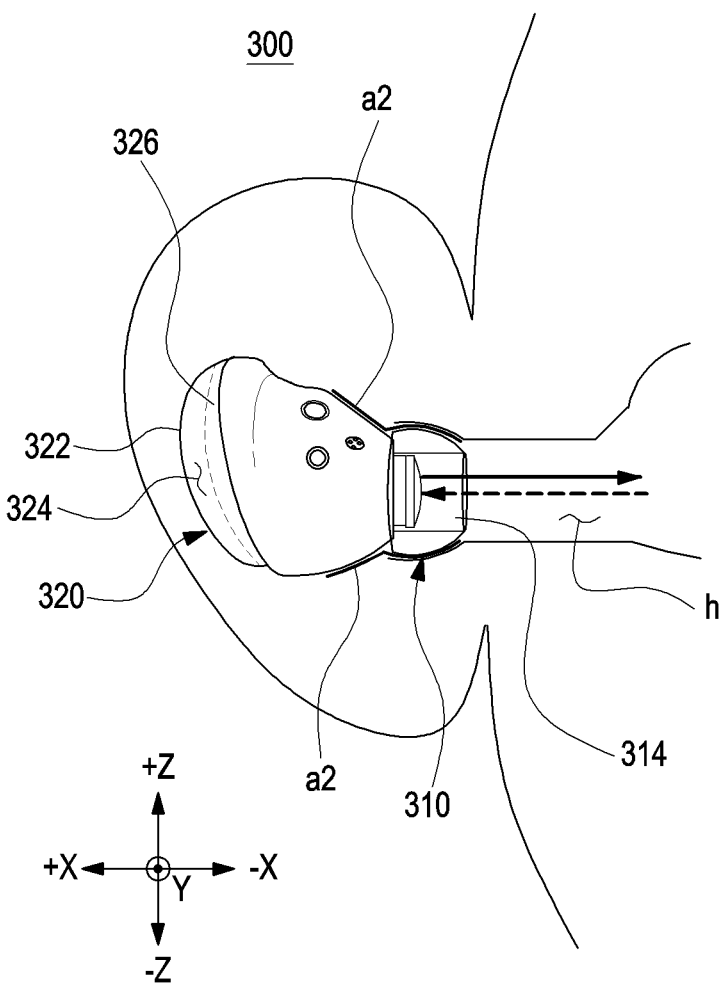
FIG. 7 is a diagram illustrating a wearable electronic device mounted on a user's ear, viewed from a different angle according to an embodiment of the disclosure.
Figure 8:
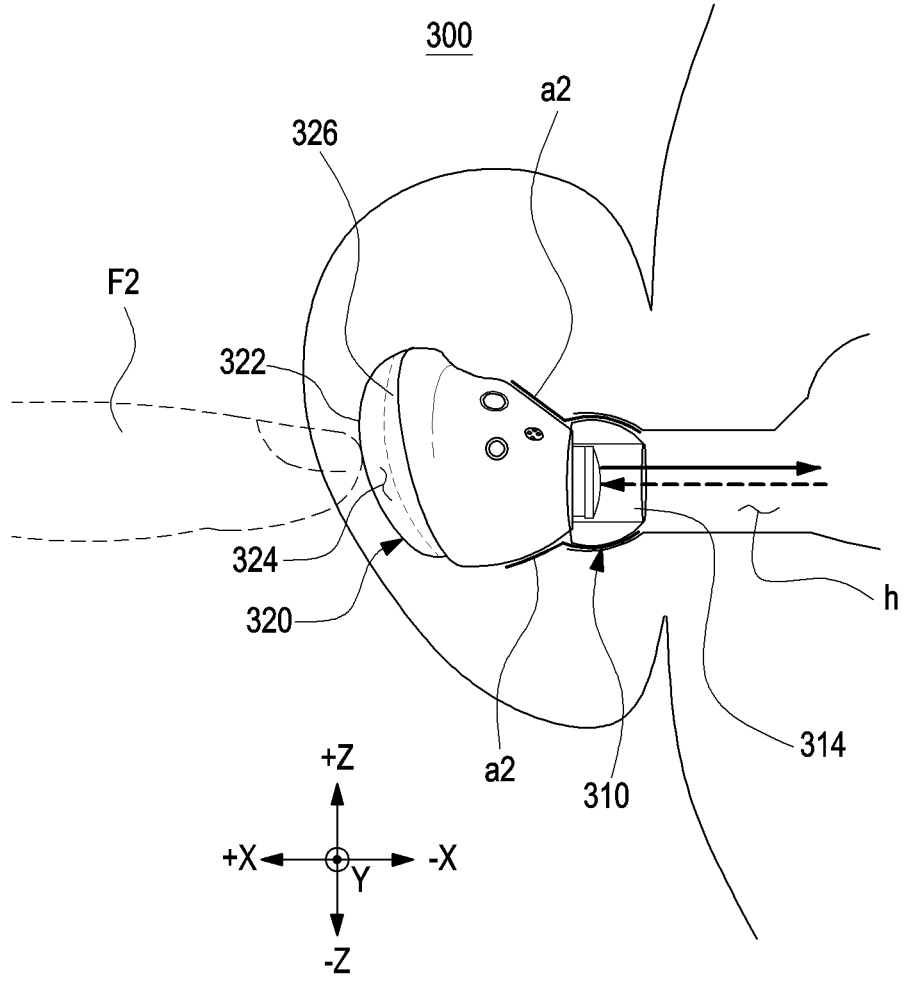
FIG. 8 is a diagram illustrating an implementation example of a wearable electronic device controlled through a first touch area according to an embodiment of the disclosure.
Figure 9:
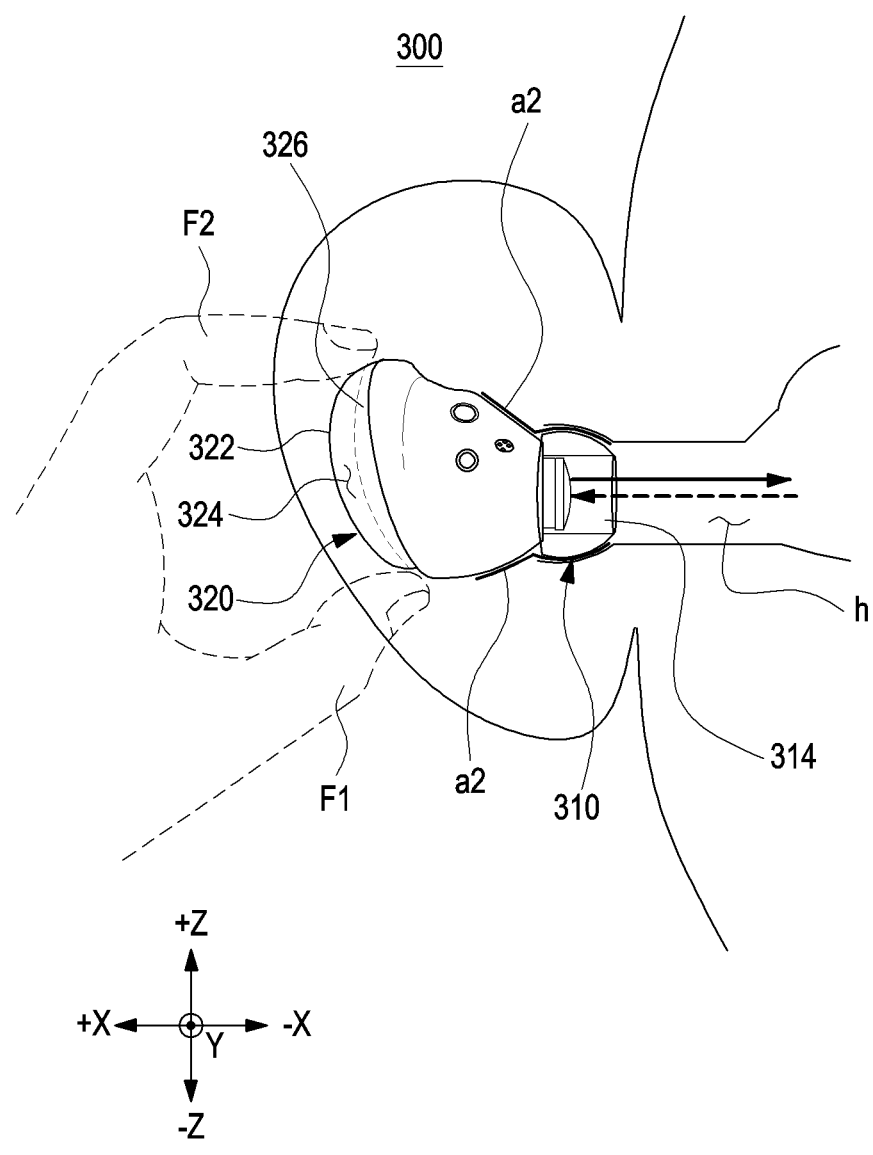
FIG. 9 is a diagram illustrating an implementation example of a wearable electronic device maintaining an operation state through an auxiliary touch area according to an embodiment of the disclosure.

FIG. 5 is a diagram illustrating a user's ear on which a wearable electronic device is to be mounted according to an embodiment of the disclosure. FIG. 6 is a diagram illustrating the wearable electronic device mounted on the user's ear according to an embodiment of the disclosure. FIG. 7 is a diagram illustrating the wearable electronic device mounted on the user's ear, viewed from a different angle according to an embodiment of the disclosure. FIG. 8 is a diagram illustrating an implementation example of the wearable electronic device controlled through a first touch area according to an embodiment of the disclosure. FIG. 9 is a diagram illustrating an implementation example of the wearable electronic device in an operation state maintained through a second touch area according to an embodiment of the disclosure.

Referring to FIGS. 5 to 9, the wearable electronic device 300 may be worn on the user's ear. The description of the wearable electronic device 300 made with reference to FIGS. 2, 3A, 3B, and 4A to 4C is applicable wholly or partially to the wearable electronic device 300 of FIGS. 5 to 9. In describing FIGS. 5 to 9, reference numerals in FIGS. 2, 3A, 3B, and 4A to 4C may be incorporated by reference.

According to an embodiment, the wearable electronic device 300 may be seated on a concha a2. In an embodiment, the first part 310 may be inserted into an ear canal h of the user, and the lower area 321 of the second part 320 may be seated on the concha a2 of the user. In some embodiments, at least a portion of a lateral (Y-axis and/or Z-axis direction) edge area of the second part 320 may be mounted to be surrounded by an antihelix a3 and/or antitragus a4 of the user. As the lateral edge area of the second part 320 is disposed to be surrounded by the portions a3 and a4 of the user's ear, the wearable electronic device 300 may be inhibited from slipping away from the user's ear.

According to an embodiment, when the wearable electronic device 300 is mounted on the user's ear, the first touch area 324 may face in a direction substantially opposite to the ear canal h of the user. Further, because the second touch area 326 is disposed along the perimeter of the second part 320 below the first touch area 324, the second touch area 326 may face in a direction which is a combination of the Z-axis direction and/or the Y-axis direction.

According to an embodiment, with the wearable electronic device 300 seated on the user's ear, the user may control the wearable electronic device 300 by touching at least a partial area of the wearable electronic device 300. In an embodiment, the user may control an operation of the wearable electronic device 300 by touching the first touch area 324. For example, when an external touch is applied to the first touch area and thus the main touch sensor 332 detects the external touch, the processor (e.g., the processor 120 in FIG. 1) may stop sound output from the wearable electronic device 300 or play stopped sound. In some embodiments, a plurality of touches may be applied to the first touch area 324. For example, when a plurality of touches are applied to the first touch area 324, the processor (e.g., the processor 120 in FIG. 1) may control to skip forward to next music or backward to previous music in the wearable electronic device 300.

For ease of description, the wearable electronic device 300 may be defined to have various operation states in the above description and following description of the disclosure. For example, the operation states of the wearable electronic device 300 may include a state in which the wearable electronic device 300 is playing music, a state in which music is stopped, a state in which next music is being played, and/or a state in which previous music is being played. However, it will be understood that various operation states may be implemented. That is, as described above, it may also be said that the user may change the operation state of the wearable electronic device 300 by touching the first touch area 324.

According to an embodiment, when a user touch is applied to the second touch area 326 with the wearable electronic device 300 seated on the user's ear, the processor (e.g., the processor 120 in FIG. 1) may maintain the operation state of the wearable electronic device 300. For example, when a user touch is applied to the second touch area 326, and the auxiliary touch sensor 341 transmits touch information to the processor (e.g., the processor 120 in FIG. 1), the processor (e.g., the processor 120 in FIG. 1) may maintain the operation state of the wearable electronic device 300. In some embodiments, when a touch is applied to both the first touch area 324 and the second touch area 326, the processor (e.g., the processor 120 in FIG. 1) may maintain the operation state of the wearable electronic device 300.

According to an embodiment, the first touch area 324 may face in the direction (+X-axis direction) substantially opposite to the ear canal h, as described above. In an embodiment (referring to FIG. 9), the user may control the wearable electronic device 300 by easily touching the first touch area 324 with the user's index finger F2 or middle finger.

In some embodiments, the user needs to reposition the wearable electronic device 300 mounted on the ear. For example, upon occurrence of an event which may reposition the wearable electronic device 300 (e.g., when the user exercises at a vigorous intensity or an impact is applied to the wearable electronic device 300), the wearable electronic device 300 is moved from the user's ear (e.g., the wearable electronic device 300 slips away from the concha a1), and the user needs to reseat the wearable electronic device 300 at a correct position.

According to an embodiment, the user may reposition of the wearable electronic device 300 using at least two fingers. For example (referring to FIG. 9), the user may hold the wearable electronic device 300 with the user's index finger F2 and thumb F1 and reposition the wearable electronic device 300 in the user's ear. In this case, the auxiliary touch sensor 341 located below the second touch area 326 may detect the external touch, and the processor (e.g., processor 120 in FIG. 1) may maintain the operation state of the wearable electronic device 300. Accordingly, even if the user applies an unintentional touch to the first touch area 324 to reposition the wearable electronic device 300, the operation state of the wearable electronic device 300 may be maintained.

In an example, the first auxiliary touch sensor 342 and the second auxiliary touch sensor 344 may be disposed to face each other, as described above. When the user holds the wearable electronic device 300 with two or more fingers (e.g., the index finger F2 and the thumb F1), the arrangement of the first auxiliary touch sensor 342 and the second auxiliary touch sensor 344 may correspond to at least a partial area of the wearable electronic device 300, which is mainly touched by the user. In other words, the user may often grab an edge area (e.g., a Z-axis direction edge area and/or a Y-axis direction edge area) of the second part 320 of the wearable electronic device 300 using the thumb F1 and the index finger F2, and the edge area of the second part 320 may be provided as the second touch area 326 to prevent an unintentional change in the operation state, when the user repositions the wearable electronic device 300. While the first auxiliary touch sensor 342 and the second auxiliary touch sensor 344 have been described as disposed to face each other, for convenience of description, it will be understood that the above description is also applicable to a case where the auxiliary touch sensor 341 is disposed extending along the second touch area 326 or a case where an additional auxiliary touch sensor is included.

Figure 10:
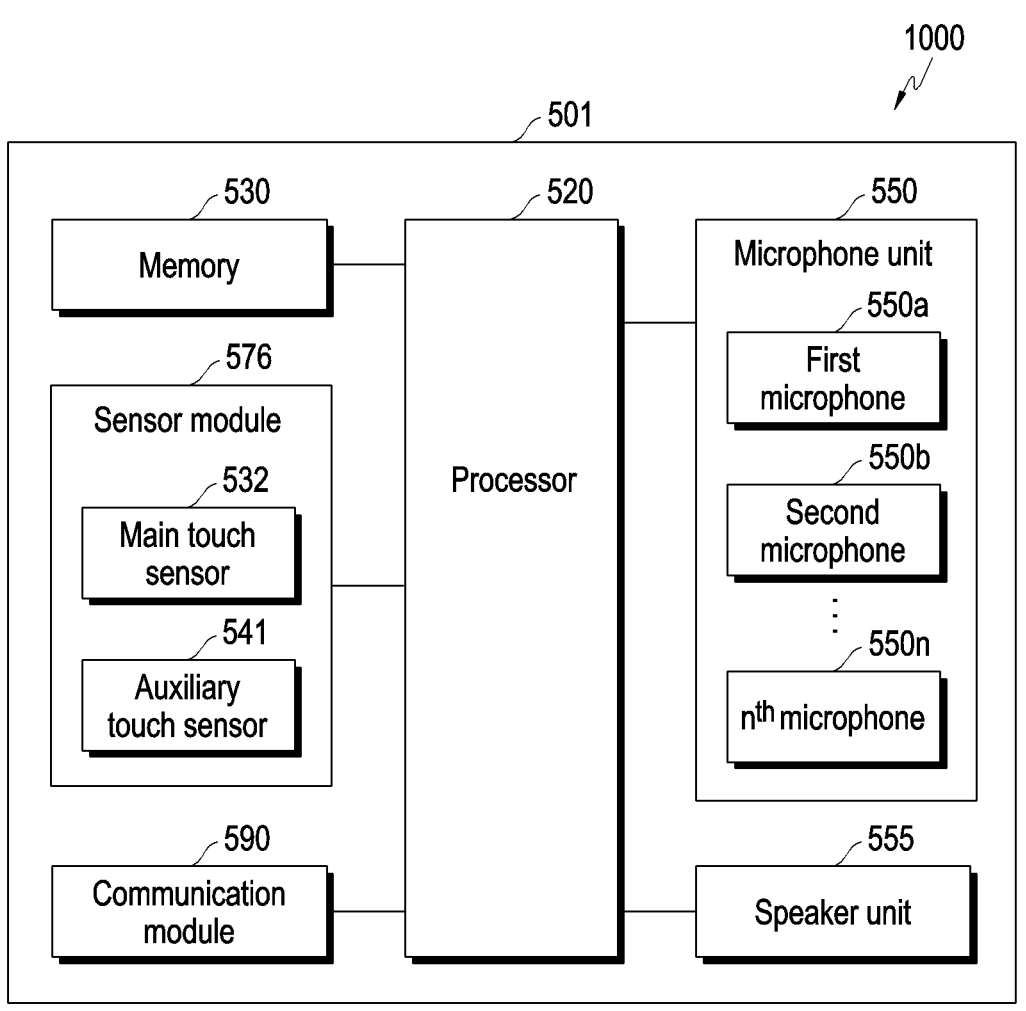
FIG. 10 is a block diagram illustrating a wearable electronic device according to an embodiment of the disclosure.
Figure 11:
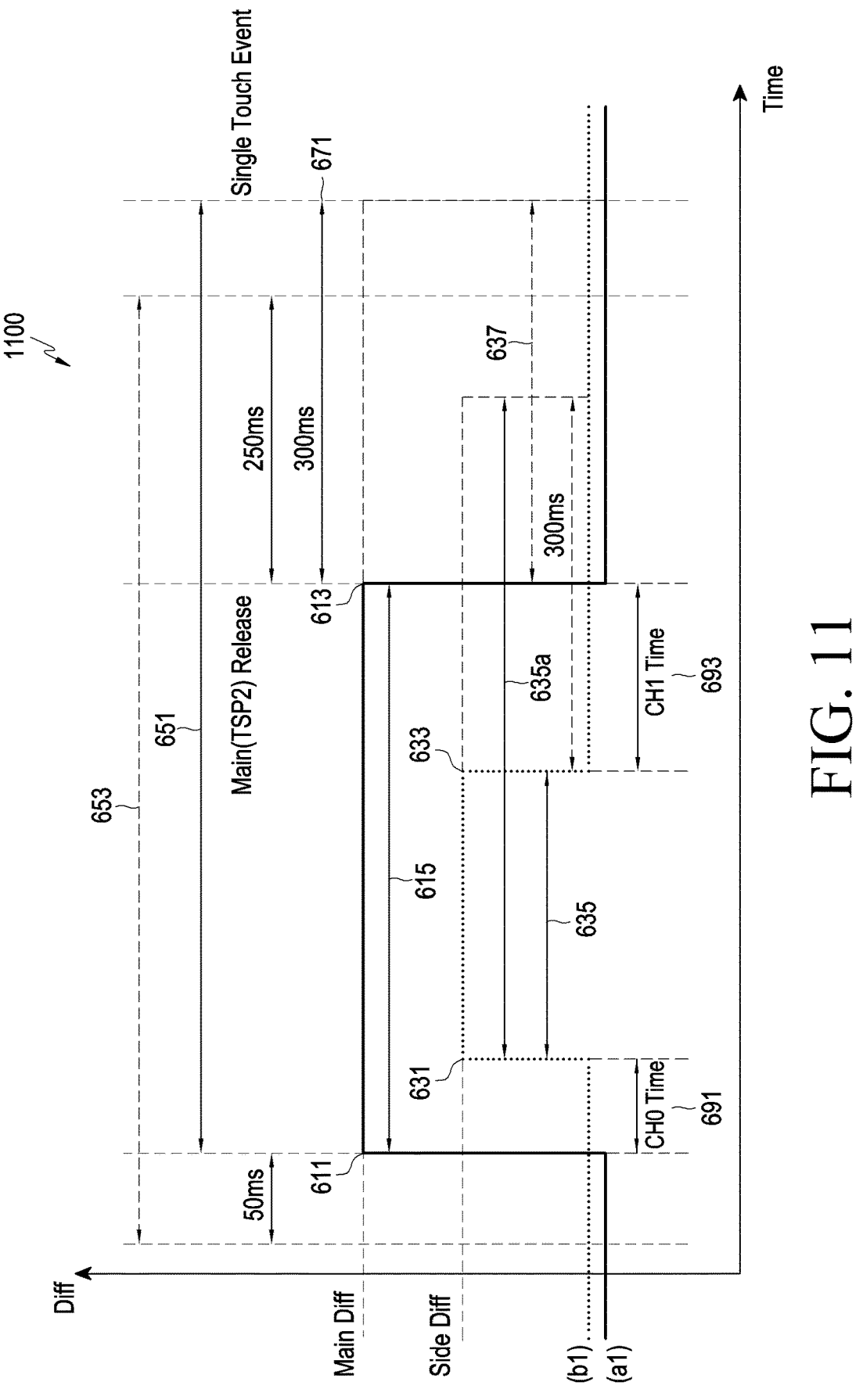
FIG. 11 is a diagram illustrating processing of a single touch event in a wearable electronic device according to an embodiment of the disclosure.
Figure 12:
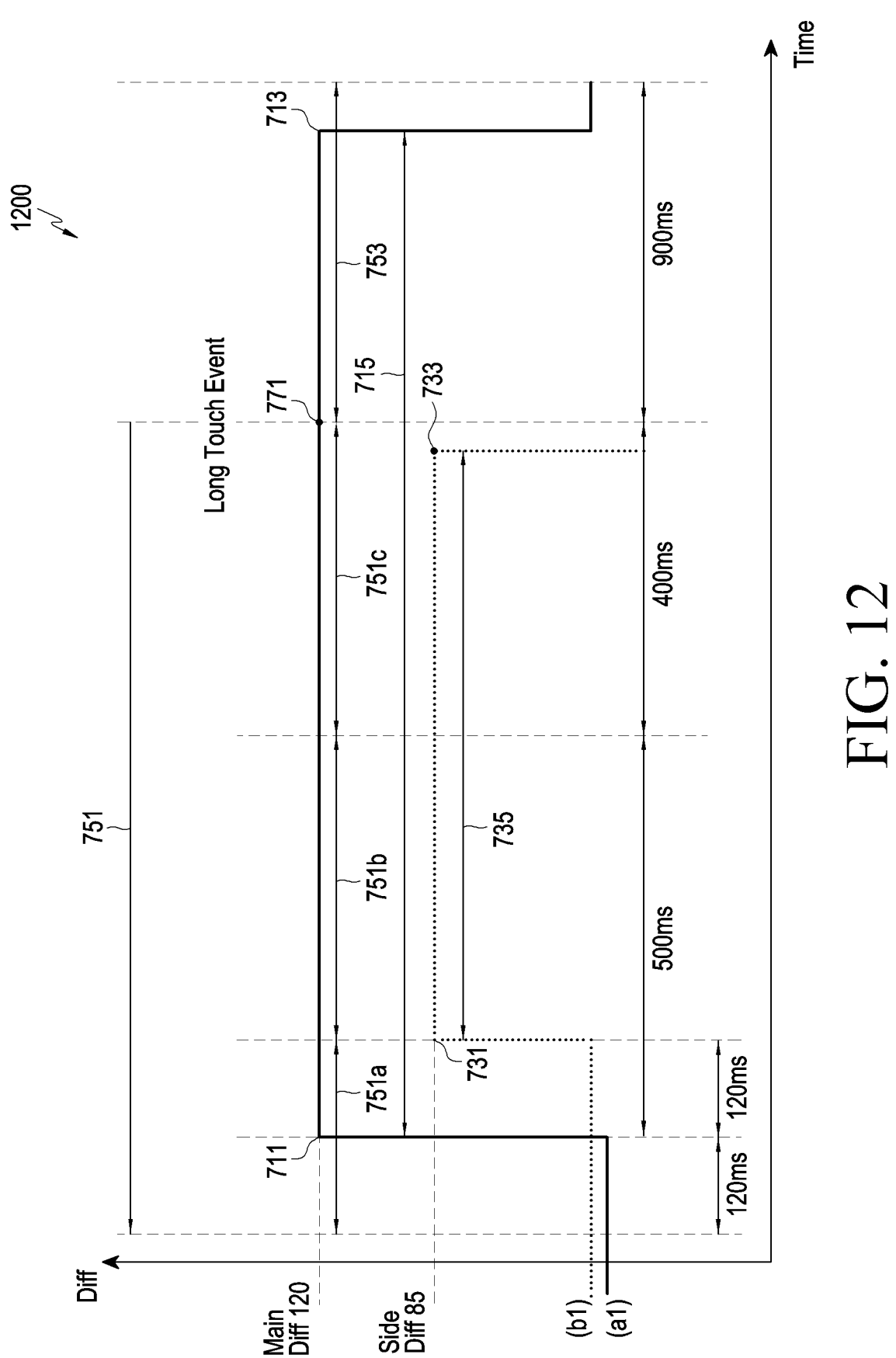
FIG. 12 is a diagram illustrating processing of a long touch event in a wearable electronic device according to an embodiment of the disclosure.

FIG. 10 is a block diagram 1000 illustrating a wearable electronic device according to an embodiment of the disclosure. FIG. 11 is a diagram 1100 illustrating processing of a single touch event in the wearable electronic device according to an embodiment of the disclosure. FIG. 12 is a diagram 1200 illustrating processing of a long touch event in the wearable electronic device according to an embodiment of the disclosure.

According to an embodiment, an electronic device 501 may be an audio device.

Referring to FIG. 10, according to an embodiment, the electronic device 501 may include a sensor module 576, a processor 520, memory 530, a communication module 590, a microphone unit 550, and a speaker 555.

At least some of the components of the electronic device 501 illustrated in FIG. 10 may be the same as or similar to those of the electronic device 101 in FIG. 1 and/or the electronic device 300 illustrated in FIGS. 2, 3A, 3B, 4A to 4C, and 5 to 9, and a redundant description will be avoided herein.

According to an embodiment, the electronic device 501 (e.g., the wearable electronic device 300 in FIG. 2) may include a body and a plurality of (e.g., at least two) ear tips (e.g., the ear tips 314 in FIGS. 3A and 3B), and the component(s) described with reference to FIGS. 3A and 3B may be substantially accommodated in the housing 322 of FIG. 2.

According to an embodiment, the sensor module 576 may be implemented substantially the same as or similar to the sensor module 176 of FIG. 1.

According to an embodiment, the sensor module 576 may include a main touch sensor (electrode) 532 (e.g., the main touch sensor 332 in FIGS. 2 and 4A to 4C) and at least one auxiliary touch sensor (electrode) 541 (e.g., the auxiliary touch sensor 341 in FIGS. 2 and 4A to 4C).

According to an embodiment, in a housing (322 in FIG. 2) including a first part (e.g., the second part 320 in FIG. 2) at least partially exposed to the outside to receive a touch by being seated on at least a portion of the user's body, and a second part (the first part 310 in FIGS. 2, 3A, and 3B) extending from the first part, and configured to be concealed by the first part by being inserted into an ear canal of the user, when the first part includes a first touch area (e.g., the first touch area 324 in FIGS. 2 and 4A) facing a first direction (e.g., the −X direction in FIG. 2) and a second touch area (e.g., the second touch area 326 in FIGS. 2 and 4A) disposed on at least a portion of a lateral edge of the first part, which is adjacent to the first touch area and faces a second direction (e.g., the +X direction in FIG. 2), the main touch sensor 532 (e.g., the main touch sensor 332 in FIGS. 3A, 3B, and 4A to 4C) may be disposed below the first touch area, and the auxiliary touch sensor 541 (e.g., the auxiliary touch sensor 341 in FIGS. 3A, 3B, and 4A to 4C) may be disposed below the second touch area.

According to an embodiment, the sensor module 576 (e.g., the sensor module 176 in FIG. 1) may generate an electrical signal or data value corresponding to an internal operation state of the electronic device 501 or an external environmental state. In some embodiments, the sensor module 576 may detect whether the ear tip(s) 314 of FIG. 2 is coupled to the housing 322, identify the ear tip(s) 314 coupled to the housing 322, and/or detect whether the electronic device 501 is worn by the user. According to an embodiment, the processor 520 may be implemented substantially the same as or similar to the processor 120 of FIG. 1.

According to an embodiment, the processor 520 may control at least one other component connected to the processor 520 by executing software (e.g., the program 140 in FIG. 1), and perform wireless communication with an external electronic device (e.g., the electronic device 102 or 104 in FIG. 1) using the communication module 590 (e.g., the communication module 190 in FIG. 1).

According to an embodiment, information about user settings set on an external electronic device may be received through the communication module 590, and the processor 520 may control the wearable electronic device 501 (e.g., the speaker unit 555) based on the information received through the communication module 590.

According to an embodiment, the processor 520 may transmit information about a current operation state to an external electronic device through the communication module 590, and the user may identify the operation state of the electronic device 501 through the external electronic device.

According to an embodiment, the processor 520 may adjust an operational property of the speaker unit 555 based on information sensed or detected by the sensor module 576. The operational property of the speaker unit 555 may include at least one of a parameter related to an equalizer filter, a parameter related to an equalizer gain, a parameter related to acoustic echo cancellation (AEC), a parameter related to active noise cancellation (ANC), and/or a parameter related to noise reduction.

According to an embodiment, upon receipt of a main touch signal and an auxiliary touch signal from the main touch sensor 532 and the auxiliary touch sensor 541, respectively, the processor 520 may perform a first computation operation of detecting a debounce period of the main touch signal, which represents the length of the main touch signal, and a debounce period of the auxiliary touch signal, which represents the length of the auxiliary touch signal.

According to an embodiment, when a touch sensitivity of the auxiliary touch signal received from the auxiliary touch sensor 541 is equal to or greater than a threshold, the processor 520 may perform the first computation operation.

According to an embodiment, in the first computation operation, the processor 520 may calculate a sensitivity difference (e.g., diff) of an electrode signal according to touch sensitivities based on the main touch signal received from the main touch sensor 532, and based on the calculation of the sensitivity difference of the electrode signal, detect a time point when the main touch signal reaches a first rising threshold point (e.g., 120 diff) as an operation start time of the main touch signal, and detect a time point when the main touch signal falls to or below a first falling threshold point (e.g., 90 diff) after reaching the first rising threshold point, as an operation release time of the main touch signal. The processor 520 may detect a time period from the operation start time of the main touch signal to the operation release time of the main touch signal as a debounce period of the main touch signal.

Referring to FIG. 11, the processor 520 may detect a time point when a main touch signal a1 reaches the first rising threshold point (e.g., 120 diff) as an operation start time 611 of the main touch signal, and a time point when the main touch signal falls to or below the first falling threshold point (e.g., 90 diff) after reaching the first rising threshold point, as an operation release time 613 of the main touch signal, and detect a time period from the operation start time 611 of the main touch signal to the operation release time 613 of the main touch signal as a debounce period 615 of the main touch signal.

Referring to FIG. 12, the processor 520 may detect a time point when the main touch signal a1 reaches the first rising threshold point (e.g., 120 diff) as an operation start time 711 of the main touch signal, and a time point when the main touch signal falls to or below the first falling threshold point (e.g., 90 diff) after reaching the first rising threshold point, as an operation release time 713 of the main touch signal, and detect a time period from the operation start time 711 of the main touch signal to the operation release time 713 of the main touch signal as a debounce period 715 of the main touch signal.

According to an embodiment, in the first computation operation, the processor 520 may calculate the average value of every N auxiliary touch signals received from the auxiliary touch sensor 541, calculate a sensitivity difference (e.g., diff) of an electrode signal according to touch sensitivities based on the average value, and based on the calculation of the sensitivity difference of the electrode signal, detect a time point when the auxiliary touch signal reaches a second rising threshold point (e.g., 60 diff) as an operation start time of the auxiliary touch signal, and detect a time point when the auxiliary touch signal falls to or below a second falling threshold point (e.g., 55 diff) after reaching the second rising threshold point as an operation release time of the auxiliary touch signal. The processor 520 may detect a time period from the operation start time of the auxiliary touch signal to the operation release time of the auxiliary touch signal as a first debounce period of the auxiliary touch signal. The first debounce period of the auxiliary touch signal may be used to determine whether a single touch signal is valid.

Referring to FIG. 11, the processor 520 may detect a time point when the auxiliary touch signal reaches the second rising threshold point (e.g., 60 diff) as an operation start time 631 of the auxiliary touch signal, and a time point when the auxiliary touch signal falls to or below a second falling threshold point (e.g., 55 diff) after reaching the second rising threshold point as an operation release time 633 of the auxiliary touch signal, and detect a time period from the operation start time 631 of the auxiliary touch signal to the operation release time 633 of the auxiliary touch signal as a first debounce period 635 of the auxiliary touch signal, which may be used to determine whether a single touch signal is valid.

According to an embodiment, in the first computation operation, the processor 520 may calculate a sensitivity difference (e.g., diff) of an electrode signal according to touch sensitivities, based on the auxiliary touch signal received from the auxiliary touch sensor 541, and based on the calculation of the sensitivity difference of the electrode signal, detect a time point when the auxiliary touch signal reaches a third rising threshold point (e.g., 85 diff) as an operation start time of the auxiliary touch signal, and detect a time point when the auxiliary touch signal falls to or below a third falling threshold point (e.g., 75 diff) after reaching the third rising threshold point as an operation release time of the auxiliary touch signal. The processor 520 may detect a time period from the operation start time of the auxiliary touch signal to the operation release time of the auxiliary touch signal as a second debounce period of the auxiliary touch signal. The second debounce period of the auxiliary touch signal may be used to determine whether a long touch signal is valid.

Referring to FIG. 12, the processor 520 may detect a time point when an auxiliary touch signal b1 reaches the third rising threshold point (e.g., 85 diff) as an operation start time 731 of the auxiliary touch signal, and a time point when the auxiliary touch signal falls to or below the third falling threshold point (e.g., 75 diff) after reaching the third rising threshold point as an operation release time 733 of the auxiliary touch signal, and detect a time period from the operation start time 731 of the auxiliary touch signal to the operation release time 733 of the auxiliary touch signal as a second debounce period 735 of the auxiliary touch signal, which may be used to determine whether a long touch signal is valid and/or invalid.

According to an embodiment, after performing the first computation operation, the processor 520 may set at least one period for processing the main touch signal as valid and/or invalid based on the debounce period of the main touch signal, and perform a second computation operation for processing the main touch signal as valid and/or invalid based on whether a debounce period of the auxiliary touch signal is included in the at least one period.

According to an embodiment, in the second computation operation, when the debounce period of the main touch signal detected in the first computation operation is equal to or less than a first threshold period (e.g., 900 ms), the processor 520 may set an auxiliary touch detection period for determining whether the single touch signal is valid.

According to an embodiment, the processor 520 may set a time period from the operation start time of the main touch signal to a first predetermined time (e.g., 300 ms) after the operation release time of the main touch signal as a first auxiliary touch detection period.

According to an embodiment, the processor 520 may set a time period from a second predetermined time (e.g., 50 ms) before the operation start time of the main touch signal to a third predetermined time (e.g., 250 ms) after the operation release time of the main touch signal as a second auxiliary touch detection period.

According to an embodiment, the processor 520 may selectively use the first auxiliary touch detection period and the second auxiliary touch detection period as an auxiliary touch detection period according to the performance or configuration of the wearable electronic device 501.

According to an embodiment, in the second computation operation, when the first debounce period of the auxiliary touch signal detected in the first computation operation is equal to or greater than a second threshold period (e.g., 80 ms), the processor 520 may extend the first debounce period of the auxiliary touch signal by the first predetermined time (e.g., 30 ms) after the first debounce period, and when the first debounce period of the auxiliary touch signal extended by the first predetermined time is at least partially included in the auxiliary touch detection period, process the main touch signal as invalid.

Referring to FIG. 11, in the second computation operation, when the debounce period 615 of the main touch signal detected in the first computation operation is equal to or less than the first threshold period (e.g., 900 ms), the processor 520 may set a first auxiliary touch detection period 651 or a second auxiliary touch detection period 653 to determine whether the single touch signal is valid. When the first debounce period 635 of the auxiliary touch signal is equal to or greater than the second threshold (e.g., 80 ms), the processor 520 may set a first debounce period 635*a* by extending the first debounce period of the auxiliary touch signal by the first predetermined time (e.g., 30 ms) after it, and when the first debounce period 635*a* of the auxiliary touch signal extended by the first predetermined time is at least partially included in the auxiliary touch detection period (e.g., the second auxiliary touch detection period 653), process the main touch signal as invalid.

According to an embodiment, in the second computation operation, when the first debounce period of the auxiliary touch signal is equal to or less than the second threshold period (e.g., 80 ms), the processor 520 may identify the main touch signal as valid and generate a single touch event at a time 671 after the first predetermined time (e.g., 300 ms) from the operation release time of the main touch signal.

According to an embodiment, in the second computation operation, when the first debounce period of the auxiliary touch signal extended by the first predetermined time (e.g., 300 ms) is not at least partially included in the auxiliary touch detection period, the processor 520 may identify the main touch signal as valid and generate a single touch event at the time 671 after the first predetermined time (e.g., 300 ms) from the operation release time of the main touch signal.

Referring to FIG. 11, in the second computation operation, when the first debounce period of the auxiliary touch signal is equal to or less than the second threshold period (e.g., 80 ms) or the first debounce period 635*a* of the auxiliary touch signal extended by the first predetermined time (e.g., 300 ms) is not at least partially included in the auxiliary touch detection period (e.g., the second auxiliary touch detection period 653), the processor 520 may identify the main touch signal as valid and generate a single touch event at the time 671 after the first predetermined time (e.g., 300 ms) from the operation release time 613 of the main touch signal.

According to an embodiment, in the second computation operation, when the debounce period of the main touch signal detected in the first computation operation is equal to or greater than the first threshold period (e.g., 900 ms), the processor 520 may set a plurality of detection periods to determine whether a long touch signal is valid.

According to an embodiment, the plurality of detection periods may include a first period including a fourth predetermined time (e.g., 1200 ms) before the operation start time of the main touch signal to the fourth predetermined time (e.g., 1200 ms) after the operation release time of the main touch signal, a second period including a fifth predetermined time (e.g., 500 ms) from an end time of the first period, and a third period including a sixth predetermined time (e.g., 400 ms) from an end time of the second period.

According to an embodiment, in the second computation operation, when the second debounce period of the auxiliary touch signal is equal to or greater than a third threshold period (e.g., 1200 ms), the processor 520 may extend the second debounce period of the auxiliary touch signal by the first predetermined time (e.g., 300 ms), and when the extended second debounce period of the auxiliary touch signal is at least partially included in the plurality of detection periods, process the main touch signal as invalid.

Referring to FIG. 12, in the second computation operation, when the debounce period 715 of the main touch signal detected in the first computation operation is equal to or greater than the first threshold period (e.g., 900 ms), the processor 520 may set a plurality of detection periods 751 including a first period 751*a*, a second period 751*b*, and a third period 751*c* to determine whether the long touch signal is valid. When the second debounce period 735 of the auxiliary touch signal is equal to or greater than the third threshold period (e.g., 1200 ms), the processor 520 may extend the second debounce period of the auxiliary touch signal by the first predetermined time (e.g., 300 ms), and when the extended second debounce period of the auxiliary touch signal is at least partially included in the plurality of detection periods 751, process the main touch signal as invalid.

According to an embodiment, in the second computation operation, when the second debounce period of the auxiliary touch signal is equal to or less than the third threshold period (e.g., 1200 ms), the processor 520 may identify the main touch signal as valid and generate a long touch event at a start time of the third period of the plurality of detection periods. When the second denounce period of the auxiliary touch signal is maintained equal to or less than the third threshold period (e.g., 1200 ms) even after the long touch event is generated, the processor 520 may generate the long touch event every $7^{th}$ predetermined time (e.g., 900 ms).

According to an embodiment, in the second computation operation, when the debounce period of the auxiliary touch signal is not at least partially included in at least one of the plurality of detection periods, the processor 520 may identify the main touch signal as valid and generate the long touch event at the start time of the third period of the plurality of detection periods. When the denounce period of the auxiliary touch signal is not at least partially included in at least one of the plurality of detection periods even after the long touch event is generated, the processor 520 may generate the long touch event every $7^{th}$ predetermined time (e.g., 900 ms).

Referring to FIG. 12, in the second computation operation, when the second debounce period of the auxiliary touch signal is equal to or less than the third threshold period (e.g., 1200 ms) or the debounce period of the auxiliary touch signal is not at least partially included in at least one of the plurality of detection periods, the processor 520 may identify the main touch signal as valid and generate a long touch event 771 at the start time of the third period of the plurality of detection periods.

According to an embodiment, when the main touch signal is processed as invalid in the second computation operation, the processor 520 may perform a third computation operation to further verify whether the main touch signal is valid.

According to an embodiment, in the case where the processor 520 processes the main touch signal corresponding to a single touch signal as invalid based on the first debounce period of the auxiliary touch signal and the auxiliary touch detection period in the second computation operation, in the third computation operation, the processor 520 may process the main touch signal as invalid when the sum of an absolute time difference between the operation start time of the main touch signal and the operation start time of the auxiliary touch signal and an absolute time difference between the operation release time of the main touch signal and the operation release time of the auxiliary touch signal is equal to or greater than a threshold time (e.g., 80 ms). When the sum is equal to or less than the threshold time (e.g., 80 ms), the processor 520 may identify the main touch signal as valid and generate the single touch event at the time 671 after the first predetermined time (e.g., 300 ms) from the operation release time of the main touch signal.

According to an embodiment, in the third computation operation, when the main touch signal corresponding to a single touch signal is processed as invalid, the processor 520 may set an arbitrary period by extending the first debounce period of the auxiliary touch signal by the first predetermined time (e.g., 300 ms) after the operation release time of the main touch signal processed as invalid. Even if an actual electrode signal of the auxiliary touch sensor is detected as 0 diff, the processor 520 may process a main touch signal, which is received after the main touch signal processed as invalid, as invalid, considering that the auxiliary touch signal has been generated during the arbitrary period.

Referring to FIG. 11, in the third computation operation, when the sum of an absolute time difference 691 (e.g., CH0 Time) between the operation start time 611 of the main touch signal and the operation start time 631 of the auxiliary touch signal and an absolute time difference 693 (e.g., CH1 Time) between the operation release time 613 of the main touch signal and the operation release time 633 of the auxiliary touch signal is equal to or greater than the threshold time (e.g., 80 ms) (e.g., CH0+CH1 Time ≥80 ms), the processor 520 may process the main touch signal a1 as invalid. When the sum is equal to or less than the threshold time (e.g., 80 ms) (e.g., CH0+CH1 Time <80 ms), the processor 520 may identify the main touch signal as valid and generate the single touch event at the time 671 after the first predetermined time (e.g., 300 ms) from the operation release time 613 of the main touch signal. When the sum of the absolute time difference 691 (e.g., CH0 Time) and the absolute time difference 693 (e.g., CH1 Time) is equal to or greater than the threshold time (e.g., 80 ms) (e.g., CH0+CH1 Time≥80 ms) and thus the main touch signal a1 is processed as invalid, the processor 520 may set an arbitrary extended period 637 by extending the first debounce period of the auxiliary touch signal by the first predetermined time (e.g., 300 ms) after the operation release time 613 of the main touch signal processed as invalid. The processor 520 may process a main touch signal, which is received after the main touch signal processed as invalid, as invalid, considering that the auxiliary touch signal has been generated during the arbitrary period.

According to an embodiment, in the case where the processor 520 processes the main touch signal corresponding to a long touch signal as invalid based on the second debounce period of the auxiliary touch signal and the plurality of detection periods in the second computation operation, in the third computation operation, the processor 520 may process the main touch signal as valid and generate a long touch event, when the operation start time of the auxiliary touch signal occurs in the first or second period of the plurality of detection periods, and the auxiliary touch signal is maintained until the third period.

According to an embodiment, in the third computation operation, the processor 520 may process the main touch signal as invalid, when the operation start time of the auxiliary touch signal occurs before the first period of the plurality of detection periods, and the operation release time of the auxiliary touch signal occurs in any one of the first period, the second period, and the third period, or when the operation start time of the auxiliary touch signal occurs in the second period and the operation release time of the auxiliary touch signal occurs in the third period.

According to an embodiment, in the third computation operation, when the main touch signal corresponding to a long touch signal is processed as invalid, the processor 520 may process a main touch signal, which is received after the main touch signal processed as invalid, as invalid by setting any auxiliary touch signal as having occurred during the first predetermined time (e.g., 300 ms) after the operation release time of the main touch signal. The processor 520 may limit the number of invalidated main touch signals corresponding to long touch signals, which are received after the main touch signal processed as invalid, to a specific number (e.g., 2), and may then process a successively received main touch signal as valid and generate the long touch event. For example, the processor 520 may process main touch signals corresponding to two long touch signals as invalid, which are received after a main touch signal processed as invalid in a fourth period 753 of 900 ms in FIG. 12, and then process a successively received main touch signal as valid and generate the long touch event.

According to an embodiment, the memory 530 may be implemented substantially the same as or similar to the memory 130 of FIG. 1.

According to an embodiment, the memory 530 may store the value of at least one threshold period set for processing a main touch signal as valid and/or invalid.

According to an embodiment, the communication module 590 may be implemented substantially the same as or similar to the communication module 190 of FIG. 1, and may include a plurality of communication circuits using different communication technologies.

According to an embodiment, the communication module 590 may include at least one of a wireless local area network (WLAN) module or a short-range communication module (not shown). The short-range communication module may include an ultra wide band (UWB) communication module, a Wi-Fi communication module, an NFC communication module, a Bluetooth legacy communication module, and/or a BLE communication module.

According to an embodiment, the speaker unit 555 may receive an electrical signal from the processor 520 to generate sound and output the sound to the outside. For example, the speaker unit 555 may output multimedia sound or incoming call sound and be controlled with different properties by the processor 520 depending on an operation mode or the type of the ear tip 314 coupled to the housing 322.

Figure 13:
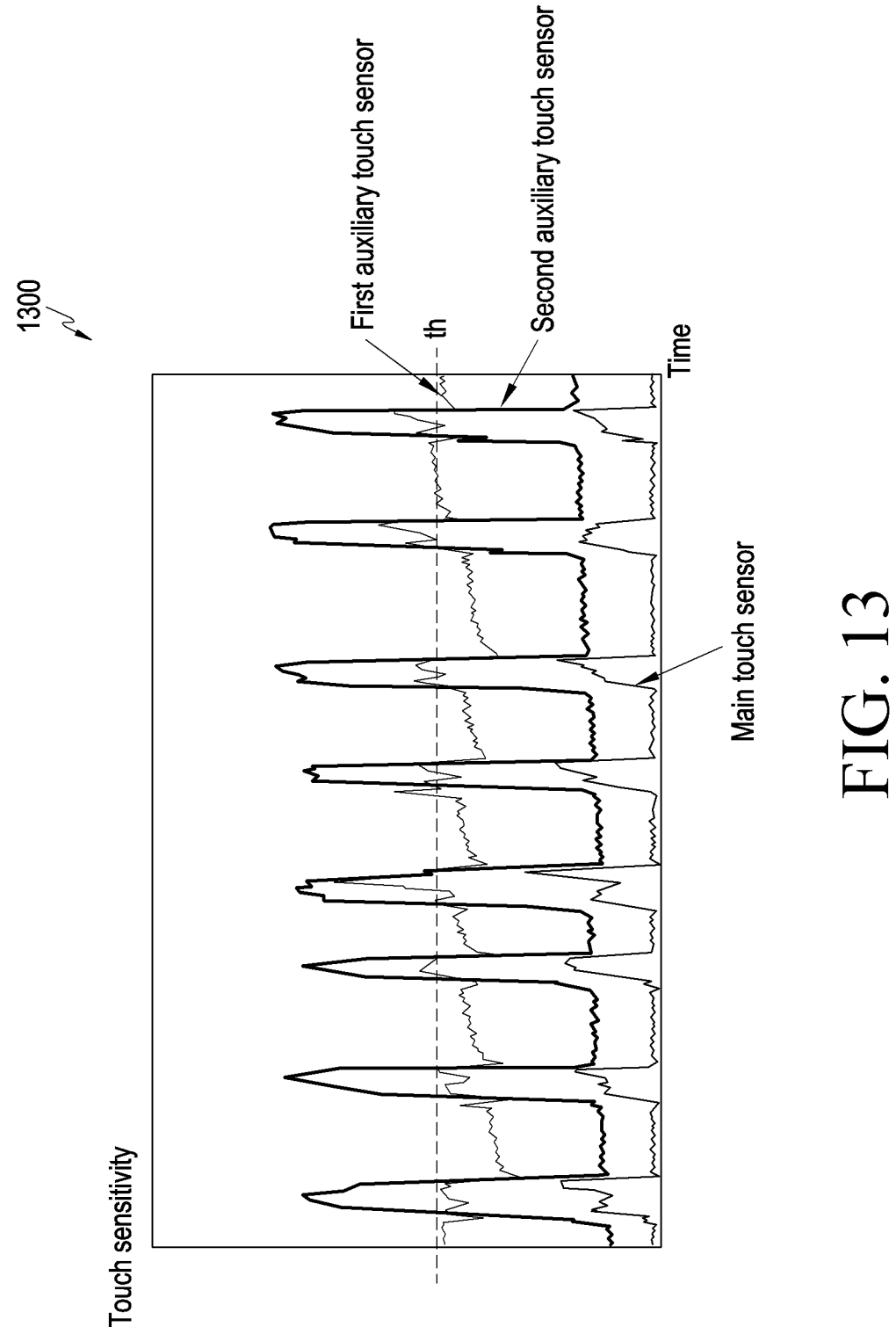
FIG. 13 is a diagram illustrating a signal response obtained by a touch sensor according to an embodiment of the disclosure.
Figure 14:
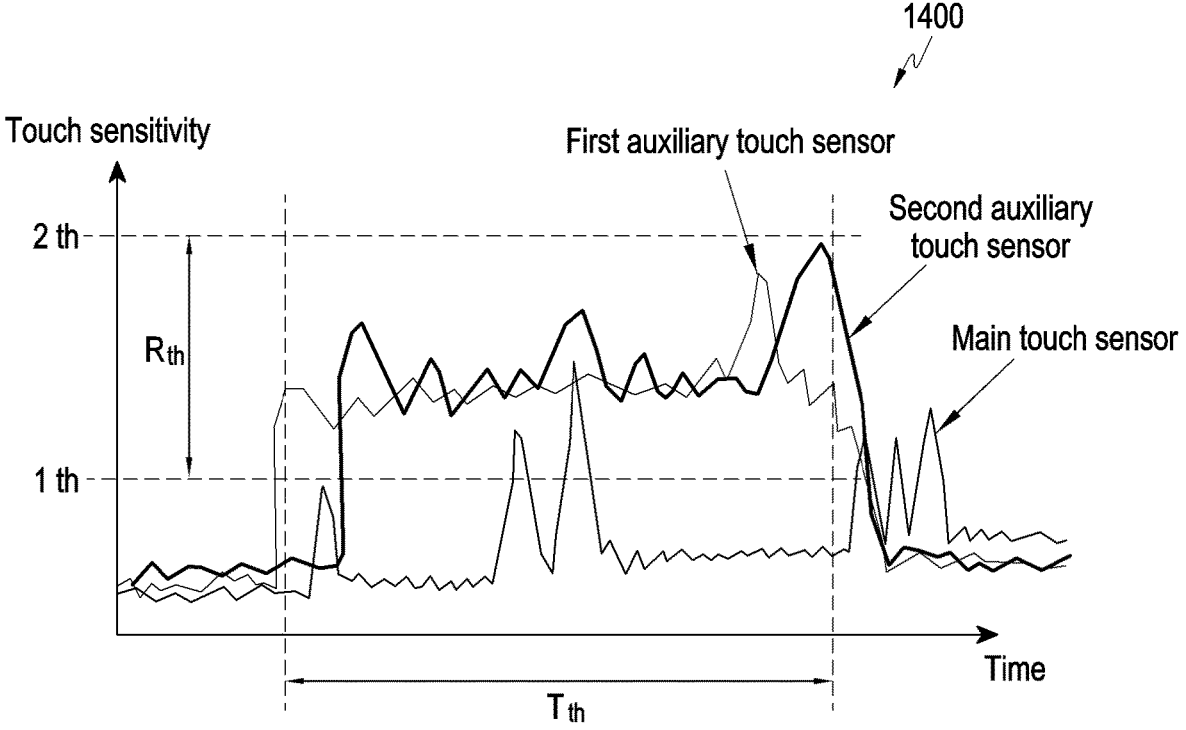
FIG. 14 is a diagram illustrating a signal response obtained by a touch sensor according to an embodiment of the disclosure.

According to an embodiment, the microphone unit 550 may include a plurality of microphones 550a, 550b, . . . , 550n. When including the plurality of microphones 550a, 550b, . . . , 550n, the microphone unit 550 or the electronic device 501 may detect the direction of sound or detect external sound. The electronic device 501 or the processor 520 may suppress or cancel noise based on the external sound detected by the microphone unit 550. For example, the processor 520 may attenuate sound other than multimedia sound or incoming call sound output by the speaker unit 555, based on the external sound detected by the microphone unit 550. In some embodiments, at least one of the plurality of microphones 550a, 550b, . . . 550n may collect user speech in a voice call mode. In another embodiment, the electronic device 501 or the processor 520 may enhance user speech and suppress external sound using sound collected by the plurality of microphones 550a, 550b, . . . 550n, thereby improving call quality in the voice call mode FIG. 13 is a diagram 1300 illustrating a signal response obtained from a touch sensor according to an embodiment of the disclosure. FIG. 14 is a diagram 1400 illustrating a signal response obtained from a touch sensor according to an embodiment of the disclosure.

FIGS. 13 and 14 are graphs illustrating the frequency response characteristics of an external touch over time measured by touch sensors (e.g., a main touch sensor (e.g., the main touch sensor 332 in FIGS. 2, 3A, 3B, and 4A to 4C and/or the main touch sensor 532 in FIG. 10) and an auxiliary touch sensor (e.g., the auxiliary touch sensor 341 in FIGS. 2, 3A, 3B, and 4A to 4C and/or the auxiliary touch sensor 541 in FIG. 10). In describing FIGS. 13 and 14, the reference numerals of FIGS. 2, 3A, 3B, and 4A to 4C may be incorporated by reference.

Referring to FIG. 13, when a touch sensitivity measured at the auxiliary touch sensor 341 is equal to or greater than a threshold th, a processor (e.g., the processor 120 in FIG.

1 and/or the processor 520 in FIG. 10) may maintain the operation state of the wearable electronic device (e.g., the wearable electronic device 300 in FIGS. 2, 3A, 3B, 4A to 4C, and 5 to 9 and/or the wearable electronic device 501 in FIG. 10).

According to an embodiment, the threshold for a touch sensitivity may be a reference sensitivity for an external input (e.g., user input and/or touch input) to the auxiliary touch sensor 341. For example, the threshold th for a touch sensitivity may be a predetermined or preset capacitance variation. For example, when a capacitance variation generated or caused by an external input (e.g., user input and/or touch input) to the auxiliary touch sensor 341 is equal to or greater than the predetermined or preset capacitance variation, the processor may determine that the touch sensitivity measured at the auxiliary touch sensor 341 is equal to or greater than the threshold th. According to an embodiment, data of the predetermined or preset capacitance variation for the threshold th may be stored in memory (e.g., the memory 130 in FIG. 1 and/or the memory 530 in FIG. 10).

According to an embodiment, the predetermined or preset capacitance variation for the threshold th may be subject to various design modifications based on the material and/or shape of the housing 322.

According to an embodiment, the predetermined or preset capacitance variation for the threshold th may be a value calculated empirically according to the material and/or shape of the housing 322.

According to an embodiment, when a touch sensitivity measured at the main touch sensor 332 is equal to or greater than the threshold th, the processor (e.g., the processor 120 in FIG. 1 and/or the processor 520 in FIG. 10) may change the operation state of the wearable electronic device.

According to some embodiments, the threshold th for the touch sensitivity measured at the main touch sensor 332 and the threshold th for the touch sensitivity measured at the auxiliary touch sensor 341 may be set to the same value. In some embodiments, the threshold for the touch sensitivity measured at the main touch sensor 332 may be greater than or less than the threshold for the touch sensitivity measured at the auxiliary touch sensor 341.

According to an embodiment, even when the processor detects that an external touch has been applied to the main touch sensor 332, when the touch sensitivity detected at the auxiliary touch sensor 341 is equal to or greater than the threshold th, the processor may maintain the operation state of the wearable electronic device. In some embodiments, in the case where the auxiliary touch sensor 341 is provided as a plurality of touch sensors (e.g., the first auxiliary touch sensor 342 and the second auxiliary touch sensor 344), when a touch sensitivity measured at some (e.g., the first auxiliary touch sensor 342 or the second auxiliary touch sensor 344) of the plurality of auxiliary touch sensors 341 is equal to or greater than the threshold th, the processor may maintain the operation state of the wearable electronic device. Further, in some embodiments, the processor may maintain the operation state of the wearable electronic device, only when the touch sensitivities of all of the plurality of auxiliary touch sensors 341 are measured to be equal to or greater than the threshold th.

Referring to FIG. 14, the processor (e.g., the processor 120 in FIG. 1 and/or the processor 520 in FIG. 10) may maintain the operation state of the wearable electronic device (e.g., the wearable electronic device 300 in FIGS. 2, 3A, 3B, and 4A to 4C and/or the wearable electronic device 501 in FIG. 10) in consideration of the waveform of touch information measured by the auxiliary touch sensor 341.

According to an embodiment, when the user touches the first touch area 324 to change the operation state of the wearable electronic device, the user may touch the first touch area 324 once for a relatively short time or a plurality of times at short intervals. In this case, touch information measured at the main touch sensor 332 may have a waveform in the form of a peak or a pulse. For example, the processor may change the operation state of the wearable electronic device based on the touch information having the waveform in the form of a peak or a pulse.

According to an embodiment, when the user touches at least a portion of the second touch area 326 to reposition the wearable electronic device, the user may maintain the wearable electronic device in a gripped state for a relatively long time. In this case, touch information obtained through the auxiliary touch sensor 341 may have a waveform with a touch sensitivity equal to or greater than a threshold (e.g., a first threshold 1th), which is maintained for a threshold time (e.g., a threshold time Tth) or longer. Alternatively, the touch information may have a waveform with a touch sensitivity within a threshold range (e.g., a threshold range Rth), which is maintained for the threshold time (e.g., the threshold time Tth) or longer. For example, the threshold range (e.g., the threshold range Rth) may be between the first threshold 1th and a second threshold 2th. In an embodiment, the second threshold 2th may be a value set to be greater than the first threshold 1th.

In an embodiment, the processor may maintain the operation state of the wearable electronic device 300, based on touch information indicating that the touch sensitivity measured at the auxiliary touch sensor 341 is equal to or greater than the threshold (e.g., the first threshold 1th), and a touch duration is equal to or greater than the threshold time (e.g., the threshold time Tth). According to an embodiment, the threshold time Tth may be set to various time values (e.g., time values in seconds).

According to an embodiment, the processor may control the operation state of the wearable electronic device based on first auxiliary touch information obtained from the first auxiliary touch sensor 342 and second auxiliary touch information obtained from the second auxiliary touch sensor 344. In some embodiments, when both a touch sensitivity included in the first auxiliary touch information and a touch sensitivity included in the second auxiliary touch information are equal to or greater than the first threshold, the processor may determine that the wearable electronic device is currently gripped by the user. In this case, the processor may maintain the operation state of the wearable electronic device.

FIGS. 15A to 15D are graphs 1500a to 1500d illustrating the first computation operation for processing a main touch signal as valid or invalid in a wearable electronic device according to various embodiments of the disclosure.

Figure 15A:
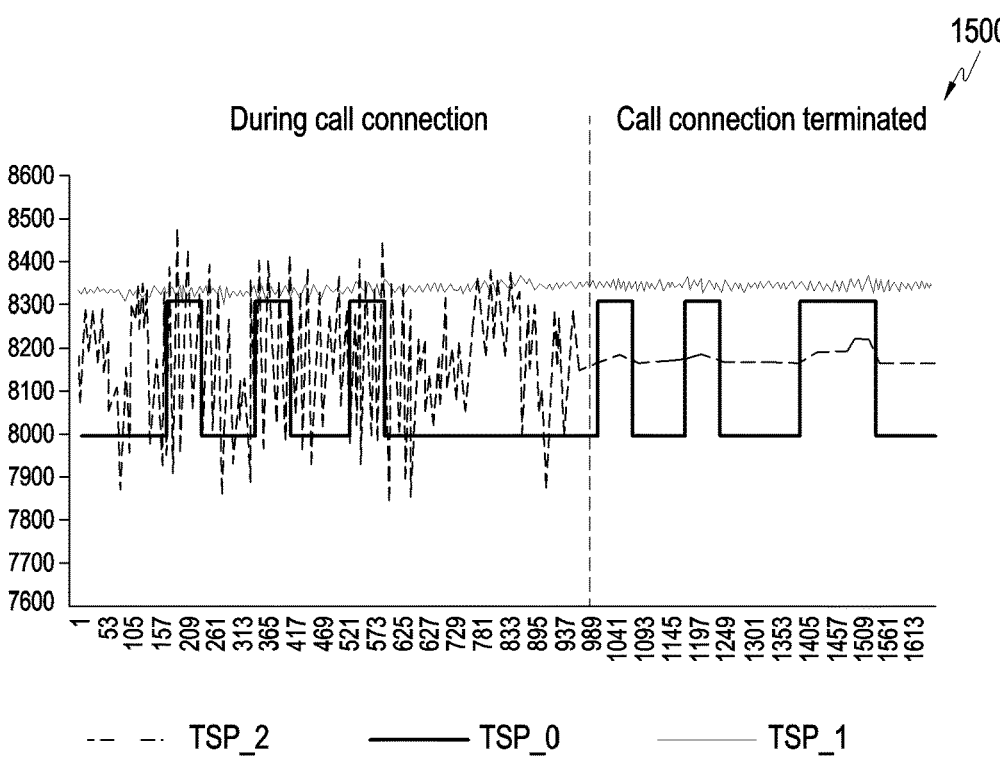
FIGS. 15A, 15B, 15C, and 15D are graphs illustrating a first computation operation for processing a main touch signal as valid or invalid in a wearable electronic device according to various embodiments of the disclosure.

Referring to FIG. 15A, it may be noted that the sensitivity difference diff of an electrode signal of the auxiliary touch sensor significantly differs during a call and after the call connection is terminated in a structure in which components and wiring are subject to interference due to the miniaturized design of a typical wearable electronic device (e.g., earbud). From the left waveform in FIG. 15A which is for a situation in which the auxiliary touch sensor is affected by a microphone signal wiring, it may be seen that when a microphone-related operation takes place, the sensitivity difference diff of the electrode signal of the auxiliary touch electrode violently fluctuates continuously, even though the user does not touch the position of the auxiliary touch sensor, and the waveform of the auxiliary touch signal is stabilized from a time when the call is terminated. In a method for determining invalidity of a main touch signal depending on whether an auxiliary touch signal is generated, the wearable electronic device (e.g., earbud) may not respond to a touch even when the user touches the main touch area to perform an operation, because the auxiliary touch signal is continuously generated without the user's touch. Alternatively, although the user double-touches the main touch sensor of the wearable electronic device to skip music while listening to music, the double-touch may be recognized as a single touch, and thus the music may be played or stopped, or although the user triple-touches the main touch sensor to move backward to the previous music, the triple touch may be recognized as a double-touch, which leads to the next music.

Figure 15B:
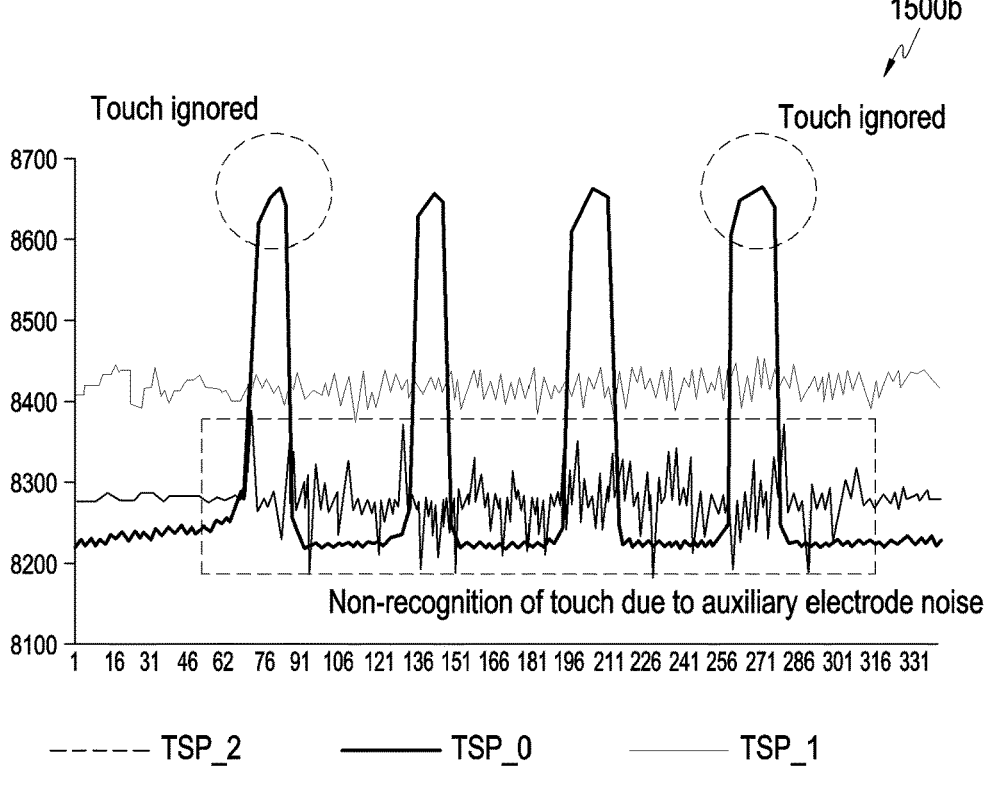

Referring to FIG. 15B, although the user makes exactly four single touches on the main touch sensor of the typical wearable electronic device (e.g., earbud), only two single touches occur, and the remaining two single touches are invalidated by the auxiliary touch sensor. In FIG. 15B, one TSP1 of signals of auxiliary touch sensors (electrodes) fluctuates to or above a diff level of 100, and fluctuates to a high level even when a main touch signal is generated. Therefore, when the debounce period of the auxiliary touch sensor is greater than a threshold, the main touch signal is invalidated.

Figure 15C:
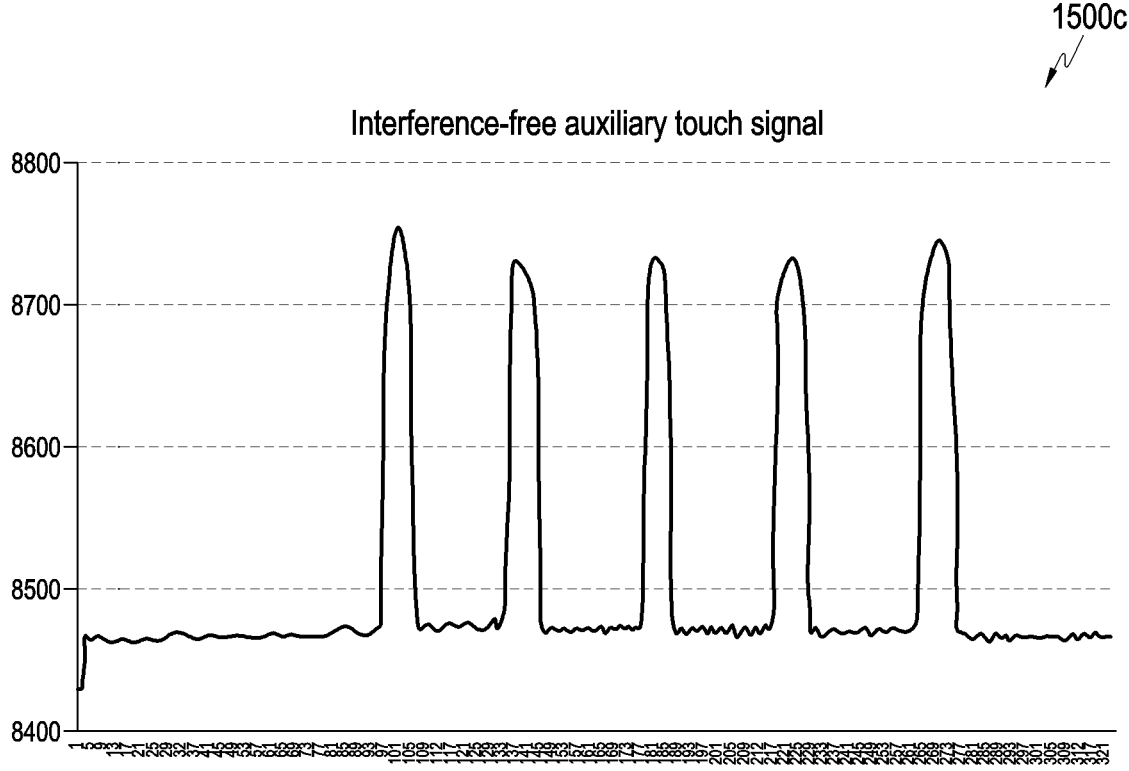
Figure 15C:
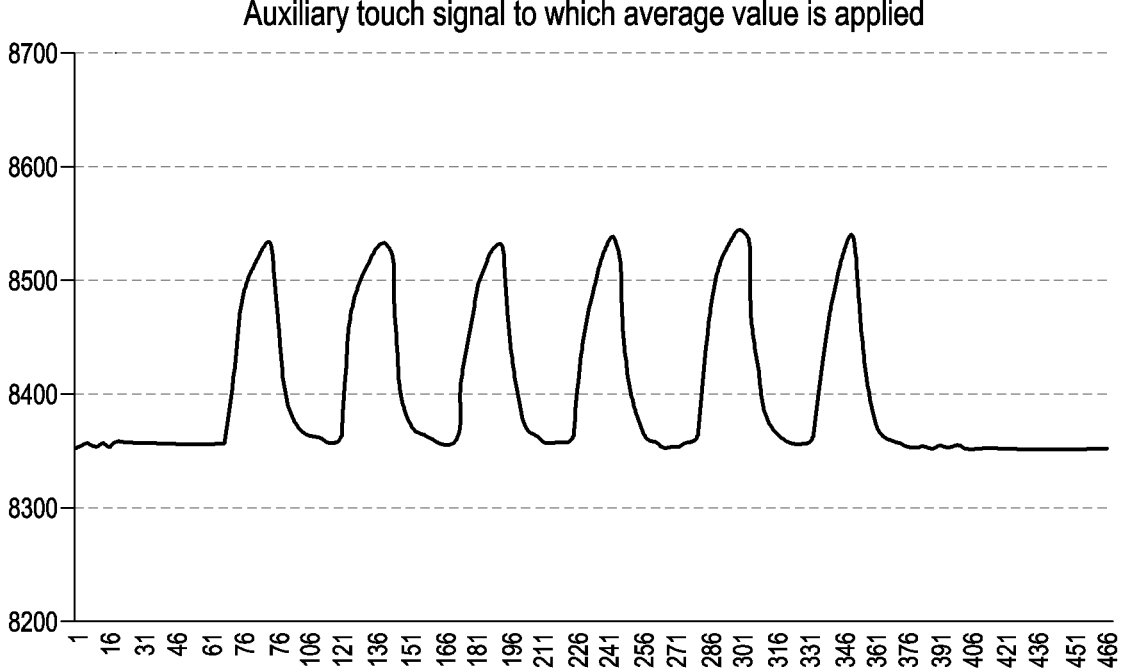

Referring to FIG. 15C, in the wearable electronic device according to the disclosure, the overall level of the auxiliary touch signal may be reduced by applying an average value to the value of the auxiliary touch signal through the first computation operation. For example, when the auxiliary touch signal is "1, 1, 1, 1, 1, 1, 20, 20, 20, 1, 1, 1, . . . ", the signal that may rise to a high level in a short time may be reduced to "1, 1, 1, 1, 1, 1, 6, 11, 11, 6, . . . " by applying the average value of previous four auxiliary touch signals. Referring to FIG. 15C, although sensitivity degradation and delay results from reduction of the noise level, a noise signal and a biometric signal may be distinguished from each other by checking conditions based on the periods (e.g., the debounce period of the main touch signal and the debounce period of the auxiliary touch signal) defined in the first computation operation through the second computation operation and the third computation operation. In an embodiment of the disclosure, the debounce period of the auxiliary touch signal may be set to 80 ms to determine the noise signal and process the main touch signal as valid or invalid.

Figure 15D:
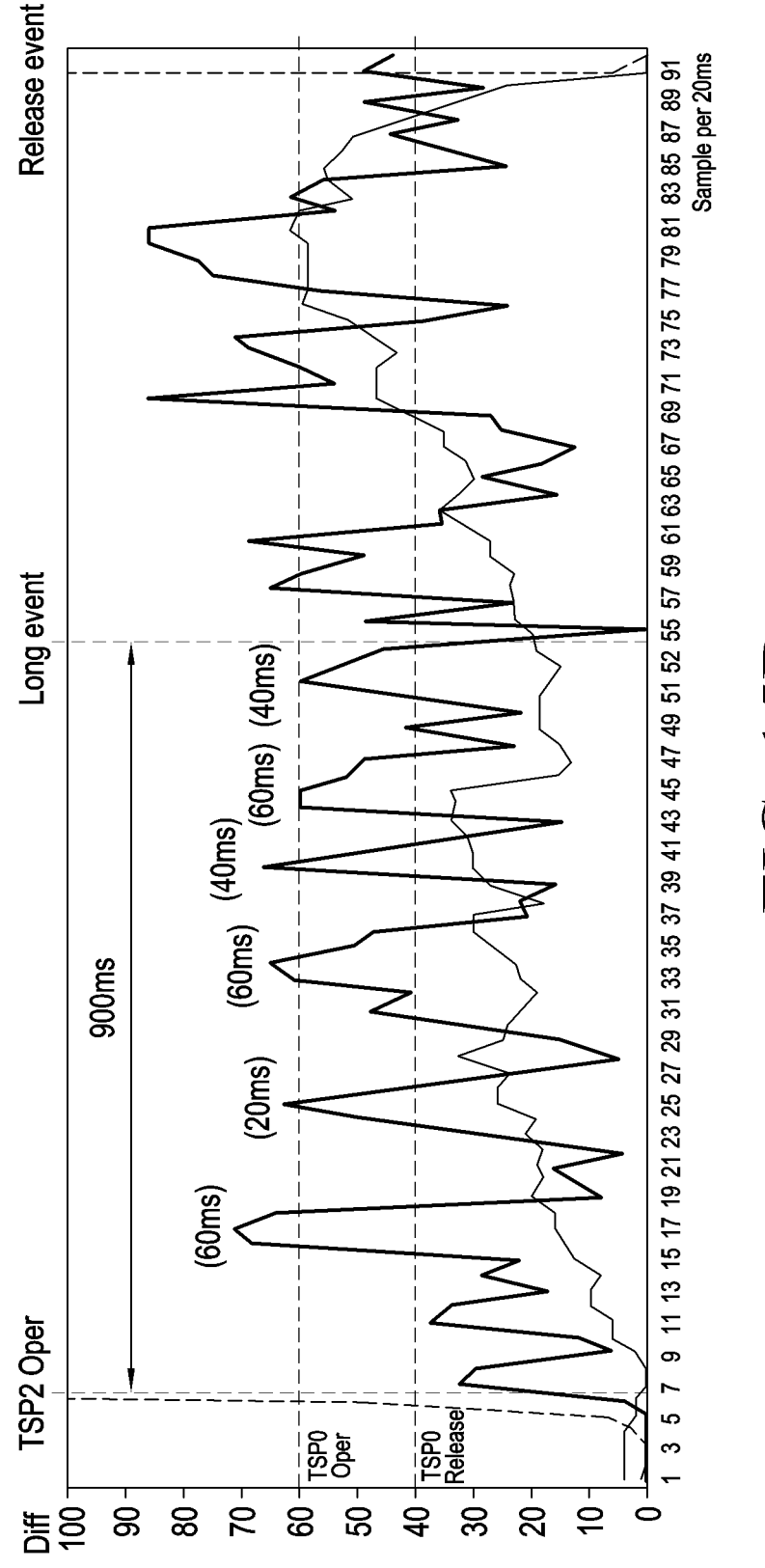

Referring to FIG. 15D, in the wearable electronic device according to the disclosure, the noise level may be reduced, and a period may be set to range from the operation start time to operation release time of an appropriate auxiliary touch signal in the first computation operation by collecting various logs, to distinguish the noise signal from the biometric signal.

FIGS. 16A to 16H are diagrams 1600a to 1600h illustrating an operation for processing a single touch signal as invalid in a wearable electronic device according to various embodiments of the disclosure.

Figure 16A:
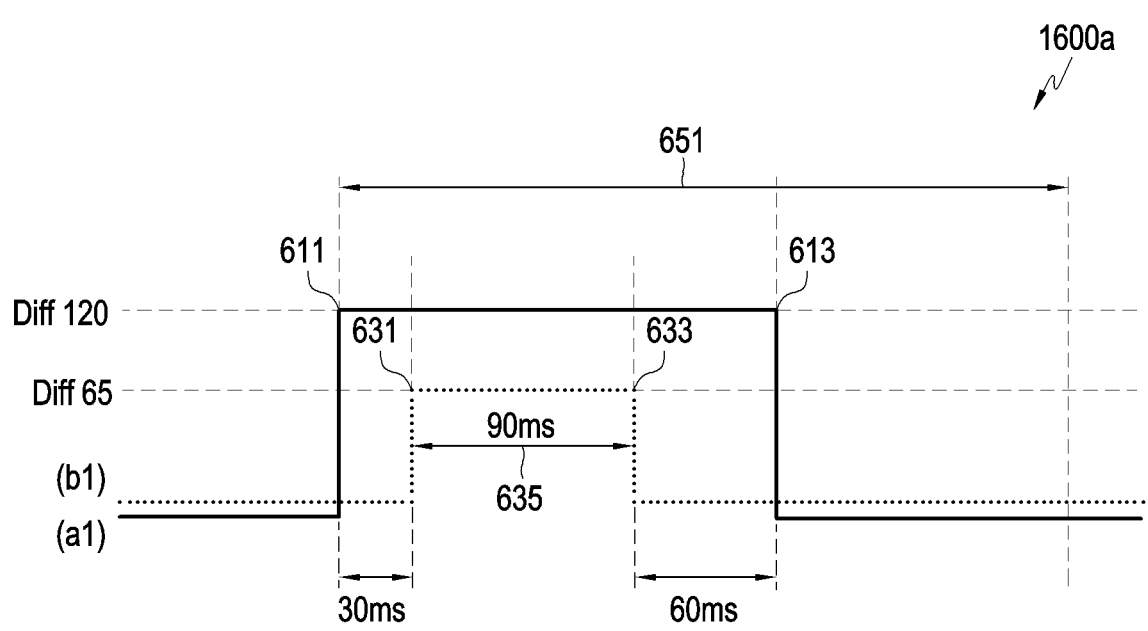
FIGS. 16A, 16B, 16C, 16D, 16E, 16F, 16G, and 16H are diagrams illustrating an operation for processing a single touch signal as invalid in a wearable electronic device according to various embodiments of the disclosure.

Referring to FIG. 16A illustrating a case in which the main touch sensor and the auxiliary touch sensor are touched at close moments, the wearable electronic device (e.g., the wearable electronic device 501 in FIG. 10) may the main touch signal a1 corresponding to a single touch signal as invalid through the first computation operation or the second computation operation, because the first debounce period 635 of the auxiliary touch signal b1 equal to or greater than the second threshold period (e.g., 80 ms) is included in the first auxiliary touch detection period 651 from the operation start time 611 of the main touch signal by the first prede-termined time (e.g., 300 ms) after the operation release time 613 of the main touch signal.

Figure 16B:
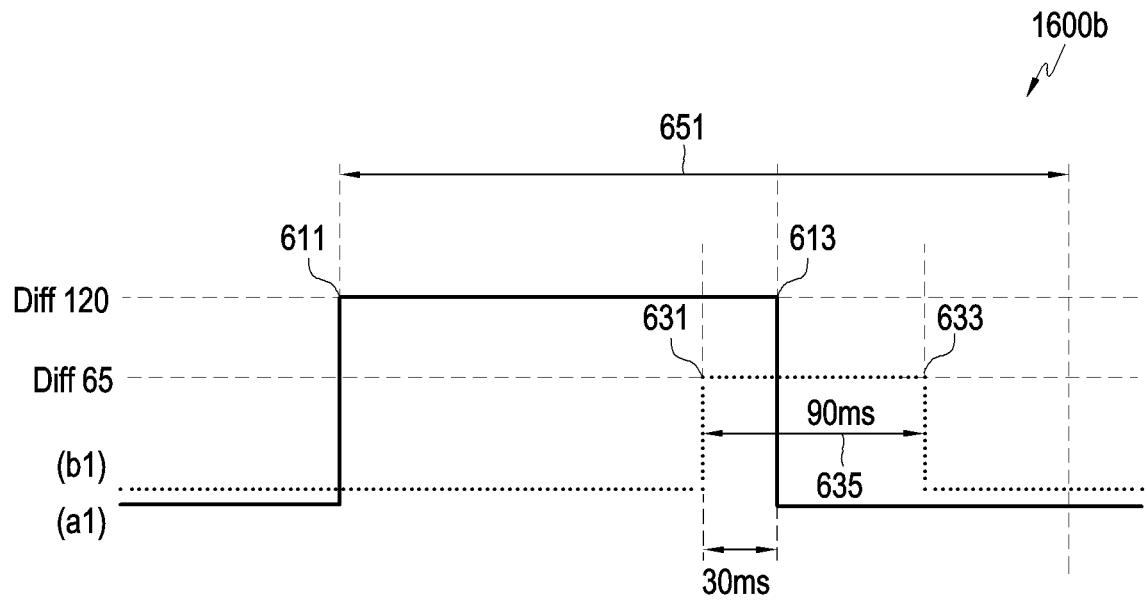

Referring to FIG. 16B illustrating a case in which after the main touch sensor is touched, the auxiliary touch sensor is touched, the wearable electronic device (e.g., the wearable electronic device 501 in FIG. 10) may the main touch signal a1 corresponding to a single touch signal as invalid through the first computation operation or the second computation operation, because the first debounce period 635 of the auxiliary touch signal b1 equal to or greater than the second threshold period (e.g., 80 ms) is partially included in the first auxiliary touch detection period 651 from the operation start time 611 of the main touch signal by the first predetermined time (e.g., 300 ms) after the operation release time 613 of the main touch signal.

Figure 16C:
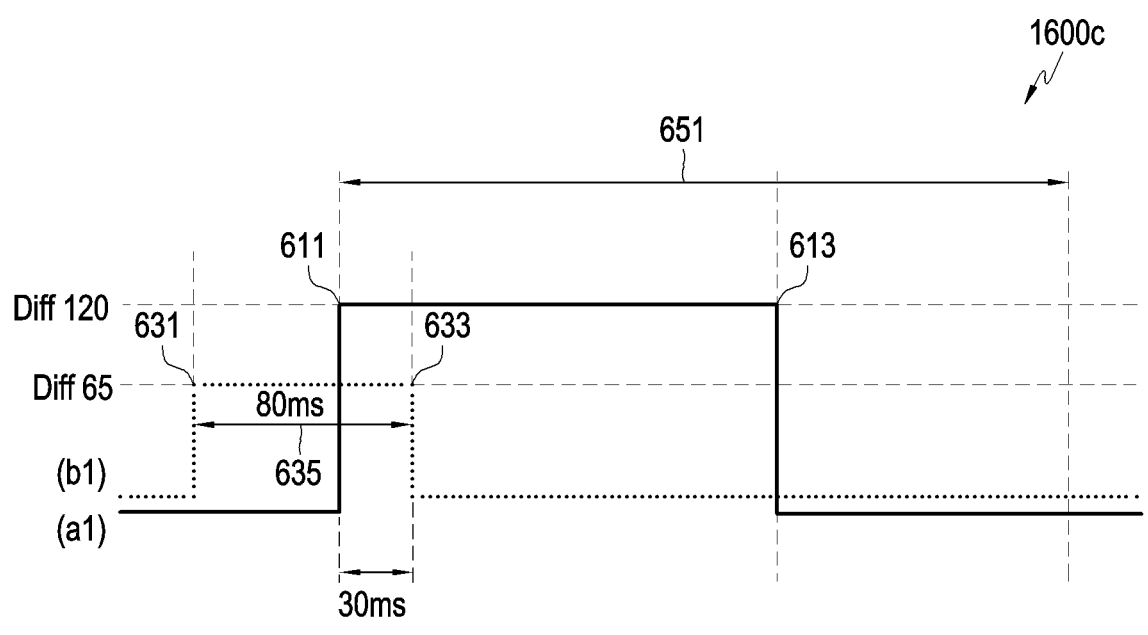

Referring to FIG. 16C illustrating a case in which after the auxiliary touch sensor is touched, the main touch sensor is touched, the wearable electronic device (e.g., the wearable electronic device 501 in FIG. 10) may process the main touch signal a1 corresponding to a single touch signal as invalid through the first computation operation or the second computation operation, because the first debounce period 635 of the auxiliary touch signal b1 equal to or greater than the second threshold period (e.g., 80 ms) is partially included in the first auxiliary touch detection period 651 from the operation start time 611 of the main touch signal by the first predetermined time (e.g., 300 ms) after the operation release time 613 of the main touch signal.

Figure 16D:
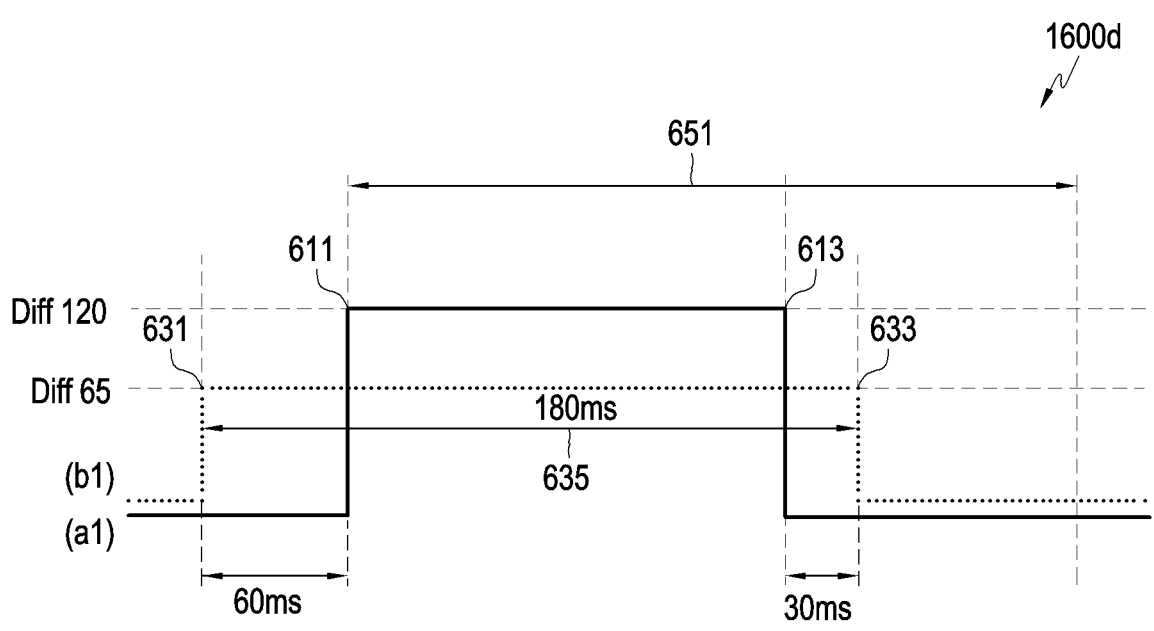

Referring to FIG. 16D illustrating a case in which a touch on the auxiliary touch sensor is maintained longer than a touch on the main touch sensor, the wearable electronic device (e.g., the wearable electronic device 501 in FIG. 10) may process the main touch signal a1 corresponding to a single touch signal as invalid through the first computation operation or the second computation operation, because the first debounce period 635 of the auxiliary touch signal b1, which is longer than the first predetermined time (e.g., 300 ms) from the operation start time 611 of the main touch signal to the operation release time 613 of the main touch signal, is partially included in the first auxiliary touch detection period 651. Further, the wearable electronic device may process the main touch signal corresponding to the single touch signal as invalid through the third computation operation, because the sum (e.g., 80 ms) of the absolute time difference CH0 between the operation start time 611 of the main touch signal and the operation start time 631 of the auxiliary touch signal and the absolute time difference CH1 between the operation release time 613 of the main touch signal and the operation release time 633 of the auxiliary touch signal is equal to or greater than the threshold time (e.g., 80 ms) (e.g., CH0+CH1 Time Oms).

Figure 16E:
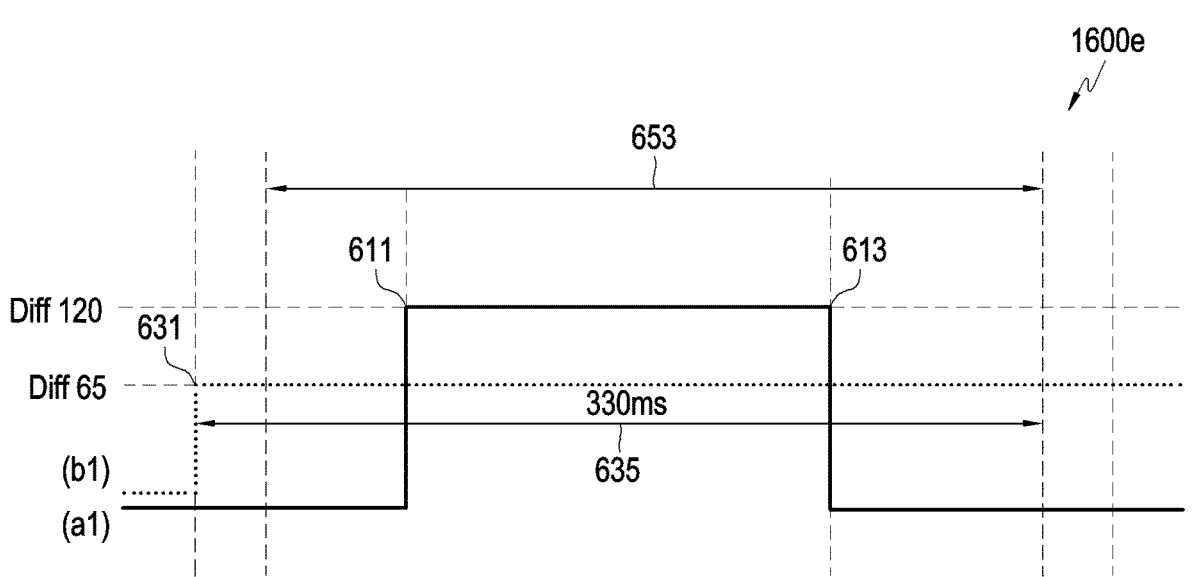

Referring to FIG. 16E illustrating a case in which a touch is made on the main touch sensor while a touch on the auxiliary touch sensor is maintained, the wearable electronic device (e.g., the wearable electronic device 501 in FIG. 10) may process the main touch signal a1 corresponding to a single touch signal as invalid through the first computation operation or the second computation operation, because the first debounce period 635 of the auxiliary touch signal b1 equal to or greater than the second threshold period (e.g., 80 ms) is partially included in the second auxiliary touch detection period 653 from the second predetermined time (e.g., 50 ms) before the operation start time 611 of the main touch signal to the third predetermined time (e.g., 250 ms) after the operation release time 613 of the main touch signal.

Figure 16F:
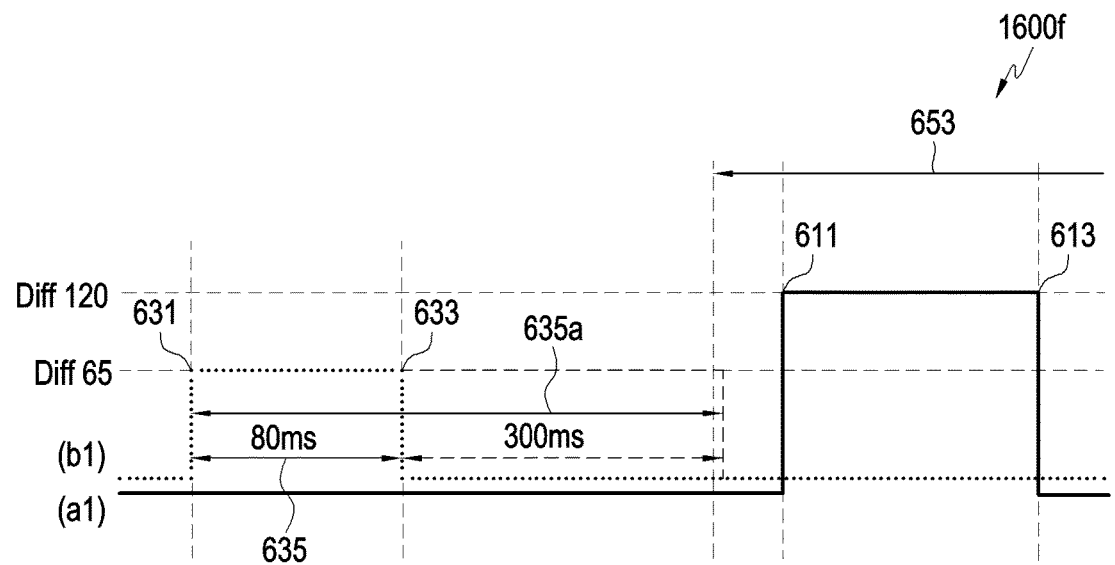

Referring to FIG. 16F illustrating a case in which the auxiliary touch sensor is touched, the main auxiliary touch sensor is touched, the wearable electronic device (e.g., the wearable electronic device 501 in FIG. 10) may process the main touch signal a1 corresponding to a single touch signal as invalid through the first computation operation or the second computation operation, because the first debounce period 653a of the auxiliary touch signal b1, which is equal to or greater than the second threshold period (e.g., 80 ms) and has been extended by the first predetermined time (e.g., 300 ms), is partially included in the second auxiliary touch detection period 653 from the second predetermined time (e.g., 50 ms) before the operation start time 611 of the main touch signal to the third predetermined time (e.g., 250 ms) after the operation release time 613 of the main touch signal.

Figure 16G:
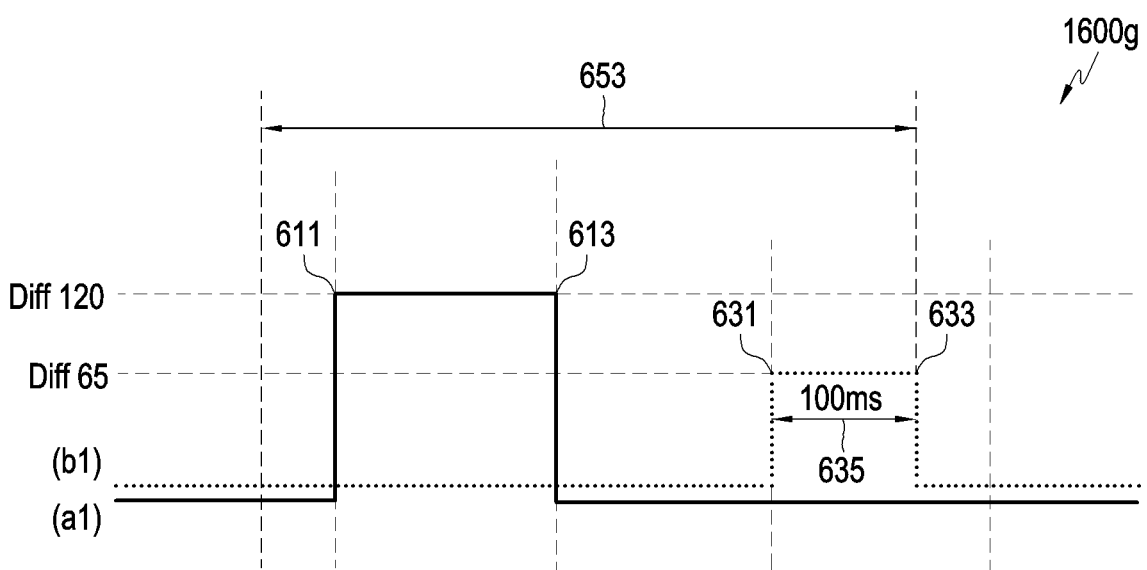

Referring to FIG. 16G illustrating a case in which after the main touch sensor is touched, the auxiliary touch sensor is touched, the wearable electronic device (e.g., the wearable electronic device 501 in FIG. 10) may process the main touch signal a1 corresponding to a single touch signal as invalid through the first computation operation or the second computation operation, because the first debounce period 635 of the auxiliary touch signal b1 equal to or greater than the second threshold period (e.g., 80 ms) is partially included in the second auxiliary touch detection period 653 from the second predetermined time (e.g., 50 ms) before the operation start time 611 of the main touch signal to the third predetermined time (e.g., 250 ms) after the operation release time 613 of the main touch signal. However, when the first debounce period 635 of the auxiliary touch signal b1 is partially included only in the third predetermined time (e.g., 250 ms) after the operation release time 613 of the main touch signal in the second auxiliary touch detection period 653, the wearable electronic device (e.g., the wearable electronic device 501 in FIG. 10) may process the main touch signal a1 corresponding to the single touch signal as valid.

Figure 16H:
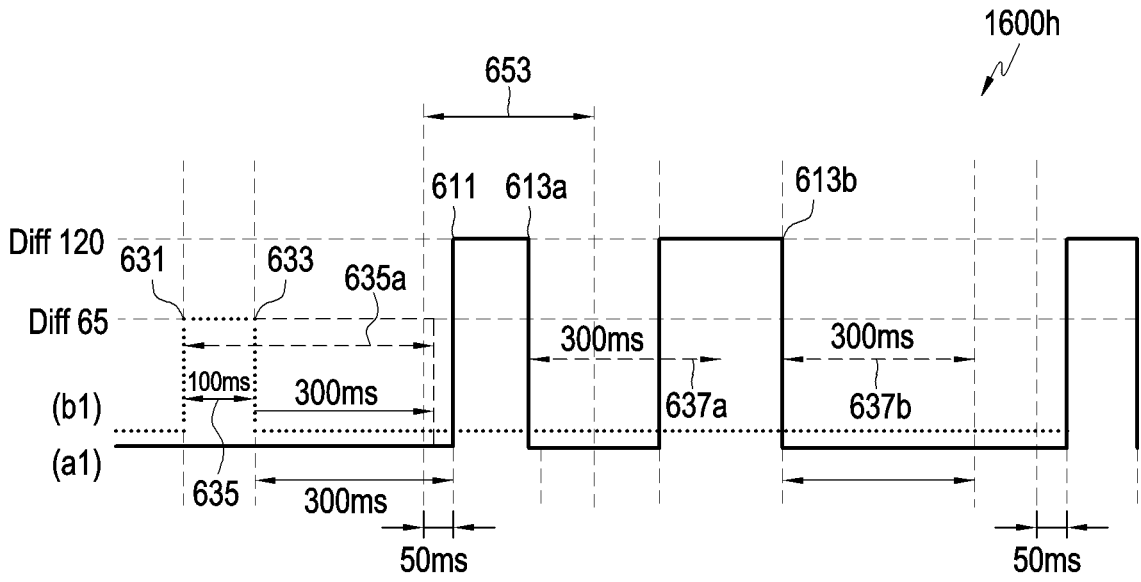

Referring to FIG. 16H illustrating a case in which a single touch occurs on the auxiliary touch sensor followed by successive touches on the main touch sensor, the wearable electronic device (e.g., the wearable electronic device 501 in FIG. 10) the wearable electronic device (e.g., the wearable electronic device 501 in FIG. 10) may process the main touch signal a1 corresponding to a single touch signal as invalid through the first computation operation or the second computation operation, because the first debounce period 653a of the auxiliary touch signal b1, which is equal to or greater than the second threshold period (e.g., 80 ms) and has extended by the first predetermined time (e.g., 300 ms), is partially included in the second auxiliary touch detection period 653 from the second predetermined time (e.g., 50 ms) before the operation start time 611 of the main touch signal to the third predetermined time (e.g., 250 ms) after the operation release time 613 of the main touch signal.

When the wearable electronic device processes a first main touch signal a1 as invalid, it may set an arbitrary extended period 637a by extending the first debounce period of the auxiliary touch signal by the first predetermined time (e.g., 300 ms) after the operation release time 613a of the first main touch signal, and as the second main touch signal a1 is partially included in the arbitrary extended period 637a, process a second main touch signal a1 corresponding to a single touch signal as invalid.

When the wearable electronic device processes the second main touch signal a1 as invalid, it may set an arbitrary extended period 637b by extending the first debounce period of the auxiliary touch signal by the first predetermined time (e.g., 300 ms) after an operation release time 613b of the second main touch signal, and as a third main touch signal a1 is not included in the arbitrary extended period 637b, process the third main touch signal a1 corresponding to a single touch signal as valid.

Referring to FIGS. 16A to 16H, an auxiliary touch detection period, which is an imaginary period during which an auxiliary touch signal is waited for, is set as long as possible from a time when a main touch signal is generated. When the auxiliary touch signal is generated, the length of the auxiliary touch signal is forced to be increased, or when the main touch signal is processed as invalid, it is determined that the user repositions the wearable electronic device (e.g., earbud) to wear the wearable electronic device (e.g., earbud), and a certain period after the operation release time of the main touch signal is set, during which the auxiliary touch signal may occur. Therefore, main touch signals following the user's repositioning to wear the wearable electronic device (e.g., earbud) may be processed as invalid, thereby preventing further malfunctions.

The operations illustrated in FIGS. 16A to 16H above may prevent malfunctions of the main touch signal, which may occur when the user touches the main touch sensor and then the auxiliary touch sensor in gripping the wearable electronic device (e.g., earbud), when the user touches the auxiliary touch sensor and then the main touch sensor, when the user touches the main touch sensor after repositioning the wearable electronic device (e.g., earbud) to wear it, and when the user pushes the wearable electronic device (e.g., earbuds) while touching the main touch sensor during repositioning of the wearable electronic device (e.g., earbud) to wear it.

Figure 17A:
FIGS. 17A and 17B are diagrams illustrating an operation for further verifying a single touch signal processed as invalid in a wearable electronic device according to various embodiments of the disclosure.
Figure 17A:
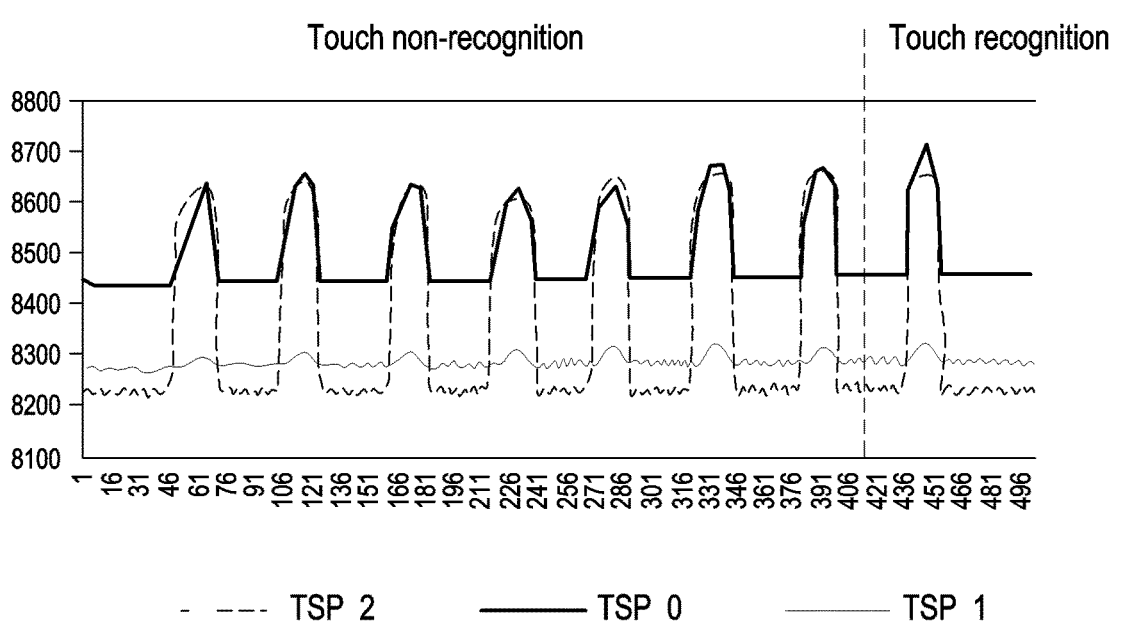
Figure 17B:
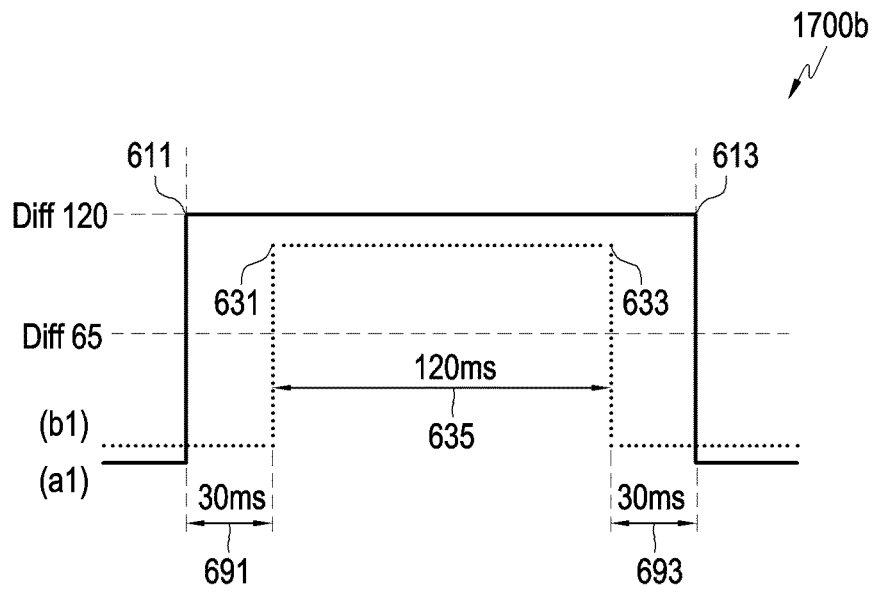

FIGS. 17A and 17B are diagrams 1700a and 1700b illustrating an operation for further verifying a single touch signal processed as invalid in a wearable electronic device according to various embodiments of the disclosure.

FIG. 17A illustrates cases in which an auxiliary touch signal and a main touch signal occur together in view of various touch methods. It may be noted from these cases that the auxiliary touch signal and the main touch signal are generated in similar forms. When a main touch signal corresponding to a single touch signal is processed as invalid in the cases as illustrated FIG. 17A, the wearable electronic device (e.g., the wearable electronic device 501 in FIG. 10) may further verify whether the main touch signal corresponding to the invalidated single touch signal is valid or invalid by performing the third computation operation.

Referring to FIG. 17B, when the wearable electronic device (e.g., the wearable electronic device 501 in FIG. 10) has invalidated the main touch signal corresponding to the single touch signal through the first computation operation or the second computation operation, it may perform the third computation operation. In the third computation operation, the wearable electronic device may process the main touch signal corresponding to the single touch signal as valid, because the sum (e.g., 60 ms) of the absolute time difference CH0 691 between the operation start time 611 of the main touch signal and the operation start time 631 of the auxiliary touch signal and the absolute time difference CH1 693 between the operation release time 613 of the main touch signal and the operation release time 633 of the auxiliary touch signal is equal to or less than the threshold time (e.g., 80 ms) (e.g., CH0+CH1 Time <80 ms).

FIGS. 18A to 18E are diagrams 1800a to 1800e illustrating operations for processing a long touch signal as invalid in a wearable electronic device according to various embodiments of the disclosure.

Figure 18A:
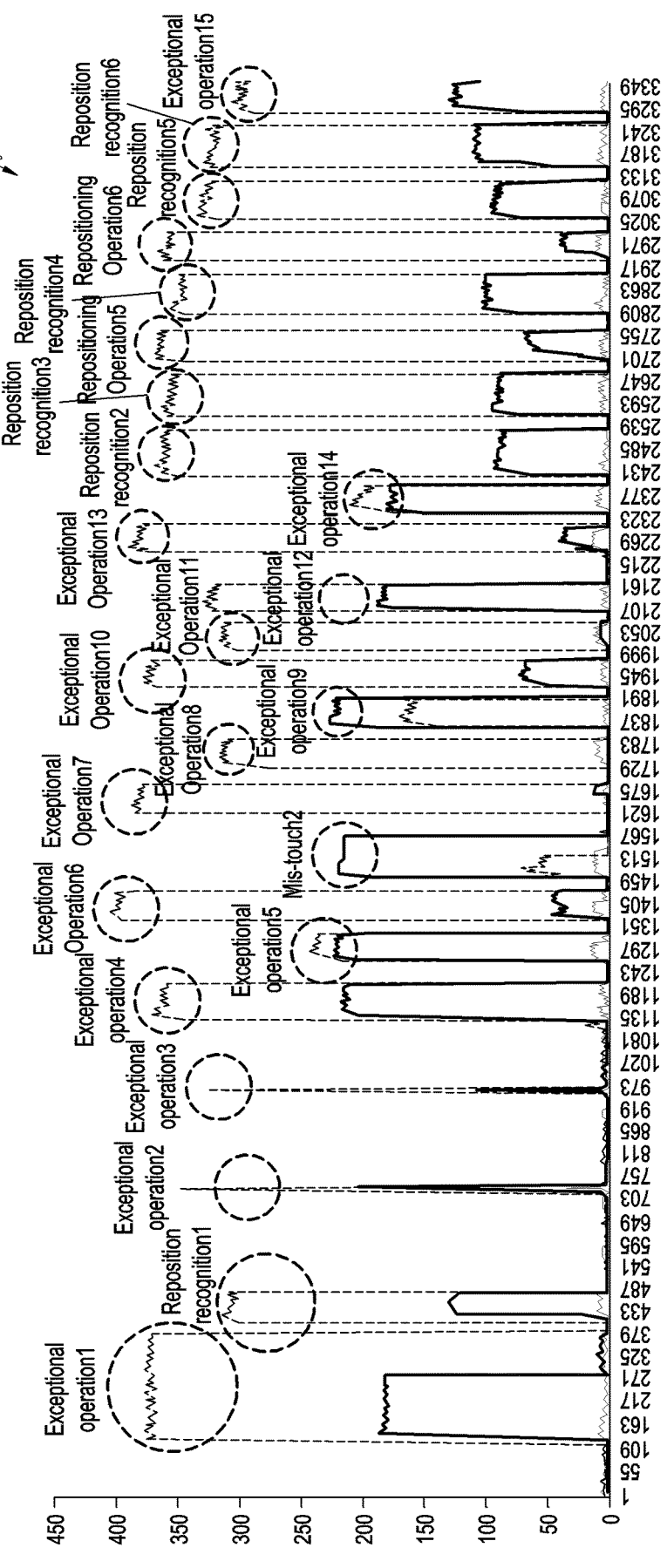
FIGS. 18A, 18B, 18C, 18D, and 18E are diagrams illustrating an operation for processing a long touch signal as invalid in a wearable electronic device according to various embodiments of the disclosure.

Referring to FIG. 18A, according to conditions of processing a main touch signal corresponding to a long touch signal as valid in the second computation operation and the third computation operation, exceptional operation (e.g., exceptional operation 1 to exceptional operation 15) indicates that the main touch signal is processed as invalid, operation (e.g., operation 1 to operation 13) indicates that the main touch signal is processed as valid, mis-touch (e.g., mis-touch 2) indicates that the main touch signal is not operated because the main touch signal is not sufficiently generated due to a touch on a wrong area of the wearable electronic device, and repositioning recognition (e.g., repositioning recognition 1 to repositioning recognition 6) indicates that the main touch signal is processed as invalid because although the user tries touching the main touch sensor, the user also touches the auxiliary touch sensor. An exceptional case of non-recognition of the main touch signal, which is not resolved by the first computation operation or the second computation operation, as illustrated in FIG. 18A may be handled by the third computation operation as illustrated in FIGS. 18B to 18E.

Figure 18B:
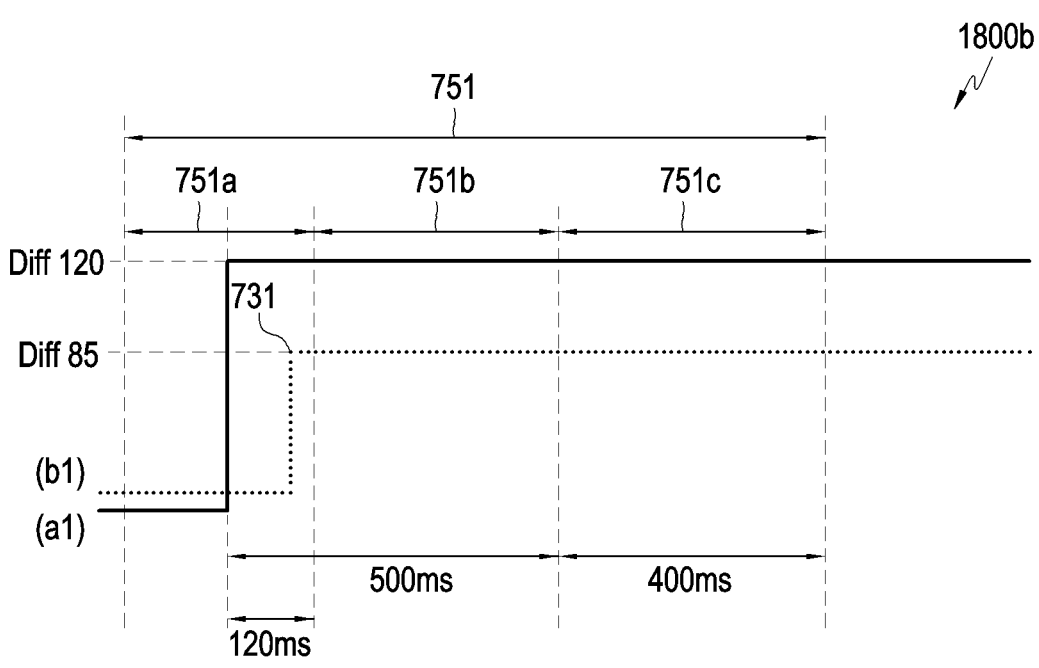

Referring to FIG. 18B, in the third computation operation, when the operation start time 731 of the auxiliary touch signal b1 occurs in the first period 751a of a plurality of detection periods 751, the wearable electronic device (e.g., the wearable electronic device 501 in FIG. 10) may process a main touch signal corresponding to a long touch signal as valid.

Figure 18C:
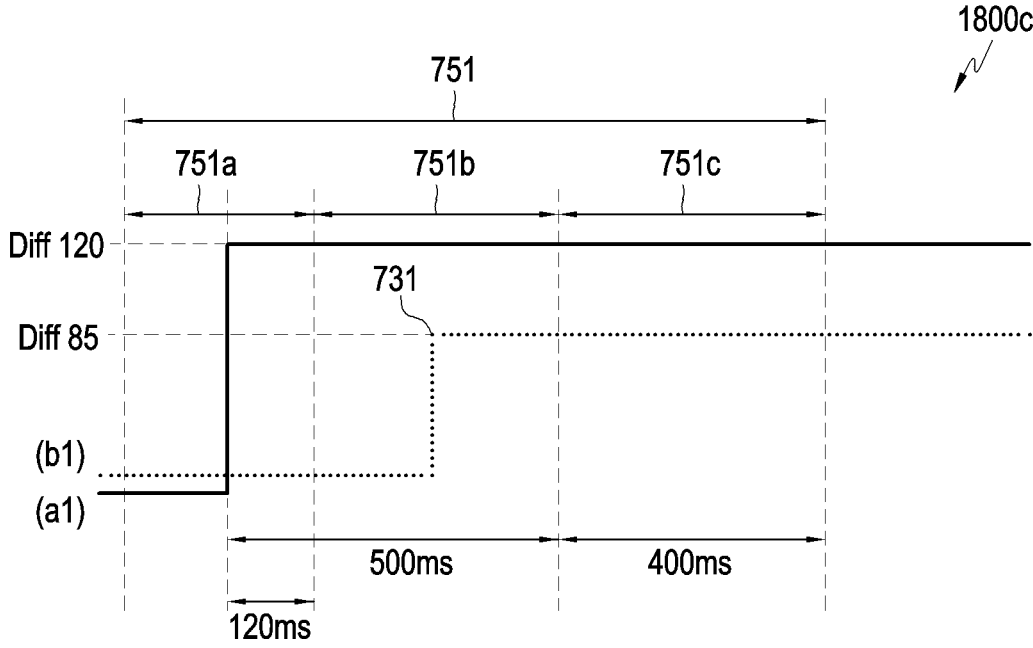

Referring to FIG. 18C, in the third computation operation, when the auxiliary touch signal is maintained until the third period 751C of the plurality of detection periods after the operation start time 731 of the auxiliary touch signal b1 occurs in the second period 751b of the plurality of detection periods 751, the wearable electronic device (e.g., the wearable electronic device 501 in FIG. 10) may process the main touch signal corresponding to a long touch signal as valid.

Figure 18D:
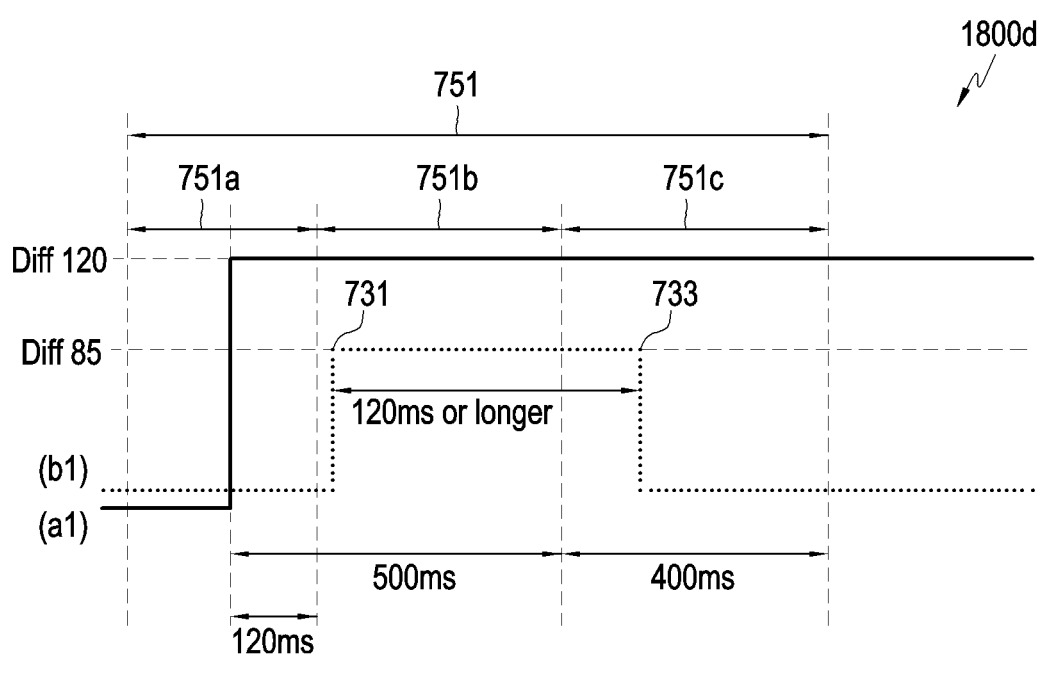

Referring to FIG. 18D, in the third computation operation, when the operation start time 731 of the auxiliary touch signal occurs in the second period and the operation release time 733 of the auxiliary touch signal occurs in the third period 751c of the plurality of detection periods 751, the wearable electronic device (e.g., the wearable electronic device 501 in FIG. 10) may the main touch signal corresponding to a long touch signal as invalid.

Figure 18E:
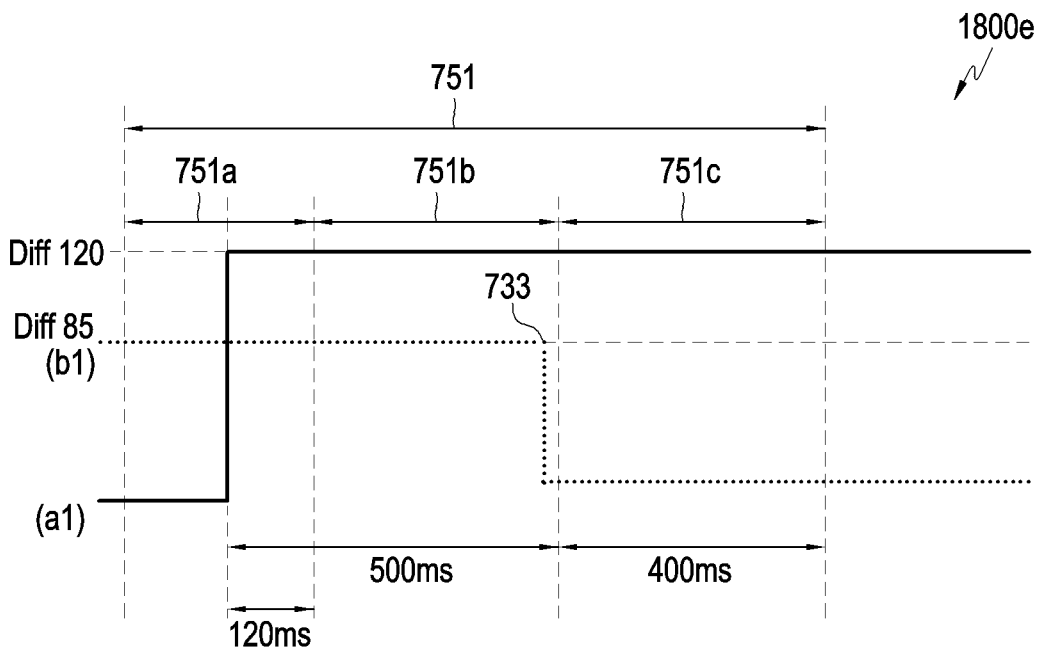

Referring to FIG. 18E, in the third computation operation, when the operation start time 731 of the auxiliary touch signal occurs before the first period 751a of the plurality of detection periods 751 and the operation release time 733 of the auxiliary touch signal occurs in any one of the first period 751a, the second period 751b, and the third period 751c included in the plurality of detection periods 751, the wearable electronic device (e.g., the wearable electronic device 501 in FIG. 10) may process the main touch signal corresponding to a long touch signal as invalid.

Figure 19A:
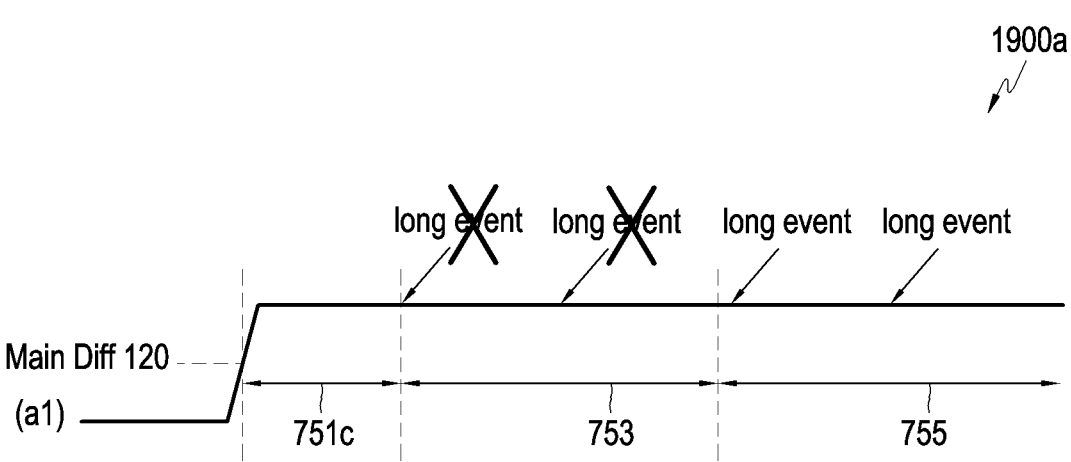
FIGS. 19A and 19B are diagrams illustrating an operation for restricting processing of a long touch signal as invalid in a wearable electronic device according to various embodiments of the disclosure.
Figure 19B:
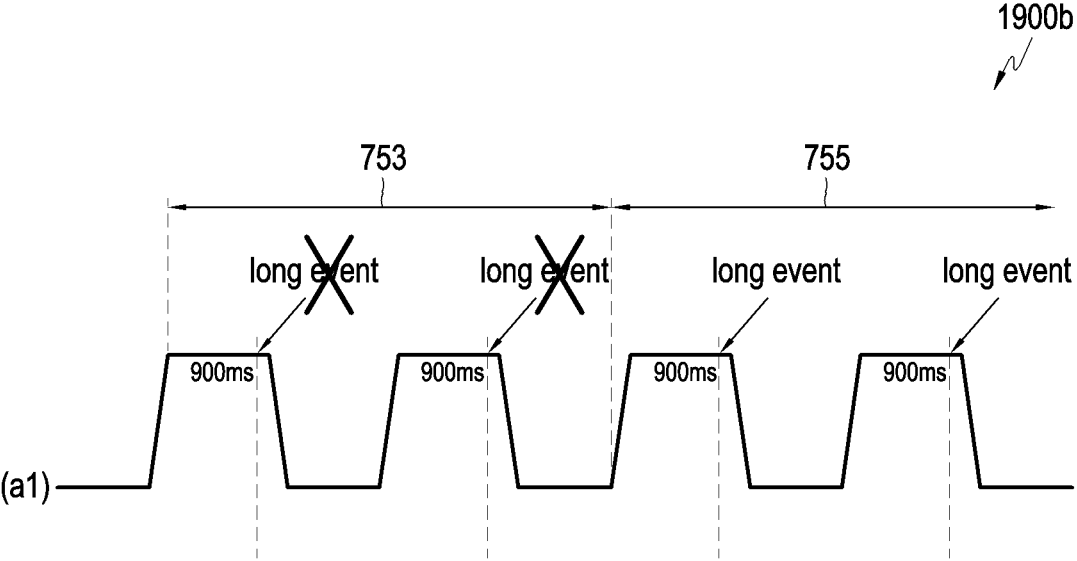

FIGS. 19A and 19B are diagrams 1900a and 1900b illustrating an operation for restricting invalidation of a main touch signal in a wearable electronic device according to various embodiments of the disclosure.

Referring to FIG. 19A, in the third computation operation, when the wearable electronic device (e.g., the wearable electronic device 501 in FIG. 10) processes a main touch signal corresponding to a long touch signal as invalid, it may set any auxiliary touch signal as having occurred in a fourth period 753 corresponding to the predetermined first time (e.g., 300 ms) after the operation release time of the main touch signal processed as invalid. Thus, the wearable electronic device may invalidate only a predetermined number (e.g., 2) of main touch signals corresponding to long touch signals successively received after the main touch signal processed as invalid, and when a main touch signal corresponding to a long touch signal is maintained until a fifth period 755, process the main touch signal corresponding to the long touch signal as valid.

Referring to FIG. 19B, in the third computation operation, when the wearable electronic device (e.g., the wearable electronic device 501 in FIG. 10) processes a main touch signal corresponding to a long touch signal as invalid, it may set any auxiliary touch signal as having occurred in the fourth period 753 corresponding to the predetermined first time (e.g., 300 ms) after the operation release time of the invalidated main touch signal, invalidate only a predetermined number (e.g., 2) of main touch signals corresponding to long touch signals rapidly repeatedly received after the main touch signal processed as invalid, and when a main touch signal corresponding to a long touch signal is maintained until the fifth period 755, process the main touch signal corresponding to the long touch signal as valid.

A wearable electronic device according to an embodiment may include a housing (e.g., 322 in FIG. 2) including a second part (320 in FIG. 2) at least partially exposed to an outside to receive a touch by being seated on at least a portion of a user's body, and a second part (320 in FIGS. 2, 3A, and 3B) extending from the first part, and configured to be concealed by the first part by being inserted into an ear canal of the user. The first part may include a first touch area (324 in FIGS. 2 and 4A) facing a first direction and a second touch area (326 in FIGS. 2 and 4A) disposed on at least a portion of a lateral edge of the first part, adjacent to the first touch area and facing a second direction.

The wearable electronic device according to an embodiment may include a main touch sensor (332 in FIGS. 3A, 3B, and 4A to 4C; 532 in FIG. 10) disposed below the first touch area.

The wearable electronic device according to an embodiment may include an auxiliary touch sensor (341 in FIGS. 3A, 3B, and 4A to 4C; 532 in FIG. 10) disposed below the second touch area.

The wearable electronic device according to an embodiment may include a circuit board (352 in FIGS. 2, 3A, 3B, and 4A to 4C) disposed inside the housing, and including a processor (120 in FIG. 1; 520 in FIG. 10) electrically connected to the main touch sensor and the auxiliary touch sensor and configured to control an operation state of the electronic device based on touch information obtained from the main touch sensor and the auxiliary touch sensor.

The auxiliary touch sensor according to an embodiment may include a first auxiliary touch sensor (342 in FIGS. 2, 3A, 4A, and 4B) and a second auxiliary touch sensor (344 in FIGS. 2, 3B, and 4C), disposed below the second touch area.

The processor according to an embodiment may be configured to maintain the operation state of the electronic device, when a touch sensitivity measured at least a portion of the first auxiliary touch sensor and the second auxiliary touch sensor is equal to or greater than a first threshold, and the processor according to an embodiment may be configured to change the operation state of the electronic device, when touch sensitivities measured at the first auxiliary touch sensor and the second auxiliary touch sensor are less than the first threshold and a touch sensitivity measured at the main touch sensor is equal to or greater than a second threshold.

A lower area of the second part (320 in FIG. 2) may be configured to be seated on a concha of the user, and at least a portion of a lateral edge area of the second part (320 in FIG. 2) may be configured to be surrounded by an antihelix of the user, when the electronic device according to an embodiment is worn on an ear of the user.

The first part (310 in FIGS. 2, 3A, and 3B) according to an embodiment may be configured to further include an ear tip to be in close contact with the ear canal of the user.

The second part (320 in FIG. 2) according to an embodiment may be substantially elliptical, when viewed from above the first part.

The first auxiliary touch sensor (342 in FIGS. 2, 3A, 4A, and 4B) and the second auxiliary touch sensor (344 in FIGS. 2, 3B, and 4C) according to an embodiment may be disposed to face each other on a periphery of an ellipse formed by the first part.

The first auxiliary touch sensor (342 in FIGS. 2, 3A, 4A, and 4B) and the second auxiliary touch sensor (344 in FIGS. 2, 3B, and 4C) according to an embodiment may be disposed to face each other with respect to a short side of the ellipse.

The auxiliary touch sensor (341 in FIGS. 3A, 3B, and 4A to 4C; 532 in FIG. 10) according to an embodiment may further include a third auxiliary touch sensor and a fourth auxiliary touch sensor, The first auxiliary touch sensor (342 in FIGS. 2, 4A, and 4B) and the second auxiliary touch sensor (344 in FIGS. 2 and 4C) according to an embodiment may be disposed to face each other with respect to a short side of the ellipse, and the third auxiliary touch sensor and the fourth auxiliary touch sensor may be disposed to face each other with respect to a long side of the ellipse.

The first auxiliary touch sensor (342 in FIGS. 2, 3A, 4A, and 4B) and the second auxiliary touch sensor (344 in FIGS. 2, 3B, and 4C) according to an embodiment may be integrally formed and disposed extending along the second touch area.

The processor (120 in FIG. 1; 520 in FIG. 10) according to an embodiment may be configured to, when touch information applied to the auxiliary touch sensor (341 in FIGS. 3A, 3B, and 4A to 4C; 532 in FIG. 10) is represented as a frequency response, control the operation state by considering a waveform of the frequency response.

The processor (120 in FIG. 1; 520 in FIG. 10) according to an embodiment may be configured to, when a touch sensitivity applied to the auxiliary touch sensor (341 in FIGS. 3A, 3B, and 4A to 4C; 532 in FIG. 10) is equal to or greater than the first threshold, and a duration of a touch applied to the auxiliary touch sensor is equal to or greater than a threshold time, maintain the operation state of the electronic device.

The processor (120 in FIG. 1; 520 in FIG. 10) according to an embodiment may further consider whether the touch sensitivity applied to the auxiliary touch sensor (341 in FIGS. 3A, 3B, and 4A to 4C; 532 in FIG. 10) is equal to or less than a threshold range defined to be equal to or greater than the first threshold and equal to or less than a third threshold. A wearable electronic device according to an embodiment may include a housing (e.g., 322 in FIG. 2) including a second part (320 in FIG. 2) at least partially exposed to an outside to receive a touch by being seated on at least a portion of a user's body, and a second part (320 in FIGS. 2, 3A, and 3B) extending from the first part, and configured to be concealed by the first part by being inserted into an ear canal of the user, wherein the first part includes a first touch area (324 in FIGS. 2 and 4A) facing a first direction and a second touch area (326 in FIGS. 2 and 4A) disposed on at least a portion of a lateral edge of the first part, adjacent to the first touch area and facing a second direction, a main touch sensor (332 in FIGS. 3A, 3B, and 4A to 4C; 532 in FIG. 10) disposed below the first touch area, an auxiliary touch sensor (341 in FIGS. 3A, 3B, and 4A to 4C; 532 in FIG. 10) disposed below the second touch area, and a processor (120 in FIG. 1; 520 in FIG. 10).

The processor (120 in FIG. 1; 520 in FIG. 10) according to an embodiment may be configured to perform a first computation operation of, based on a main touch signal and an auxiliary touch signal detected from the main touch sensor and the auxiliary touch sensor, respectively, detecting a debounce period of the main touch signal from an operation start time of the main touch signal to an operation release time of the main touch period, and a debounce period of the auxiliary touch signal from an operation start time of the auxiliary touch signal to an operation release time of the auxiliary touch signal.

The processor (120 in FIG. 1; 520 in FIG. 10) according to an embodiment may be configured to perform a second computation operation of setting at least one period for processing the main touch signal as valid or invalid based on the debounce period of the main touch signal, and processing the main touch signal as valid or invalid based on whether the debounce period of the auxiliary touch signal is included in the at least one period.

The processor (120 in FIG. 1; 520 in FIG. 10) according to an embodiment may be configured to, in the first computation operation, detect a time when the main touch signal reaches a first rising threshold point as the operation start time of the main touch signal, and detect a time when the main touch signal falls to or below a first falling threshold point after reaching the operation start time of the main touch signal as the operation release time of the main touch signal.

The processor (120 in FIG. 1; 520 in FIG. 10) according to an embodiment may be configured to detect a time when the auxiliary touch signal reaches a second rising threshold point as the operation start time of the auxiliary touch signal, and detect a time when the auxiliary touch signal falls to or below a second falling threshold point after reaching the operation start time of the auxiliary touch signal as the operation release time of the auxiliary touch signal.

The processor (120 in FIG. 1; 520 in FIG. 10) according to an embodiment may be configured to, when identifying that the debounce period of the main touch signal is equal to or less than a first threshold period in the second computation operation, set an auxiliary touch detection period including the operation start time of the main touch signal and the operation release time of the main touch signal.

The processor (120 in FIG. 1; 520 in FIG. 10) according to an embodiment may be configured to, when the debounce period of the auxiliary touch signal is equal to or greater than a second threshold period, extend the debounce period of the auxiliary touch signal by a second predetermined time.

The processor (120 in FIG. 1; 520 in FIG. 10) according to an embodiment may be configured to, when at least a portion of the debounce period of the auxiliary touch signal extended by the second predetermined time is included in the auxiliary touch detection period, process the main touch signal as invalid.

The processor (120 in FIG. 1; 520 in FIG. 10) according to an embodiment may be configured to, when the debounce period of the auxiliary touch signal is equal to or less than the second threshold period, or when at least a portion of the debounce period of the auxiliary touch signal extended by the second predetermined time is not included in the auxiliary touch detection period, identify occurrence of a single touch event by processing the main touch signal as valid.

The processor (120 in FIG. 1; 520 in FIG. 10) according to an embodiment may be configured to, when the main touch signal is processed as invalid, identify occurrence of a single touch event by processing the main touch signal as valid, when a sum of an absolute time difference between the operation start time of the main touch signal and the operation start time of the auxiliary touch signal and an absolute time difference between the operation release time of the main touch signal and the operation release time of the auxiliary touch signal is equal to or less than a threshold time, in a third computation operation.

The processor (120 in FIG. 1; 520 in FIG. 10) according to an embodiment may be configured to process the main touch signal as invalid, when the sum of the absolute time differences is equal to or greater than the threshold time.

The processor (120 in FIG. 1; 520 in FIG. 10) according to an embodiment may be configured to, when identifying that the debounce period of the main touch signal is equal to or greater than the first threshold period in the second computation operation, set a plurality of detection periods.

The processor (120 in FIG. 1; 520 in FIG. 10) according to an embodiment may be configured to, when the debounce period of the auxiliary touch signal is equal to or greater than a third threshold period, extend the debounce period of the auxiliary touch signal by a second predetermined time.

The processor (120 in FIG. 1; 520 in FIG. 10) according to an embodiment may be configured to, when at least a portion of the extended debounce period of the auxiliary touch signal is included in at least one of the plurality of detection periods, process the main touch signal as invalid.

The processor (120 in FIG. 1; 520 in FIG. 10) according to an embodiment may be configured to, when the debounce period of the auxiliary touch signal is equal to or less than the third threshold period, and at least a portion of the debounce period of the auxiliary touch signal is not included in at least one of the plurality of detection periods, identify occurrence of a long touch event by processing the main touch signal as valid.

The plurality of detection periods according to an embodiment may include a first period from a third predetermined time before the operation start time of the main touch signal to the third predetermined time after the operation release time of the main touch signal, a second period including a fourth predetermined time from an end time of the first period, and a third period including a fifth predetermined time from an end time of the second period.

The processor (120 in FIG. 1; 520 in FIG. 10) according to an embodiment may be configured to, when the main touch signal is processed as invalid in the second computation operation, identify occurrence of a long touch event by processing the main touch signal as valid, when the operation start time of the auxiliary touch signal occurs in the first period or the second period of the plurality of detection periods, and the auxiliary touch signal is maintained until the third period of the plurality of detection periods in a third computation operation.

The processor (120 in FIG. 1; 520 in FIG. 10) according to an embodiment may be configured to process the main touch signal as invalid, when the operation start time of the auxiliary touch signal occurs before the first period of the plurality of detection periods, and the operation release time of the auxiliary touch signal occurs in any one of the first period, the second period, and the third period, or when the operation start time of the auxiliary touch signal occurs in the second period, and the operation release time of the auxiliary touch signal occurs in the third period.

Figure 20:
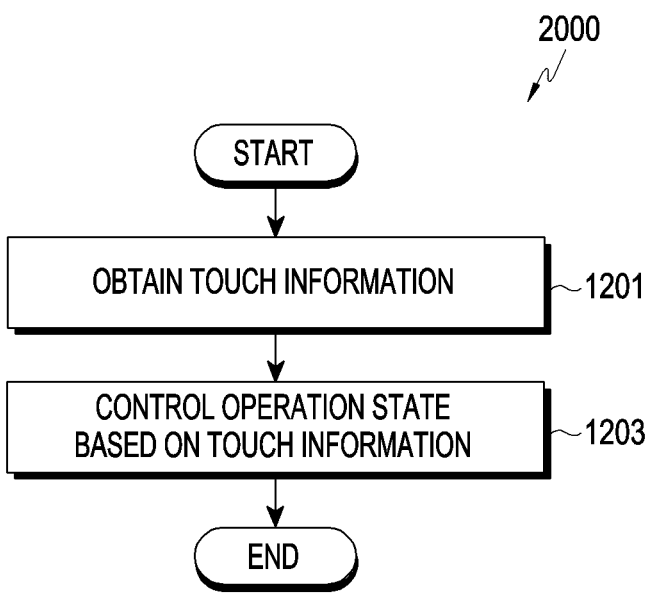
FIG. 20 is a flowchart illustrating a method for controlling an operation of a wearable electronic device according to an embodiment of the disclosure.

FIG. 20 is a flowchart 2000 illustrating a method for controlling an operation of a wearable electronic device according to an embodiment of the disclosure.

Referring to FIG. 20, the method for controlling an operation of a wearable electronic device according to an embodiment may include operation 1201 of obtaining touch information and operation 1203 of controlling an operation of the wearable electronic device (e.g., the wearable electronic device 300 in FIGS. 2, 3A, 3B, 4A to 4C, and 5 to 9 and/or the wearable electronic device 501 in FIG. 5) based on the touch information.

The above description of obtaining touch information through a main touch sensor (e.g., the main touch sensor 332 in FIG. 2 and/or the main touch sensor 532 in FIG. 5) and/or an auxiliary touch sensor (e.g., the auxiliary touch sensor 341 in FIGS. 2, 3A, 3B, and 4A to 4C and/or the auxiliary touch sensor 541 in FIG. 5) by a processor (e.g., the processor 120 in FIG. 1 and/or the processor 520 in FIG. 5) is applicable in whole or in part to operation 1201 of obtaining the touch information, and thus a redundant description will be avoided herein.

The above description of controlling the operation of the wearable electronic device based on the touch information obtained through the main touch sensor and/or the auxiliary touch sensor is applicable in whole or in part to operation 1203 for controlling the operation of the wearable electronic device, and thus a redundant description will be avoided herein.

FIGS. 21A to 21E are flowcharts 2100a to 2100e illustrating an operation for processing a touch signal in a wearable electronic device according to various embodiments of the disclosure. The operation for processing a touch signal may include operations 1301 to 1353. In the following embodiment, the operations may be performed sequentially, but not necessarily. For example, the order of the operations may be changed, at least two operations may be performed in parallel, or other operations may be added.

Figure 21A:
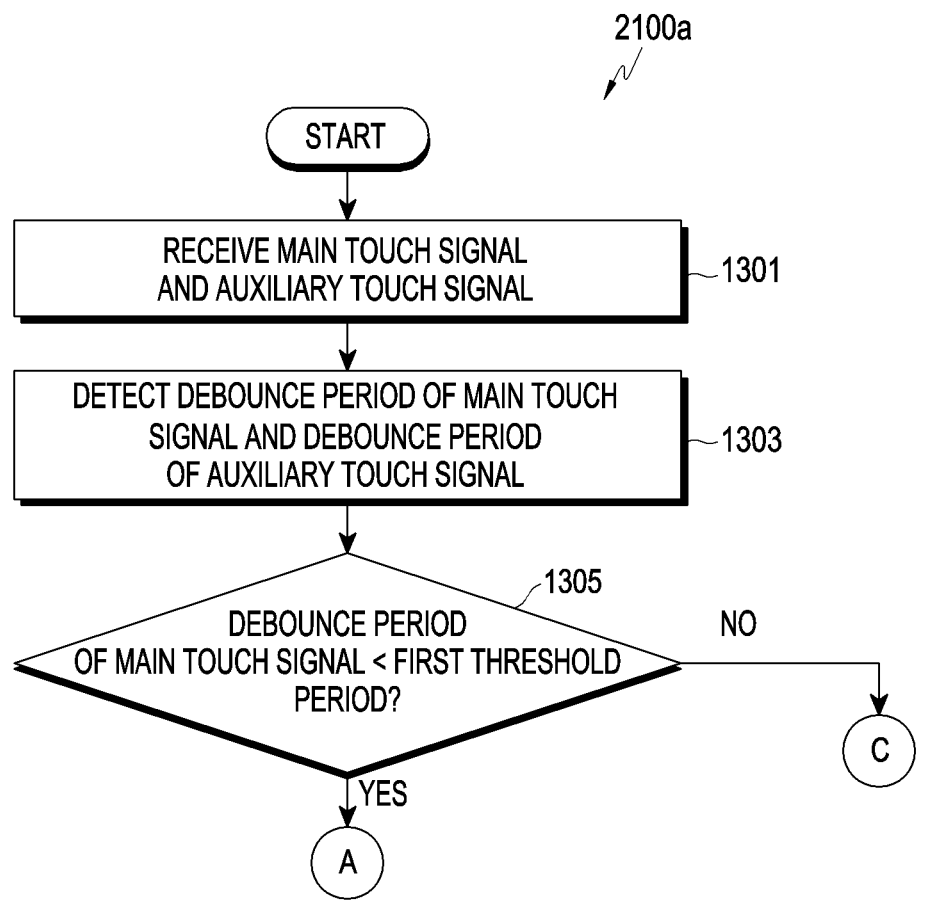
FIGS. 21A, 21B, 21C, 21D, and 21E are flowcharts illustrating an operation for processing a touch signal in a wearable electronic device according to various embodiments of the disclosure.
Figure 21B:
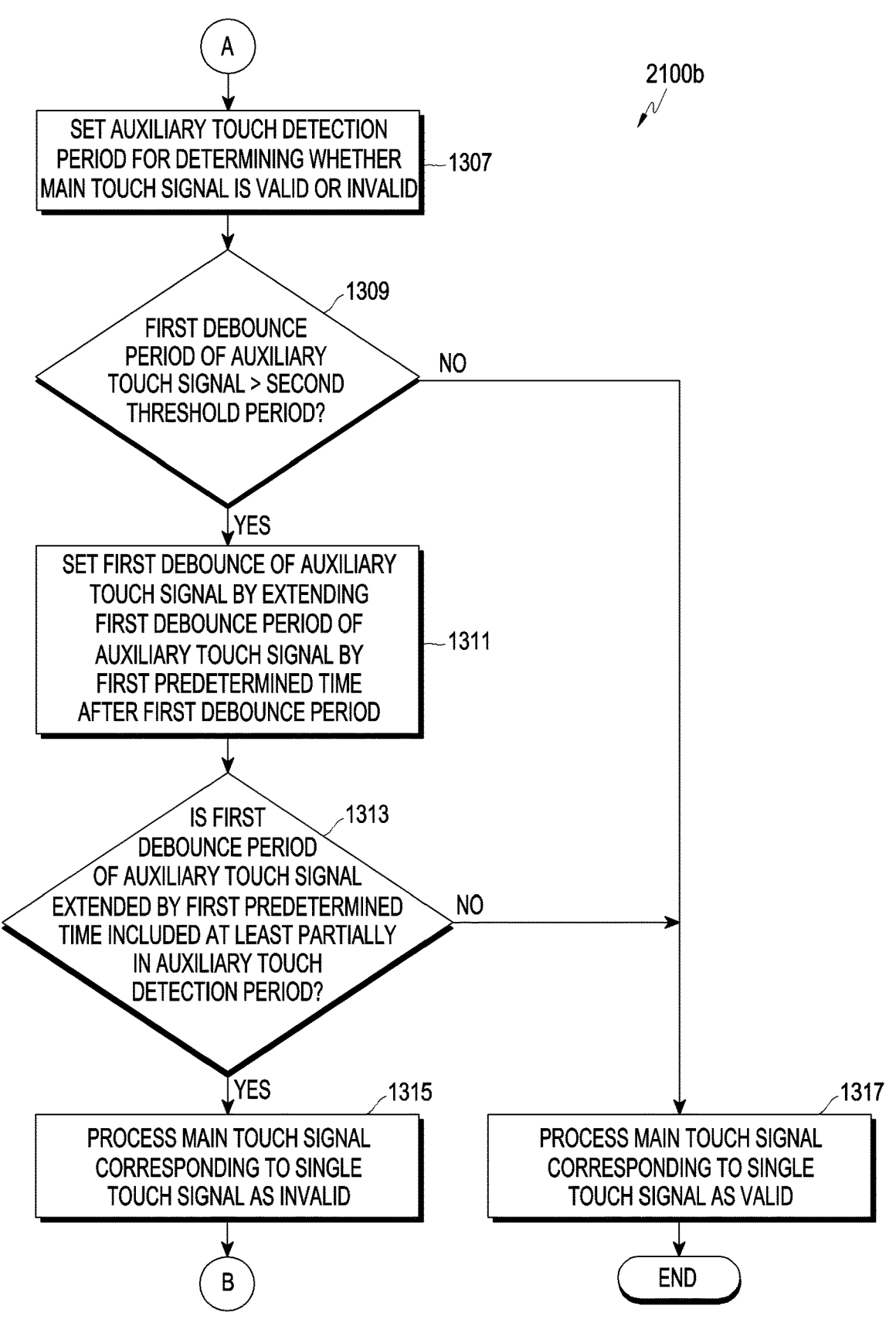
Figure 21C:
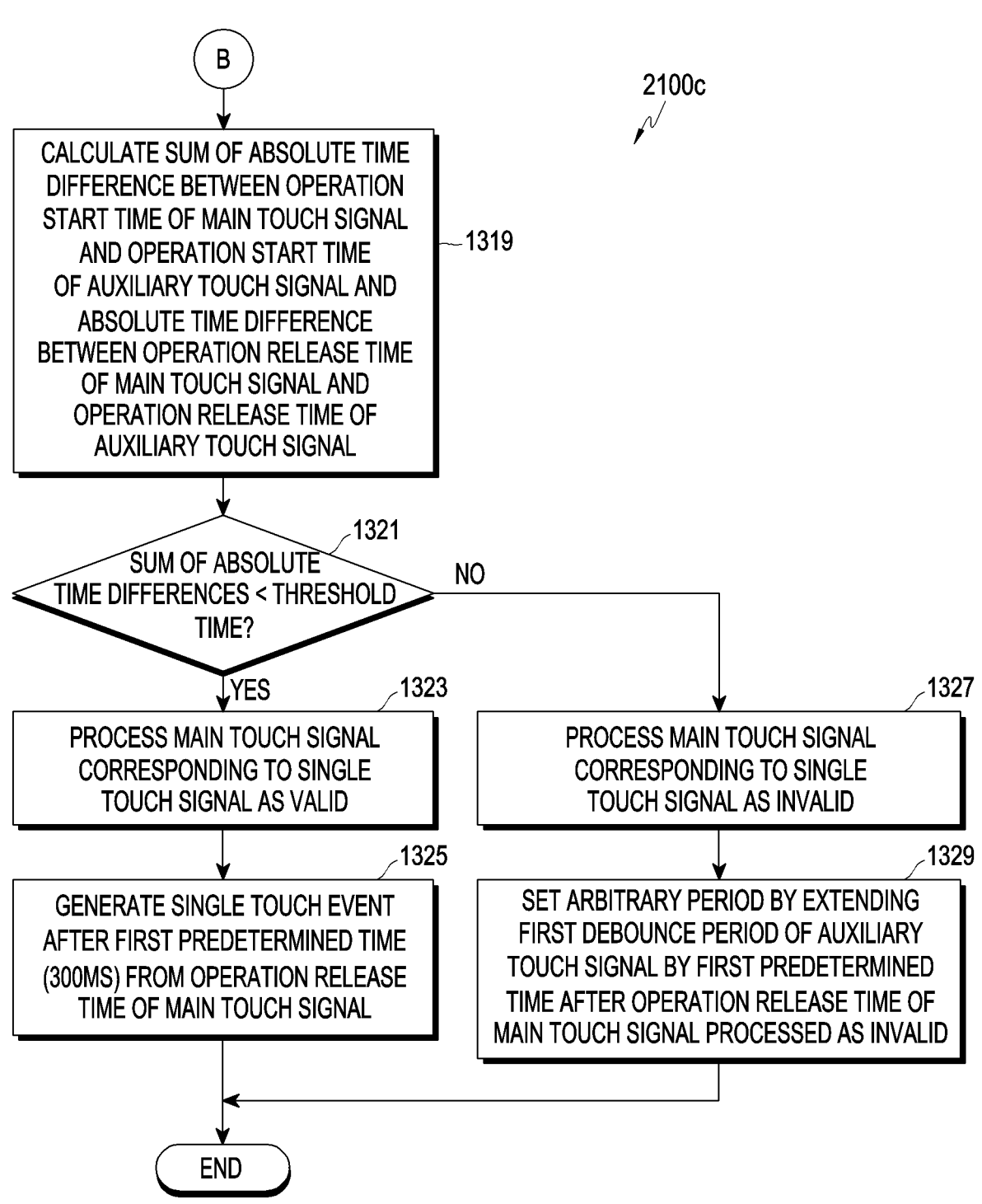
Figure 21D:
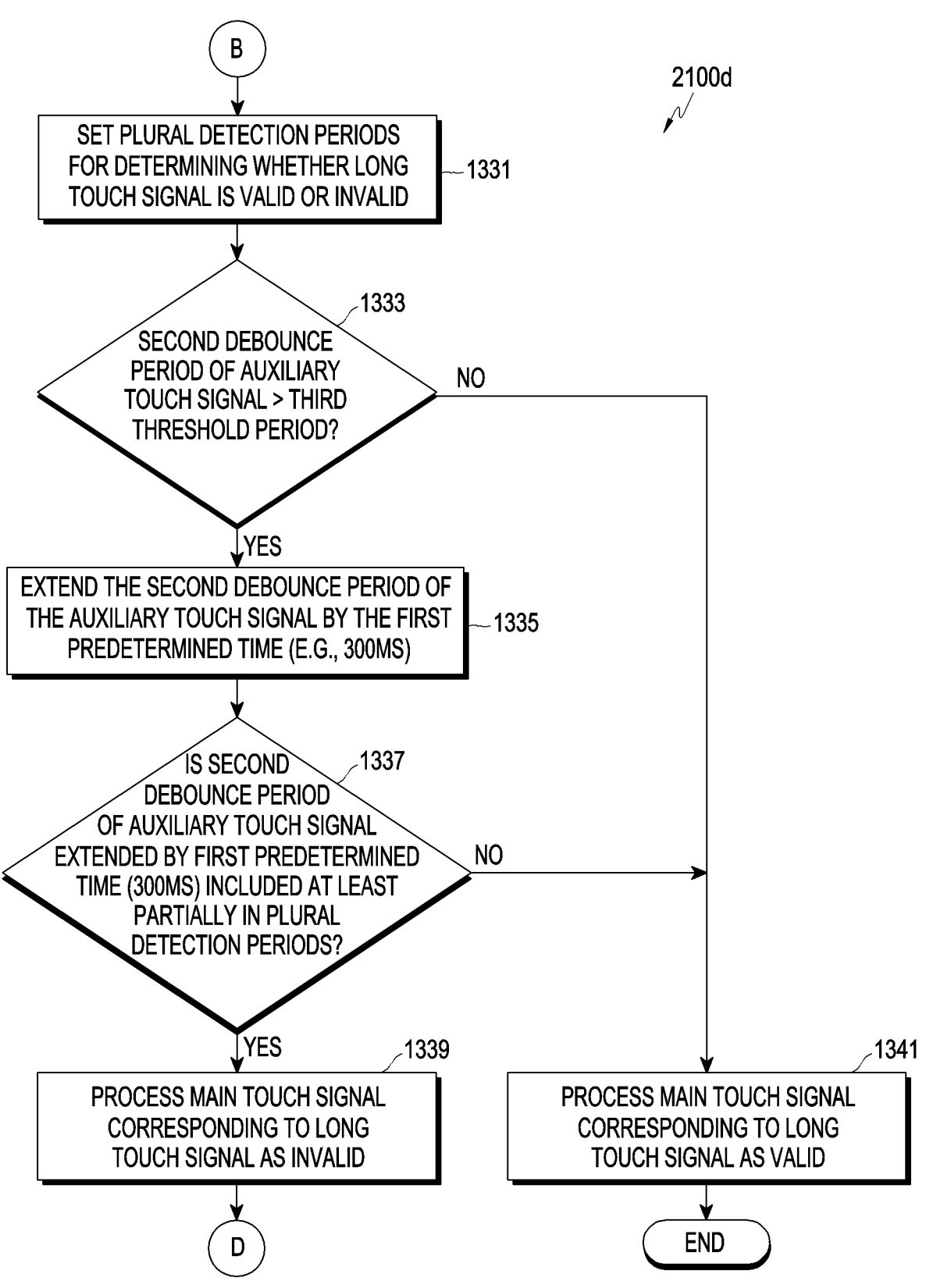
Figure 21E:
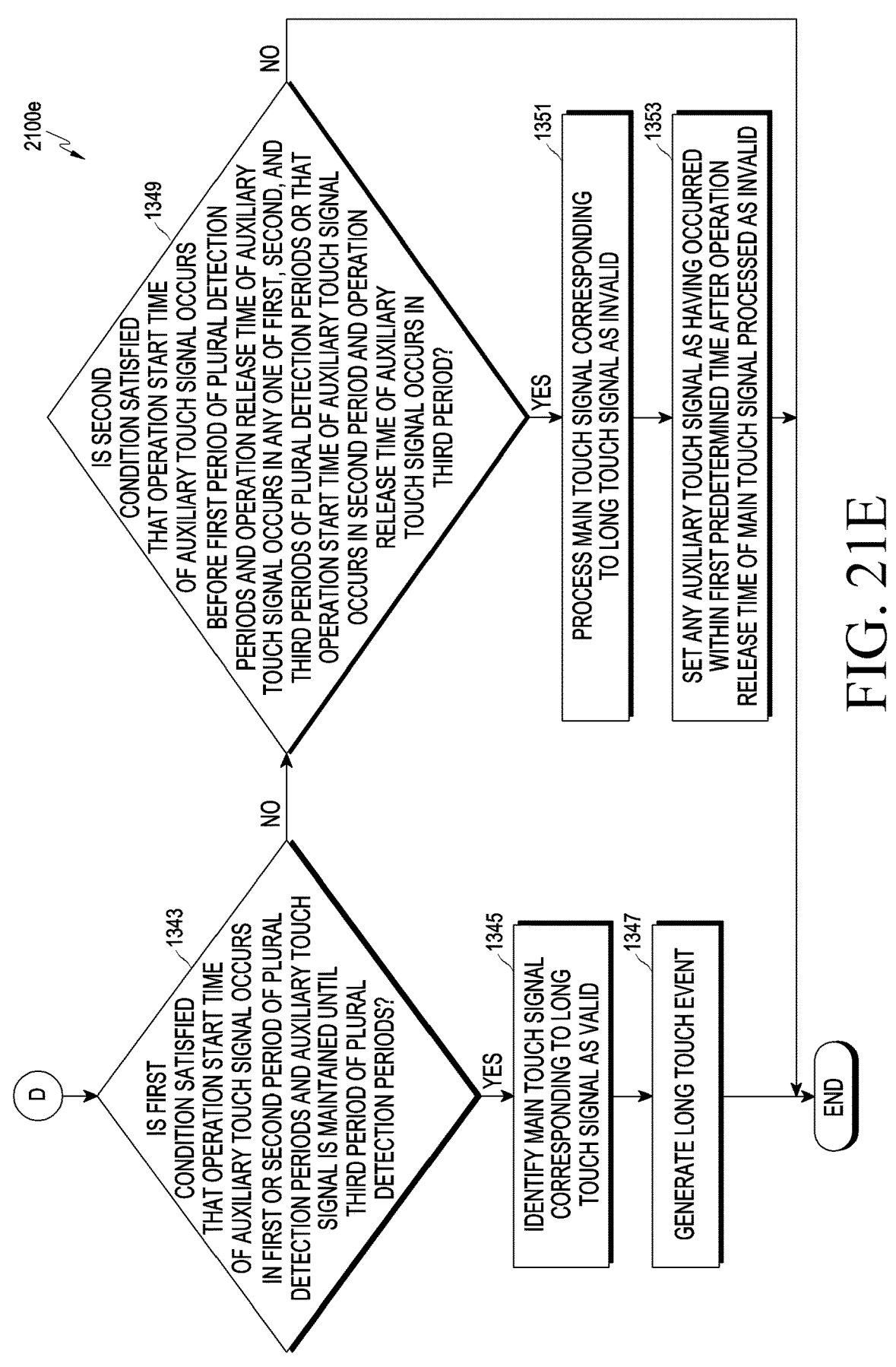

Operations 1301 and 1303 in FIG. 21A include a first computation operation, operation 1305 in FIG. 21A and operations 1307 to 1317 in FIG. 21B include a second computation operation on a main touch signal corresponding to a single touch signal, operations 1319 to 1329 in FIG. 21C include a third computation operation on the main touch signal corresponding to the single touch signal, operations 1305 in FIG. 21A and operations 1331 to 1341 in FIG. 21D include a second computation operation on a main touch signal corresponding to a long touch signal, and operations 1343 to 1353 in FIG. 21E include a third computation operation on the main touch signal corresponding to the long touch signal.

Referring to FIGS. 21A to 21E, in operation 1301, the wearable electronic device 501 (e.g., the electronic device 101 in FIG. 1, the wearable electronic device 300 in FIGS. 2, 3A, 3B, 4A to 4C, and 5 to 9, and/or the wearable electronic device 501 in FIG. 10) may receive a main touch signal and an auxiliary touch signal.

According to an embodiment, the electronic device 501 may receive a main touch signal and an auxiliary touch signal having a touch sensitivity equal to or greater than a threshold, respectively from the main touch sensor (e.g., the main touch sensor 532 in FIG. 10) and the auxiliary touch sensor (e.g., the auxiliary touch sensor 541 in FIG. 10).

In operation 1303, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may detect a debounce period of the main touch signal and a debounce period of the auxiliary touch signal.

According to an embodiment, the electronic device may detect a debounce period of the main touch signal representing the length of the main touch signal and a debounce period of the auxiliary touch signal representing the length of the auxiliary touch signal.

According to an embodiment, the electronic device may calculate a sensitivity difference (e.g., diff) of an electrode signal according to touch sensitivities based on the main touch signal received from the main touch sensor (e.g., main touch sensor 532), and detect, based on the calculation of the sensitivity difference of the electrode signal, a time when the main touch signal reaches a first rising threshold point (e.g., 120 diff) as an operation start time of the main touch signal and a time when the main touch signal falls to or below a first falling threshold point (e.g., 90 diff) after reaching the first rising threshold point as an operation release time of the main touch signal. The electronic device may detect a period from the operation start time of the main touch signal to the operation release time of the main touch signal as the debounce period of the main touch signal.

According to an embodiment, the electronic device may calculate the average value of every N auxiliary touch signals received from the auxiliary touch sensor (e.g., auxiliary touch sensor 541), calculate a sensitivity difference (e.g., diff) of an electrode signal according to touch sensitivities based on the average value, and based on the calculation of the sensitivity difference of the electrode signal, detect a time when the auxiliary touch signal reaches a second rising threshold point (e.g., 60 diff) as an operation start time of the auxiliary touch signal, and a time when the auxiliary touch signal falls to or below a second falling threshold point (e.g., 55 diff) after reaching the second rising threshold point as an operation release time of the auxiliary touch signal. The electronic device may detect a period from the operation start time of the auxiliary touch signal to the operation release time of the auxiliary touch signal as a first debounce period of the auxiliary touch signal. The first debounce period of the auxiliary signal may be used to determine whether a single touch signal is valid or invalid.

According to an embodiment, the electronic device may calculate a sensitivity difference (e.g., diff) of an electrode signal according to touch sensitivities based on the auxiliary touch signal received from the auxiliary touch sensor (e.g., the auxiliary touch sensor 541), and based on the calculation of the sensitivity difference of the electrode signal, detect a time when the auxiliary touch signal reaches a third rising threshold point (e.g., 85 diff) as an operation start time of the auxiliary touch signal, and a time when the auxiliary touch signal falls to or below a third falling threshold point (e.g., 75 diff) after reaching the third rising threshold point as an operation release time of the auxiliary touch signal. The electronic device may detect a period from the operation start time to the operation release time of the auxiliary touch signal, which have been detected based on the third rising threshold point and the third falling threshold point, as a second debounce period of the auxiliary touch signal. The second debounce period of the auxiliary signal may be used to determine whether a long touch signal is valid.

In operation 1305, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may compare the debounce period of the main touch signal with a first threshold period.

When identifying that the debounce period of the main touch signal is equal to or less than the first threshold period (e.g., 900 ms) in operation 1305, the electronic device may set an auxiliary touch detection period for determining whether the main touch signal is valid in operation 1307.

According to an embodiment, the electronic device may set an auxiliary touch detection period for determining whether a main touch signal corresponding to a single touch signal is valid.

According to an embodiment, the electronic device may set a period from the operation start time of the main touch signal to a predetermined time (e.g., 300 ms) after the operation release time of the main touch signal as a first auxiliary touch detection period.

According to an embodiment, the electronic device may set a period from a second predetermined time (e.g., 50 m) before the operation start time of the main touch signal to a third predetermined time (e.g., 250 ms) after the operation release time of the main touch signal as a second auxiliary touch detection period.

According to an embodiment, the electronic device may selectively use the first auxiliary touch detection period and the second auxiliary touch detection period as an auxiliary touch detection period, depending on the performance or configuration of the electronic device.

In operation 1309, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may compare the first debounce period of the auxiliary touch signal with a second threshold period.

When identifying that the first debounce period of the auxiliary touch signal is equal to or less than the second threshold period (e.g., 80 ms) in operation 1309, the electronic device may process the main touch signal corresponding to the single touch signal as valid in operation 1317.

When identifying that the first debounce period of the auxiliary touch signal is greater than the second threshold period (e.g., 80 ms) in operation 1309, the electronic device may extend the first debounce period of the auxiliary touch signal by the first predetermined time (e.g., 300 ms) after the first debounce period in operation 1311.

In operation 1313, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may identify whether at least a portion of the first debounce period of the auxiliary touch signal extended by the first predetermined time is included in the auxiliary touch detection period.

When identifying that at least a portion of the first debounce period of the first time extended by the first predetermined time is not included in the auxiliary touch detection period in operation 1313, the electronic device may process the main touch signal corresponding to the single touch signal as valid in operation 1317.

When identifying that at least a portion of the first debounce period of the first time extended by the first predetermined time is included in the auxiliary touch detection period in operation 1313, the electronic device may process the main touch signal corresponding to the single touch signal as invalid in operation 1315.

In operation 1319, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may calculate the sum of an absolute time difference between the operation start time of the main touch signal and the operation start time of the auxiliary touch signal, and an absolute time difference between the operation release time of the main touch signal and the operation release time of the auxiliary touch signal.

In operation 1321, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may compare the sum of the absolute time differences with a threshold time.

When identifying that the sum of the absolute time differences is less than the threshold time (e.g., 80 ms) in operation 1321, the electronic device may identify the main touch signal corresponding to the single touch signal as valid in operation 1323.

In operation 1325, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may generate a single touch event after the first predetermined time (e.g., 300 ms) from the operation release time of the main touch signal.

When identifying that the sum of the absolute time differences is equal to or greater than the threshold time (e.g., 80 ms) in operation 1321, the electronic device may identify the main touch signal corresponding to the single touch signal as invalid in operation 1327.

In operation 1329, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may set an arbitrary period by extending the first debounce period of the auxiliary touch signal by the first predetermined time (e.g., 300 ms) after the operation release time of the main touch signal processed as invalid.

According to an embodiment, even if the electrode signal of the auxiliary touch sensor is actually detected as 0 diff, the electronic device may process a main touch signal received after the invalidated main touch signal as invalid, considering that the auxiliary touch signal has occurred in the arbitrary period.

When identifying that the debounce period of the main touch signal is equal to or greater than the first threshold period (e.g., 900 ms) in operation 1305, the electronic device may set a plurality of detection periods for determining whether a long touch signal is valid in operation 1331.

According to an embodiment, the plurality of detection periods may include a first period from a fourth predetermined time (e.g., 1200 ms) before the operation start time of the main touch signal to the fourth predetermined time (e.g., 1200 ms) after the operation release time of the main touch signal, a second period including a fifth predetermined time (e.g., 500 ms) from an end time of the first period, and a third period including a sixth predetermined time (e.g., 400 ms) from an end time of the second period.

In operation 1333, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may compare the second debounce period of the auxiliary touch signal with a third threshold period.

When identifying that the second debounce period of the auxiliary touch signal is equal to or less than the third threshold period (e.g., 1200 ms) in operation 1333, the electronic device may process the main touch signal corresponding to the long touch signal as valid in operation 1341.

When identifying that the second debounce period of the auxiliary touch signal is greater than the third threshold period (e.g., 1200 ms) in operation 1333, the electronic device may extend the second debounce period of the auxiliary touch signal by the first predetermined time (e.g., 300 ms) in operation 1335.

In operation 1337, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may determine whether the second debounce period of the auxiliary touch signal extended by the first predetermined time (e.g., 300 ms) is at least partially included in the plurality of detection periods.

When identifying that the second debounce period of the auxiliary touch signal extended by the first predetermined time (e.g., 300 ms) is not at least partially included in the plurality of detection periods in operation 1337, the electronic device may process the main touch signal corresponding to the long touch signal as valid in operation 1341.

When identifying that the second debounce period of the auxiliary touch signal extended by the first predetermined time (e.g., 300 ms) is at least partially included in the plurality of detection periods in operation 1337, the electronic device may process the main touch signal corresponding to the long touch signal as invalid in operation 1339.

In operation 1343, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may identify whether a first condition that the operation start time of the auxiliary touch signal occurs in the first or second period of the plurality of detection periods and the auxiliary touch signal is maintained until the third period of the plurality of detection periods is satisfied.

When identifying that the first condition is satisfied in operation 1343, the electronic device may identify the main touch signal corresponding to the long touch signal as valid in operation 1345.

In operation 1347, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may generate a long touch event.

According to an embodiment, the electronic device may generate a long touch event at a start time of the third period (e.g., 751c in FIG. 12) of the plurality of detection periods (e.g., 751 in FIG. 12).

When identifying that the first condition is not satisfied in operation 1343, the electronic device may identify, in operation 1349, whether a second condition is satisfied that the operation start time of the auxiliary touch signal occurs before the first period of the plurality of detection periods, and the operation release time of the auxiliary touch signal occurs in any one of the first period, second period, and third period of the plurality of detection periods, or that the operation start time of the auxiliary touch signal occurs in the second period, and the operation release time of the auxiliary touch signal occurs in the third period.

When identifying that the second condition is satisfied in operation 1349, the electronic device may process the main touch signal corresponding to the long touch signal as invalid in operation 1351.

In operation 1353, the wearable electronic device (e.g., the electronic device 101 in FIG. 1, the electronic device 300 in FIGS. 2, 3A, 3B, 4A to 4C, and 5 to 9, and/or the electronic device 501 in FIG. 10) may set any random auxiliary touch signal as having occurred within the first predetermined time (e.g., 300 ms) after the operation release time of the main touch signal processed as invalid.

According to an embodiment, the electronic device may process a main touch signal as invalid, which is received after the main touch signal processed as invalid, by setting any auxiliary touch signal as having occurred within the first predetermined time (e.g., 300 ms) after the operation release time of the main touch signal processed as invalid. The electronic device may limit the number of main touch signals corresponding to long touch signals, which are received after the main touch signal processed as invalid and processed as invalid, to a specific number (e.g., two), and then generate a long touch event by processing a successively received main touch signal.

A method for processing a touch signal in a wearable electronic device according to an embodiment may include obtaining first touch information applied to a first touch area from a main touch sensor.

According to an embodiment, the method may include obtaining second touch information applied to a second touch area from an auxiliary touch sensor.

According to an embodiment, the method may include determining whether a touch sensitivity included in the second touch information is equal to or greater than a first threshold.

According to an embodiment, the method may include maintaining an operation state of the wearable electronic device, when the touch sensitivity included in the second touch information is equal to or greater than the first threshold.

According to an embodiment, the method may further include considering a waveform of the second touch information, when the second touch information is represented as a frequency response.

According to an embodiment, considering the waveform of the second touch information may include further determining whether the touch sensitivity included in the second touch information is equal to or greater than the first threshold, and a duration of a touch is equal to or greater than a threshold time.

According to an embodiment, considering the waveform of the second touch information may further include determining whether the touch sensitivity included in the second touch information is included in a threshold range defined to be equal to or greater than the first threshold and less than a second threshold.

According to an embodiment, the method may further include obtaining first auxiliary touch information from a first auxiliary touch sensor and obtaining second auxiliary touch information from a second auxiliary touch sensor.

According to an embodiment, the method may further include determining that the wearable electronic device is being repositioned, when touch sensitivities included in the first auxiliary touch information and the second auxiliary touch information are equal to or greater than a threshold.

According to an embodiment, the method may further include maintaining the operation state of the wearable electronic device, when it is determined that the wearable electronic device is being repositioned.

According to an embodiment, the method may further include changing the operation state of the wearable electronic device, when the touch sensitivity included in the second touch information is less than the first threshold and the touch sensitivity included in the first touch information is equal to or greater than a third threshold.

A method for processing a touch signal in a wearable electronic device according to an embodiment may include performing a first computation operation of, based on a main touch signal and an auxiliary touch signal detected from a main touch sensor and an auxiliary touch sensor, respectively, detecting a debounce period of the main touch signal from an operation start time of the main touch signal to an operation release time of the main touch period, and a debounce period of the auxiliary touch signal from an operation start time of the auxiliary touch signal to an operation release time of the auxiliary touch signal.

The method for processing a touch signal in the wearable electronic device according to an embodiment may include performing a second computation operation of setting at least one period for processing the main touch signal as valid and/or invalid based on the debounce period of the main touch signal, and processing the main touch signal as valid or invalid based on whether the debounce period of the auxiliary touch signal is included in the at least one period for processing the main touch signal as valid and/or invalid.

In the method for processing a touch signal in the wearable electronic device according to an embodiment, performing the first computation operation may include detecting a time when the main touch signal reaches a first rising threshold point as the operation start time of the main touch signal, and detecting a time when the main touch signal falls to or below a first falling threshold point after reaching the operation start time of the main touch signal as the operation release time of the main touch signal.

In the method for processing a touch signal in the wearable electronic device according to an embodiment, performing the first computation operation may include detecting a time when the auxiliary touch signal reaches a second rising threshold point as the operation start time of the auxiliary touch signal, and detecting a time when the auxiliary touch signal falls to or below a second falling threshold point after reaching the operation start time of the auxiliary touch signal as the operation release time of the auxiliary touch signal.

In the method for processing a touch signal in the wearable electronic device according to an embodiment, performing the second computation operation may include, when it is identified that the debounce period of the main touch signal is equal to or less than a first threshold period, setting an auxiliary touch detection period including the operation start time of the main touch signal and the operation release time of the main touch signal.

In the method for processing a touch signal in the wearable electronic device according to an embodiment, performing the second computation operation may include, when the debounce period of the auxiliary touch signal is equal to or greater than a second threshold period, extending the debounce period of the auxiliary touch signal by a second predetermined time.

In the method for processing a touch signal in the wearable electronic device according to an embodiment, performing the second computation operation may include, when at least a portion of the debounce period of the auxiliary touch signal extended by the second predetermined time is included in the auxiliary touch detection period, processing the main touch signal as invalid.

In the method for processing a touch signal in the wearable electronic device according to an embodiment, performing the second computation operation may further include identifying occurrence of a single touch event by processing the main touch signal as valid, when the debounce period of the auxiliary touch signal is equal to or less than the second threshold period, or when at least a portion of the debounce period of the auxiliary touch signal extended by the second predetermined time is not included in the auxiliary touch detection period.

The method for processing a touch signal in the wearable electronic device according to an embodiment may include, when the main touch signal is processed as invalid, identifying occurrence of a single touch event by processing the main touch signal as valid, when a sum of an absolute time difference between the operation start time of the main touch signal and the operation start time of the auxiliary touch signal and an absolute time difference between the operation release time of the main touch signal and the operation release time of the auxiliary touch signal is equal to or less than a threshold time in a third computation operation.

The method for processing a touch signal in the wearable electronic device according to an embodiment may further include processing the main touch signal as invalid, when the sum of the absolute time differences is equal to or greater than the threshold time.

In the method for processing a touch signal in the wearable electronic device according to an embodiment, performing the second computation operation may include, when identifying that the debounce period of the main touch signal is equal to or greater than the first threshold period, setting a plurality of detection periods.

In the method for processing a touch signal in the wearable electronic device according to an embodiment, performing the second computation operation may include, when the debounce period of the auxiliary touch signal is equal to or greater than a third threshold period, extending the debounce period of the auxiliary touch signal by a second predetermined time.

In the method for processing a touch signal in the wearable electronic device according to an embodiment, performing the second computation operation may include, when at least a portion of the extended debounce period of the auxiliary touch signal is included in at least one of the plurality of detection periods, processing the main touch signal as invalid.

The method for processing a touch signal in the wearable electronic device according to an embodiment may further include identifying occurrence of a long touch event by processing the main touch signal as valid, when the debounce period of the auxiliary touch signal is equal to or less than the third threshold period, and at least a portion of the debounce period of the auxiliary touch signal is not included in at least one of the plurality of detection periods.

In the method for processing a touch signal in the wearable electronic device according to an embodiment, the plurality of detection periods may include a first period from a third predetermined time before the operation start time of the main touch signal to the third predetermined time after the operation release time of the main touch signal, a second period including a fourth predetermined time from an end time of the first period, and a third period including a fifth predetermined time from an end time of the second period.

The method for processing a touch signal in the wearable electronic device according to an embodiment may further include, when the main touch signal is processed as invalid in the second computation operation, identifying occurrence of a long touch event by processing the main touch signal as valid, when the operation start time of the auxiliary touch signal occurs in the first period or the second period of the plurality of detection periods, and the auxiliary touch signal is maintained until the third period of the plurality of detection periods in a third computation operation.

The method for processing a touch signal in the wearable electronic device according to an embodiment may further include processing the main touch signal as invalid, when the operation start time of the auxiliary touch signal occurs before the first period of the plurality of detection periods, and the operation release time of the auxiliary touch signal occurs in any one of the first period, the second period, and the third period, or when the operation start time of the auxiliary touch signal occurs in the second period, and the operation release time of the auxiliary touch signal occurs in the third period.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101 or the wearable electronic device 300). For example, a processor (e.g., the processor 520) of the machine (e.g., the wearable electronic device 300) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment of the disclosure, a non-volatile storage medium may include instructions which when executed by an electronic device, enables the electronic device to perform at least one operation. The at least one operation may include obtaining first touch information applied to a first touch area from a main touch sensor, obtaining second touch information applied to a second touch area from an auxiliary touch sensor, determining whether a touch sensitivity included in the second touch information is equal to or greater than a first threshold, and when the touch sensitivity included in the second touch information is equal to or greater than the first threshold, maintaining an operation state of the electronic device.

According to an embodiment of the disclosure, a non-volatile storage medium may include instructions which when executed by an electronic device, enables the electronic device to perform at least one operation. The at least one operation may include performing a first computation operation of, based on a main touch signal and an auxiliary touch signal detected from the main touch sensor and the auxiliary touch sensor, respectively, detecting a debounce period of the main touch signal from an operation start time of the main touch signal to an operation release time of the main touch period, and a debounce period of the auxiliary touch signal from an operation start time of the auxiliary touch signal to an operation release time of the auxiliary touch signal, and performing a second computation operation of setting at least one period for processing the main touch signal as valid or invalid based on the debounce period of the main touch signal, and processing the main touch signal as valid or invalid based on whether the debounce period of the auxiliary touch signal is included in the at least one period.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
a housing including:
a first part at least partially exposed to an outside to receive a touch by being seated on at least a portion of a body of a user, and
a second part extending from the first part, and configured to be concealed by the first part by being inserted into an ear canal of the user,
wherein the first part includes a first touch area facing a first direction and a second touch area disposed on at least a portion of a lateral edge of the first part, adjacent to the first touch area and facing a second direction;
a main touch sensor disposed below the first touch area;
an auxiliary touch sensor disposed below the second touch area; and
a circuit board disposed inside the housing, and including
a processor electrically connected to the main touch sensor and the auxiliary touch sensor and configured to control an operation state of the wearable electronic device based on touch information obtained from the main touch sensor and the auxiliary touch sensor,
wherein the auxiliary touch sensor includes a first auxiliary touch sensor and a second auxiliary touch sensor, disposed below the second touch area,
wherein the processor is further configured to maintain the operation state of the wearable electronic device, when a touch sensitivity measured at least a portion of the first auxiliary touch sensor and the second auxiliary touch sensor is equal to or greater than a first threshold, and
wherein the processor is further configured to change the operation state of the wearable electronic device, when touch sensitivities measured at the first auxiliary touch sensor and the second auxiliary touch sensor are less than the first threshold and a touch sensitivity measured at the main touch sensor is equal to or greater than a second threshold.

2. The wearable electronic device of claim 1,
wherein a lower area of the first part is configured to be seated on a concha of the user, and at least a portion of a lateral edge area of the first part is configured to be surrounded by an antihelix of the user, when the wearable electronic device is worn on an ear of the user,
wherein the second part further includes an ear tip to be in close contact with the ear canal of the user, and
wherein the first part is substantially elliptical, when viewed from above the first part.

3. The wearable electronic device of claim 1, wherein the first auxiliary touch sensor and the second auxiliary touch sensor are disposed to face each other on a periphery of an ellipse formed by the first part or to face each other with respect to a short side of the ellipse.

4. The wearable electronic device of claim 3,
wherein the auxiliary touch sensor further includes a third auxiliary touch sensor and a fourth auxiliary touch sensor,
wherein the first auxiliary touch sensor and the second auxiliary touch sensor are disposed to face each other with respect to a short side of the ellipse, and
wherein the third auxiliary touch sensor and the fourth auxiliary touch sensor are disposed to face each other with respect to a long side of the ellipse.

5. The wearable electronic device of claim 1, wherein the first auxiliary touch sensor and the second auxiliary touch sensor are integrally formed and disposed extending along the second touch area.

6. The wearable electronic device of claim 1, wherein the processor is further configured to:
when touch information applied to the auxiliary touch sensor is represented as a frequency response, control the operation state by considering a waveform of the frequency response; and
when a touch sensitivity applied to the auxiliary touch sensor is equal to or greater than the first threshold, and a duration of a touch applied to the auxiliary touch sensor is equal to or greater than a threshold time, maintain the operation state of the wearable electronic device.

7. The wearable electronic device of claim 1, wherein the processor is further configured to identify whether the touch sensitivity applied to the auxiliary touch sensor is equal to or less than a threshold range defined to be equal to or greater than the first threshold and equal to or less than a third threshold.

8. A wearable electronic device comprising:
a housing including:
a first part at least partially exposed to an outside to receive a touch by being seated on at least a portion of a body of a user, and
a second part extending from the first part, and configured to be concealed by the first part by being inserted into an ear canal of the user,
wherein the first part includes a first touch area facing a first direction and a second touch area disposed on at least a portion of a lateral edge of the first part, adjacent to the first touch area and facing a second direction;

a main touch sensor disposed below the first touch area;

an auxiliary touch sensor disposed below the second touch area; and a processor, wherein the processor is configured to:

perform a first computation operation of, based on a main touch signal and an auxiliary touch signal detected from the main touch sensor and the auxiliary touch sensor, respectively, detecting a debounce period of the main touch signal from an operation start time of the main touch signal to an operation release time of a main touch period, and a debounce period of the auxiliary touch signal from an operation start time of the auxiliary touch signal to an operation release time of the auxiliary touch signal, and perform a second computation operation of setting at least one period for processing the main touch signal as valid or invalid based on the debounce period of the main touch signal, and processing the main touch signal as valid or invalid based on whether the debounce period of the auxiliary touch signal is included in the at least one period.

9. The wearable electronic device of claim 8, wherein the processor is further configured to:

in the first computation operation, detect a time when the main touch signal reaches a first rising threshold point as the operation start time of the main touch signal, and detect a time when the main touch signal falls to or below a first falling threshold point after reaching the operation start time of the main touch signal as the operation release time of the main touch signal; and detect a time when the auxiliary touch signal reaches a second rising threshold point as the operation start time of the auxiliary touch signal, and detect a time when the auxiliary touch signal falls to or below a second falling threshold point after reaching the operation start time of the auxiliary touch signal as the operation release time of the auxiliary touch signal.

10. The wearable electronic device of claim 8, wherein the processor is further configured to:

in the second computation operation, when identifying that the debounce period of the main touch signal is less than a first threshold period, set an auxiliary touch detection period including the operation start time of the main touch signal and the operation release time of the main touch signal;

when the debounce period of the auxiliary touch signal is greater than a second threshold period, extend the debounce period of the auxiliary touch signal by a second predetermined time; and when at least a portion of the debounce period of the auxiliary touch signal extended by the second predetermined time is included in the auxiliary touch detection period, process the main touch signal as invalid.

11. The wearable electronic device of claim 10, wherein the processor is further configured to, when the debounce period of the auxiliary touch signal is equal to or less than the second threshold period, or when at least a portion of the debounce period of the auxiliary touch signal extended by the second predetermined time is not included in the auxiliary touch detection period, identify occurrence of a single touch event by processing the main touch signal as valid.

12. The wearable electronic device of claim 8, wherein the processor is further configured to:

when the main touch signal is processed as invalid, identify occurrence of a single touch event by processing the main touch signal as valid, when a sum of an absolute time difference between the operation start time of the main touch signal and the operation start time of the auxiliary touch signal and an absolute time difference between the operation release time of the main touch signal and the operation release time of the auxiliary touch signal is equal to or less than a threshold time in a third computation operation; and process the main touch signal as invalid, when the sum of the absolute time differences is equal to or greater than the threshold time.

13. The wearable electronic device of claim 10, wherein the processor is further configured to:

in the second computation operation, when identifying that the debounce period of the main touch signal is greater than the first threshold period, set a plurality of detection periods;

when the debounce period of the auxiliary touch signal is equal to or greater than a third threshold period, extend the debounce period of the auxiliary touch signal by a second predetermined time; and when at least a portion of the extended debounce period of the auxiliary touch signal is included in at least one of the plurality of detection periods, process the main touch signal as invalid.

14. The wearable electronic device of claim 13, wherein the processor is further configured to, when the debounce period of the auxiliary touch signal is equal to or less than the third threshold period, and at least a portion of the debounce period of the auxiliary touch signal is not included in at least one of the plurality of detection periods, identify occurrence of a long touch event by processing the main touch signal as valid, and wherein the plurality of detection periods include a first period from a third predetermined time before the operation start time of the main touch signal to the third predetermined time after the operation release time of the main touch signal, a second period including a fourth predetermined time from an end time of the first period, and a third period including a fifth predetermined time from an end time of the second period.

15. The wearable electronic device of claim 14, wherein the processor is further configured to, when the main touch signal is processed as invalid in the second computation operation, identify occurrence of a long touch event by processing the main touch signal as valid, when the operation start time of the auxiliary touch signal occurs in the first period or the second period of the plurality of detection periods, and the auxiliary touch signal is maintained until the third period of the plurality of detection periods in a third computation operation.

16. The wearable electronic device of claim 15, wherein the processor is further configured to process the main touch signal as invalid, when the operation start time of the auxiliary touch signal occurs before the first period of the plurality of detection periods, and the operation release time of the auxiliary touch signal occurs in any one of the first period, the second period, and the third period, or when the operation start time of the auxiliary touch signal occurs in the second period, and the operation release time of the auxiliary touch signal occurs in the third period.

17. The wearable electronic device of claim 8, wherein a lower area of the first part is configured to be seated on a concha of the user, and at least a portion of a lateral edge area of the first part is configured to be surrounded by an antihelix of the user, when the wearable electronic device is worn on an ear of the user, wherein the second part further includes an ear tip to be in close contact with the ear canal of the user, and wherein the first part is substantially elliptical, when viewed from above the first part.

18. The wearable electronic device of claim 8, wherein the auxiliary touch sensor includes a first auxiliary touch sensor and a second auxiliary touch sensor, disposed below the second touch area, and wherein the first auxiliary touch sensor and the second auxiliary touch sensor are disposed to face each other on a periphery of an ellipse formed by the first part or to face each other with respect to a short side of the ellipse.

19. The wearable electronic device of claim 18, wherein the auxiliary touch sensor further includes a third auxiliary touch sensor and a fourth auxiliary touch sensor, wherein the first auxiliary touch sensor and the second auxiliary touch sensor are disposed to face each other with respect to a short side of the ellipse, and wherein the third auxiliary touch sensor and the fourth auxiliary touch sensor are disposed to face each other with respect to a long side of the ellipse.

20. An operation method of operating a wearable electronic device, the method comprising:

maintaining an operation state of the wearable electronic device, when a touch sensitivity measured at least a portion of a first auxiliary touch sensor of the wearable electronic device and a second auxiliary touch sensor of the wearable electronic device is equal to or greater than a first threshold, and changing an operation state of the wearable electronic device, when touch sensitivities measured at the first auxiliary touch sensor and the second auxiliary touch sensor are less than a first threshold and a touch sensitivity measured at a main touch sensor of the wearable electronic device is equal to or greater than a second threshold, wherein a housing of the wearable electronic device including:

a first part at least partially exposed to an outside to receive a touch by being seated on at least a portion of a body of a user, and a second part extending from the first part, and configured to be concealed by the first part by being inserted into an ear canal of the user, wherein the first part includes a first touch area facing a first direction and a second touch area disposed on at least a portion of a lateral edge of the first part, adjacent to the first touch area and facing a second direction;

a main touch sensor disposed below the first touch area;

an auxiliary touch sensor disposed below the second touch area; and a circuit board disposed inside the housing, and including a processor electrically connected to the main touch sensor and the auxiliary touch sensor and configured to control an operation state of the wearable electronic device based on touch information obtained from the main touch sensor and the auxiliary touch sensor, and wherein the auxiliary touch sensor includes the first auxiliary touch sensor and the second auxiliary touch sensor, disposed below the second touch area.

* * * * *